United States Patent
Ganong et al.

(10) Patent No.: US 9,721,148 B2
(45) Date of Patent: *Aug. 1, 2017

(54) FACE DETECTION AND RECOGNITION

(71) Applicant: APPLIED RECOGNITION INC., Burlington (CA)

(72) Inventors: Ray Ganong, Stoney Creek (CA); Donald Craig Waugh, Oakville (CA); Yong Man Ro, Daejeon (KR); Konstantinos Plataniotis, Toronto (CA); Chris Studholme, Ottawa (CA)

(73) Assignee: Applied Recognition Inc., Burlington, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/036,313

(22) PCT Filed: Nov. 12, 2014

(86) PCT No.: PCT/CA2014/000802
§ 371 (c)(1),
(2) Date: May 12, 2016

(87) PCT Pub. No.: WO2015/070320
PCT Pub. Date: May 21, 2015

(65) Prior Publication Data
US 2016/0292494 A1    Oct. 6, 2016

Related U.S. Application Data

(63) Continuation-in-part of application No. 14/078,071, filed on Nov. 12, 2013, which is a
(Continued)

(51) Int. Cl.
*G06K 9/00* (2006.01)
*G06Q 30/02* (2012.01)

(52) U.S. Cl.
CPC ..... *G06K 9/00288* (2013.01); *G06K 9/00677* (2013.01); *G06Q 30/0241* (2013.01);
(Continued)

(58) Field of Classification Search
None
See application file for complete search history.

(56) References Cited

U.S. PATENT DOCUMENTS 5,031,228 A    7/1991    Lu
5,699,449 A    12/1997    Javidi
(Continued)

FOREIGN PATENT DOCUMENTS

EP    1388802 A2    2/2004
EP    1455297 A1    9/2004
(Continued)

OTHER PUBLICATIONS

Canadian Intellectual Property Office, Office Action dated Jul. 3, 2014, issued in corresponding Canadian Patent Application No. 2,711,143.
(Continued)

*Primary Examiner* — Sumati Lefkowitz
*Assistant Examiner* — David Perlman
(74) *Attorney, Agent, or Firm* — Norton Rose Fulbright Canada LLP

(57) ABSTRACT

The present invention provides, in at least one aspect, methods and systems that detect at least one face in at least one digital image, determine and store area co-ordinates of a location of the at least one detected face in the at least one digital image, apply at least one transformation to the at least one detected face to create at least one portrait of the at least one detected face, rotate the at least one portrait at least until the at least one portrait is shown in a vertical orientation and a pair of eyes of the at least one face shown in the at least
(Continued)

one portrait are positioned on a horizontal plane; and store the rotated at least one portrait.

24 Claims, 52 Drawing Sheets

Related U.S. Application Data continuation-in-part of application No. 12/811,240, filed as application No. PCT/CA2008/002276 on Dec. 30, 2008, now Pat. No. 8,750,574.

(60) Provisional application No. 61/017,895, filed on Dec. 31, 2007.

(52) U.S. Cl.
CPC ............... *G06Q 30/0277* (2013.01); *G06K 2009/00328* (2013.01)

(56) References Cited

U.S. PATENT DOCUMENTS

| | | | |
|---|---|---|---|
| 5,835,616 A | 11/1998 | Lobo et al. |
| 5,842,194 A | 11/1998 | Arbuckle |
| 5,850,470 A | 12/1998 | Kung et al. |
| 5,982,912 A | 11/1999 | Fukui et al. |
| 6,134,339 A | 10/2000 | Luo |
| 6,173,078 B1 | 1/2001 | Kadono |
| 6,246,779 B1 | 6/2001 | Fukui et al. |
| 6,301,370 B1 | 10/2001 | Steffens et al. |
| 6,310,601 B1 | 10/2001 | Moore et al. |
| 6,389,176 B1 | 5/2002 | Hsu et al. |
| 6,697,502 B2 | 2/2004 | Luo |
| 6,728,401 B1 | 4/2004 | Hardeberg |
| 6,810,149 B1 | 10/2004 | Squilla et al. |
| 7,003,135 B2 | 2/2006 | Hsieh et al. |
| 7,333,963 B2 | 2/2008 | Widrow et al. |
| 7,519,200 B2 | 4/2009 | Gokturk et al. |
| 7,636,450 B1 | 12/2009 | Bourdev |
| 7,788,247 B2 | 8/2010 | Wang et al. |
| 7,804,982 B2 | 9/2010 | Howard et al. |
| 7,809,722 B2 | 10/2010 | Gokturk et al. |
| 7,945,653 B2 | 5/2011 | Zuckerberg et al. |
| 8,121,408 B2 | 2/2012 | Omori |
| 8,165,352 B1 | 4/2012 | Mohanty et al. |
| 8,326,000 B2 | 12/2012 | Jung et al. |
| 8,392,268 B2 | 3/2013 | Smith et al. |
| 8,396,246 B2 | 3/2013 | Anbalagan et al. |
| 8,416,312 B2 | 4/2013 | Matsunaga |
| 8,649,604 B2 | 2/2014 | Steinberg et al. |
| 2002/0054059 A1 | 5/2002 | Schneiderman |
| 2002/0055955 A1 | 5/2002 | Lloyd-Jones et al. |
| 2002/0087622 A1 | 7/2002 | Anderson |
| 2002/0103813 A1 | 8/2002 | Frigon |
| 2002/0191818 A1 | 12/2002 | Matsuo et al. |
| 2003/0039380 A1 | 2/2003 | Sukegawa et al. |
| 2003/0053663 A1 | 3/2003 | Chen et al. |
| 2003/0063669 A1 | 4/2003 | Lee et al. |
| 2003/0103652 A1 | 6/2003 | Lee et al. |
| 2003/0133599 A1 | 7/2003 | Tian et al. |
| 2003/0198368 A1 | 10/2003 | Kee |
| 2003/0236832 A1 | 12/2003 | McIntyre et al. |
| 2004/0070678 A1 | 4/2004 | Toyama et al. |
| 2004/0081338 A1 | 4/2004 | Takenaka |
| 2004/0109584 A1 | 6/2004 | Lestideau |
| 2004/0125991 A1 | 7/2004 | Yokoi |
| 2004/0143598 A1 | 7/2004 | Drucker et al. |
| 2004/0190758 A1 | 9/2004 | Doi et al. |
| 2004/0201709 A1 | 10/2004 | McIntyre et al. |
| 2004/0264780 A1 | 12/2004 | Zhang et al. |
| 2005/0031173 A1 | 2/2005 | Hwang |
| 2005/0094849 A1 | 5/2005 | Sung et al. |
| 2005/0100195 A1 | 5/2005 | Li |
| 2005/0117802 A1 | 6/2005 | Yonaha et al. |
| 2005/0141766 A1 | 6/2005 | Nagahashi et al. |
| 2005/0180627 A1 | 8/2005 | Yang et al. |
| 2005/0190273 A1 | 9/2005 | Toyama et al. |
| 2005/0220347 A1 | 10/2005 | Enomoto et al. |
| 2005/0251015 A1 | 11/2005 | Takikawa et al. |
| 2005/0265603 A1 | 12/2005 | Porter et al. |
| 2006/0050933 A1 | 3/2006 | Adam et al. |
| 2006/0133672 A1 | 6/2006 | Li |
| 2006/0173560 A1 | 8/2006 | Widrow |
| 2006/0218225 A1 | 9/2006 | Hee Voon et al. |
| 2006/0222215 A1 | 10/2006 | Jung et al. |
| 2006/0239515 A1 | 10/2006 | Zhang et al. |
| 2006/0251292 A1 | 11/2006 | Gokturk et al. |
| 2006/0251338 A1 | 11/2006 | Gokturk et al. |
| 2006/0251339 A1 | 11/2006 | Gokturk et al. |
| 2006/0253491 A1 | 11/2006 | Gokturk et al. |
| 2006/0274978 A1 | 12/2006 | Fukuda et al. |
| 2007/0081744 A1 | 4/2007 | Gokturk et al. |
| 2007/0098303 A1 | 5/2007 | Gallagher et al. |
| 2007/0177805 A1 | 8/2007 | Gallagher |
| 2007/0206834 A1 | 9/2007 | Shinkai et al. |
| 2007/0211925 A1 | 9/2007 | Aoki et al. |
| 2008/0046458 A1 | 2/2008 | Tseng et al. |
| 2008/0077595 A1 | 3/2008 | Leebow |
| 2008/0080743 A1 | 4/2008 | Schneiderman et al. |
| 2008/0080745 A1 | 4/2008 | Vanhoucke et al. |
| 2008/0091723 A1 | 4/2008 | Zuckerberg et al. |
| 2008/0130960 A1 | 6/2008 | Yagnik |
| 2008/0212849 A1 | 9/2008 | Gao |
| 2008/0317379 A1 | 12/2008 | Steinberg et al. |
| 2009/0185784 A1 | 7/2009 | Hiroike et al. |
| 2009/0252383 A1 | 10/2009 | Adam et al. |
| 2009/0262987 A1* | 10/2009 | Ioffe ............... G06K 9/00281 382/118 |
| 2009/0324018 A1 | 12/2009 | Tell |
| 2009/0324022 A1 | 12/2009 | Sangberg et al. |
| 2009/0324137 A1 | 12/2009 | Stallings et al. |
| 2010/0054600 A1 | 3/2010 | Anbalagan et al. |
| 2010/0054601 A1 | 3/2010 | Anbalagan et al. |
| 2010/0061631 A1 | 3/2010 | Omori |
| 2010/0104256 A1* | 4/2010 | Tsurumi ............ G06K 9/00335 386/241 |
| 2010/0106573 A1* | 4/2010 | Gallagher ............ G06Q 30/02 705/14.4 |
| 2010/0150406 A1* | 6/2010 | Xiao ............... G06K 9/00261 382/118 |
| 2010/0232656 A1 | 9/2010 | Ryu |
| 2010/0245614 A1 | 9/2010 | Matsunaga |
| 2010/0272363 A1 | 10/2010 | Steinberg et al. |
| 2010/0287053 A1 | 11/2010 | Ganong et al. |
| 2011/0063108 A1 | 3/2011 | Aonuma et al. |
| 2011/0202531 A1 | 8/2011 | Zuckerberg et al. |
| 2011/0211094 A1* | 9/2011 | Schraga ............ G11B 27/036 348/239 |
| 2011/0225481 A1 | 9/2011 | Zuckerberg et al. |
| 2011/0244954 A1* | 10/2011 | Goldman ............ A63F 13/65 3/65 |
| 2011/0317872 A1* | 12/2011 | Free ............... G06K 9/00228 382/103 |
| 2012/0096361 A1* | 4/2012 | Osten ............... G11B 27/034 715/731 |
| 2012/0121133 A1* | 5/2012 | Park ............... G06K 9/00221 382/103 |
| 2013/0021368 A1* | 1/2013 | Lee ............... H04N 1/00153 345/619 |
| 2013/0057693 A1 | 3/2013 | Baranek |
| 2013/0077835 A1 | 3/2013 | Kritt et al. |
| 2014/0023248 A1* | 1/2014 | Yoo ............... G06K 9/00288 382/118 |
| 2015/0131872 A1 | 5/2015 | Ganong et al. |

FOREIGN PATENT DOCUMENTS

WO  2006130542 A1  12/2006

(56) References Cited

FOREIGN PATENT DOCUMENTS

| | | |
|---|---|---|
| WO | 2008107002 A1 | 9/2008 |
| WO | 2009082814 A1 | 7/2009 |

OTHER PUBLICATIONS

The State Intellectual Property Office of the People's Republic of China, Fourth Office Action dated Aug. 11, 2014, issued in corresponding Chinese Patent Application No. 200880126543.0.
WIPO, International Search Report dated Jan. 2, 2015, issued in corresponding International Patent Application No. PCT/CA2014/000802.
WIPO, International Search Report, May 11, 2009, PCT Patent Application No. PCT/CA2008/002276.
"Detecting Faces in Images: A Survey", Yang et al.; IEEE Trans. Pattern Analysis Machine Intelligence, vol. 24, No. 1, Jan. 2002.
United States Patent and Trademark Office, Office Action dated Mar. 13, 2013, issued in corresponding U.S. Appl. No. 12/811,240.
United States Patent and Trademark Office, Office Action dated Jul. 19, 2013, issued in corresponding U.S. Appl. No. 12/811,240.
United States Patent and Trademark Office, Office Action dated Jan. 29, 2014, issued in corresponding U.S. Appl. No. 12/811,240.
United States Patent and Trademark Office, Notice of Allowability dated Mar. 21, 2014, issued in corresponding U.S. Appl. No. 12/811,240.
The State Intellectual Property Office of the People's Republic of China, First Office Action dated Jul. 4, 2012, issued in corresponding Chinese Patent Application No. 200880126543.0.
Human face detection based on a skin color under a complex background, Li Xuewei, Paper for Master Degree of Tianjin University, Dec. 31, 2004, pp. 10-42.
Using Skin-Color Motion for 3D Face Modelling and Synthesis, Bletsko, K. A. et al., WISP 2003, Sep. 6, 2003, p. 295-299.
The State Intellectual Property Office of the People's Republic of China, Second Office Action dated Mar. 18, 2013, issued in corresponding Chinese Patent Application No. 200880126543.0.
The State Intellectual Property Office of the People's Republic of China, Third Office Action dated Dec. 3, 2013, issued in corresponding Chinese Patent Application No. 200880126543.0.
United States Patent and Trademark Office, Office Action dated Sep. 4, 2014, issued in corresponding U.S. Appl. No. 13/970,933.
Yang et al., "Detecting Faces in Images: A Survey", Jan. 2002, IEEE Trans. Pattern Analysis Machine Intelligence, vol. 24, No. 1.
Li Xuewei, Human face detection based on a skin color under a complex background, Dec. 31, 2004, Paper for Master Degree of Tianjin University, pp. 10-42.
Bletsko, K. A. et al., Using Skin-Color Motion for 3D Face Modelling and Synthesis, Sep. 6, 2003, WISP 2003, p. 295-299.
United States Patent and Trademark Office, Office Action dated Apr. 9, 2014, issued in corresponding U.S. Appl. No. 13/970,933.
United States Patent and Trademark Office, Office Action dated Jun. 17, 2014, issued in corresponding U.S. Appl. No. 13/970,933.
Z. Stone, T. Zickler, and T. Darrell. Autotagging Facehook: Social network context improves photo annotation. In Workshop on Internet Vision, 2008.
Becker, B. et al., "Evaluation of Face Recognition Techniques for Application to Facebook", IEEE International Conference an Automatic Face and Gesture Recognition, 2008, p. 1-6.
Aseem Kishore, "How to Add, Upload, and Tag Your Pictures and Photos in FaceBook", http://www.online-tech-tips.com/fun-stuff/how-to-add-upload-and-tag-your-pictures-and-photos-in-facebook/, Aug. 11, 2007, p. 1-9.
United States Patent and Trademark Office, Office Action dated Sep. 9, 2014, issued in corresponding U.S. Appl. No. 13/970,933.
L. Baker, "Google & Riya Face Recognition Photo Search", Nov. 22, 2005, http://www.searchenginejournal.com/google-riya-face-recognition-photo-search/2550/, p. 1-2.
J. Michelson and J. Ortiz, "Auto-tagging the Facebook", 2006, http://cs229.stanford.edu/proj2006/MichelsonOrtiz-AutoTaggingTheFacebook.pdf, p. 1-5.
S. Schuon, H. Robertson, and H. Zou, "CS229 Project Report: Automated photo tagging in Facebook", Dec. 2007, http://cs229.stanford.edu/proj2007/SchuonRobertsonZou-AutomatedPhotoTaggingInFacebook.pdf, p. 1-5.
M. Arrington, "First Screen Shots of Riya", Oct. 26, 2005, http://techcrunch.com/2005/10/26/riya-prepares-to-launch-alpha/, p. 1-5.
M. Arrington, "Ojos—Auto Name & Tag Your Photos", Aug. 15, 2005, http://techcrunch.com/2005/08/31/ojos-auto-name-tag-your-photos/, p. 1-7.
A. Rafalovitch, "Viewfinder Friends—idea for Facebook application", Nov. 14, 2007, http://blog.outerthoughts.com/2007/11/viewfinder-friends-idea-for-facebook-application/, p. 1-4.
D. Ponce, "Riya, Photo Sharing with Face Recognition", Oct. 28, 2005, http://www.ohgizmo.com/2005/10/28/riya-photo-sharing-with-face-recognition/, p. 1-2.
Facebook, "Making Photo Tagging Easier", https://m.facebook.com/notes/facebook/making-photo-tagging-easier/467145887130/?_tn_=C&_rdr.
United States Patent and Trademark Office, Office Action dated Dec. 18, 2014, issued in corresponding U.S. Appl. No. 13/970,933.
Unknown, "What does it mean to "tag" someones picture on facebook, whats the point of doing it?", Nov. 28, 2007, https://answers.yahoo.com/question/index?qid=20071128123629AAY0DLP, p. 1-3.
Sid Yadav, "Facebook—The Complete Biography", Aug. 25, 2006, http://mashable.com/2006/08/25/facebook-profile/, p. 1-5.
The State Intellectual Property Office of the People's Republic of China, Fourth Office Action dated Aug. 11, 2014, issued in corresponding Chinese Patent Application No. 20880126543.0.
USPTO, Office Action for U.S. Appl. No. 14/078,071 dated Jun. 30, 2015.
USPTO, Office Action for U.S. Appl. No. 14/078,071 dated Apr. 12, 2016.
Manian et al., "A texture-based approach to face detection." In Biometric Consortium Conference (BCC), pp. 342-347, 2002.
Canadian Intellectual Property Office, Office Action for CA Application 2,897,227 dated Feb. 5, 2016.
USPTO, Office Action for U.S. Appl. No. 13/970,933 dated Jun. 10, 2015.

* cited by examiner

Figure 24
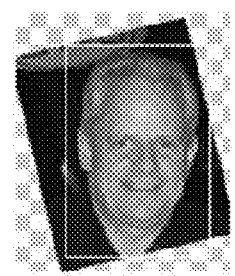
24 a
24 b
24 c

Figure 25
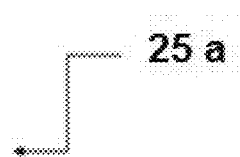
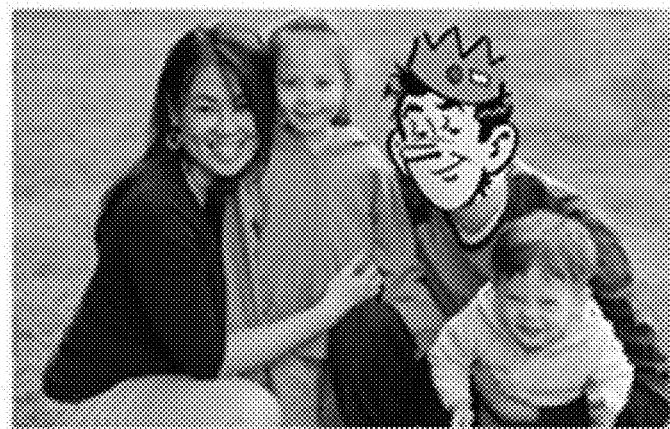

Figure 26
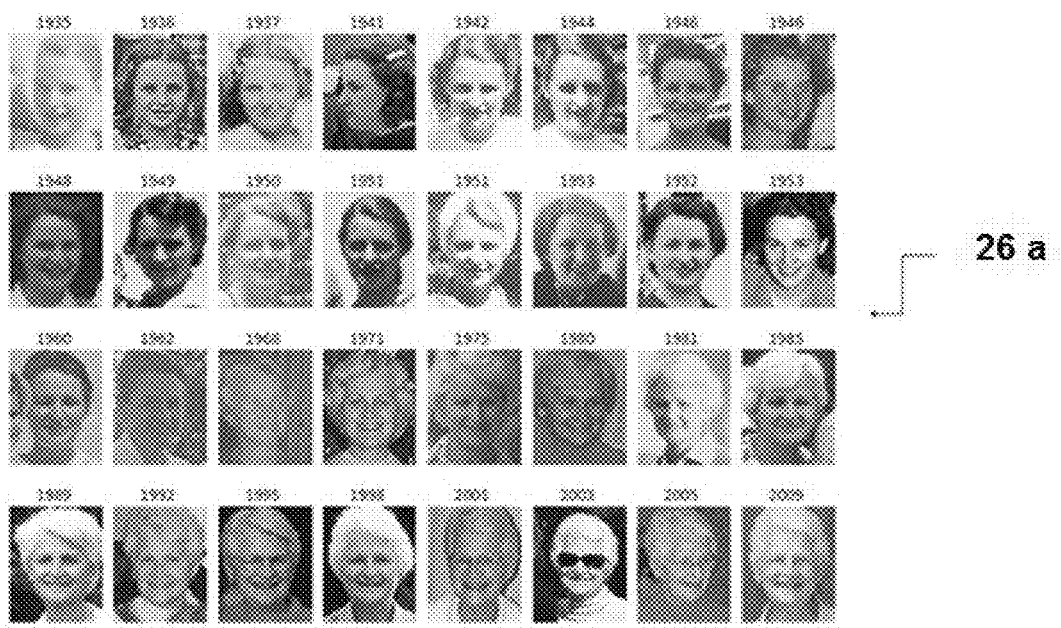
26 a
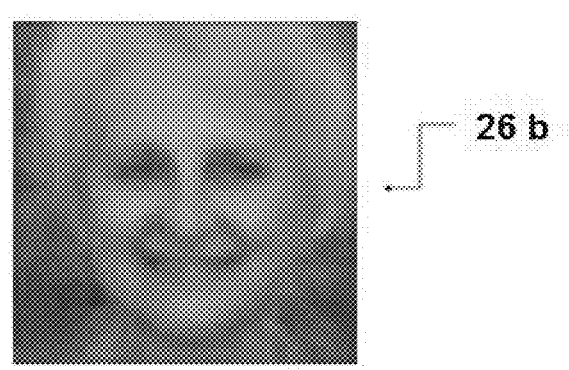
26 b

Figure 31
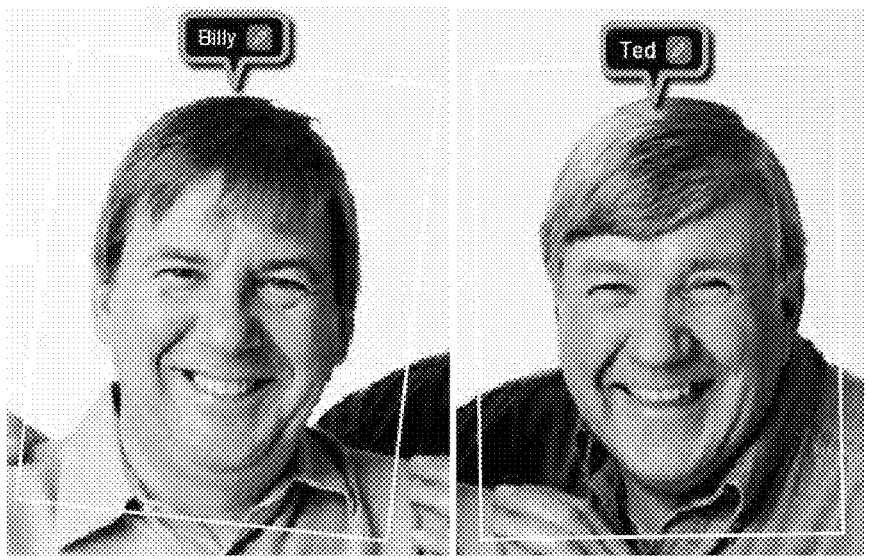
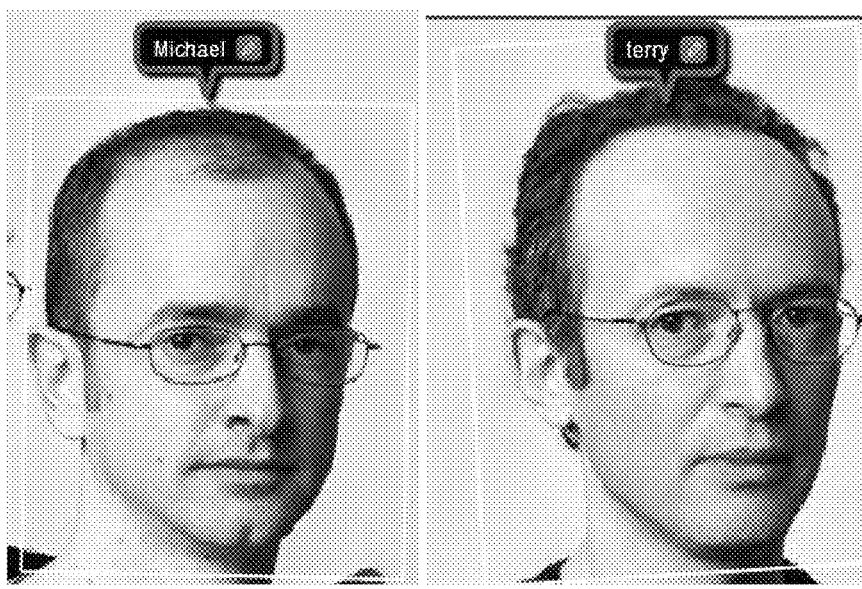

Figure 40 – Same Image

Figure 41 – Same Date

Figure 42 – Relationships

Figure 43 – Locations

Figure 44 – Event Information

Figure 45 – Object Information

FACE DETECTION AND RECOGNITION

CROSS REFERENCE TO RELATED APPLICATIONS

This application claims priority from U.S. patent application Ser. No. 14/078,071, filed Nov. 12, 2013 entitled "FACE DETECTION AND RECOGNITION", of which the entire contents is hereby incorporated by reference in its entirety.

FIELD OF THE INVENTION

The present invention relates to face and portrait extraction using face detection and recognition and application thereof.

BACKGROUND OF THE INVENTION

Social networks presently exist as a means to connect individuals using a website. The following definition exists in the PCMAG.COM™ encyclopedia for "social network":

An association of people drawn together by family, work or hobby. The term was first coined by Professor J. A. Barnes in the 1950s, who defined the size of a social network as a group of about 100 to 150 people.

The following definition exists in the PCMAG.COM™ encyclopedia for "social network site":

A Web site that provides a virtual community for people interested in a particular subject or just to "hang out" together. Members communicate by voice, chat, instant message, videoconference and blogs, and the service typically provides a way for members to contact friends of other members. Such sites may also serve as a vehicle for meeting in person. The "social networking site" is the 21st century term for "virtual community," a group of people who use the Internet to communicate with each other about anything and everything.

Friendster (www.friendster.com) was the first social networking site, which was introduced in 2002 and followed by MySpace (www.myspace.com) a year later. Started by two friends, MySpace became extremely popular, and its parent company, Intermix, was acquired by News Corporation for $580 million two years after MySpace was launched.

Facebook (www.facebook.com) came out in 2004 initially targeting college students, but later welcoming everyone. Following Facebook were TagWorld (www.tagworld.com) and Tagged (www.tagged.com). TagWorld introduced tools for creating more personalized Web pages, and Tagged introduced the concept of building tag teams for teens with like interests.

Social networking sites compete for attention much like the first Web portals when the Internet exploded onto the scene in the mid-1990s. Many variations are expected.

Many social network sites allow users to upload and share photos. Some also incorporate a feature for tagging photos to identify the names of people (faces) in the photos (FACEBOOK™, for example, provides this feature). Based on user surveys the majority of respondents state that the tagging effort is manual and very time consuming. Also, for privacy reasons, many users do not upload all of their digital photos to the sharing website. It is also very time consuming and bandwidth intensive to upload thousands of photos. So while a user of a social network site may have 10,000 digital photos on their local computer, they only upload one or two hundred to share with their friends. This is based on user surveys conducted by Applied Recognition Inc. in September 2007.

There are also websites that allow registered users to upload digital photos and digital video and store them on a website for sharing purposes. These are dedicated to this purpose. Examples of these sites include FLICKR™ and PHOTOBUCKET™. The drawback with these sites is that all tagging of photos to identify friends is manual and time consuming; PHOTOBUCKET™ does not allow people tagging in a photo. With FLICKR™, if an average photo contains two people, then it may take 10-15 seconds per photo to tag the people. When that time is multiplied by 100 or 1000, it becomes too time-consuming and the average person just will not perform tagging.

Rapid growth in photo-taking devices is occurring today with the incorporation of digital cameras in most modern cell phones. In fact, more cameras are sold via cell phones today than all dedicated digital cameras combined. This is causing a proliferation in the number of digital images that are uploaded and stored on home computers. Because the average number of digital images exceeds 1000 based on our surveys, the effort is too great to manually tag and properly organize the images for the majority of people.

One company, RIYA™ (www.riya.com), created a product that is web-based for identifying faces in digital photos. This product involved the download of a software module for identifying faces in photos on the user's local computer before uploading these photos to the remote RIYA™ web-based server where the faces were compared with other faces to find matches. This product is a prototype and as such has no automatic photo sharing features based on recognition. It also has no features for enabling the user to correct the inevitable errors that occur in any automated face detection and recognition method.

Prior to 2007, image searches were conducted using text or dates related to the photo such as captions, titles, description, creation date, etc., as opposed to the image content itself. Since then there have been a number of companies that began introducing face detection and recognition in consumer photo applications including: in 2008, Google introduced face recognition into Picasa; Polar Rose application for Flickr in 2009; Apple purchased Polar Rose in 2010 and introduced the feature in iPhoto; Microsoft introduced face recognition their Photo Gallery product in 2010; Facebook introduced face detection in 2010; and in 2010 Sony Ericsson integrated face-recognition software into its photo gallery.

SUMMARY OF THE INVENTION

In one aspect of the present invention, a method for recognizing one or more faces in a digital image is provided, the method characterized by: (a) generating one or more face coordinates corresponding to one or more candidate regions for one or more faces; (b) generating eye coordinates based on the face coordinates; (c) detecting each face using one or more projection images defined by the face coordinates and the eye coordinates; and (d) comparing each projection image with one or more known projection images, wherein a similarity threshold is provided for defining a best match between the projection image and the known projection images.

In another aspect of the present invention, a method for sharing a digital image depicting one or more faces is provided, the method characterized by: (a) linking a plurality of computer terminals to a computer network, each computer terminal associated with an individual; (b) linking the digital image to at least one of the computer terminals; (c) enabling at least one of the computer terminals to initiate a face recognition routine on the digital image, the face recognition routine producing a list of one or more persons whose faces are depicted in the digital image, at least one of the persons being one of the individuals; and (d) enabling at least one of the computer terminals to initiate a sharing routine for disseminating the digital image to the computer terminals associated with the one or more persons.

In another aspect of the present invention, a method for sharing a digital image depicting one or more faces is provided, the method characterized by: (a) linking a plurality of computer terminals to a computer network and a plurality of cloud services with the digital images and metadata stored in a cloud-based data repository. (b) linking the digital image to at least one of the computer terminals; (c) enabling at least one of the computer terminals to initiate a face recognition routine on the digital image, the face recognition routine producing a list of one or more persons whose faces are depicted in the digital image, at least one of the persons being one of the individuals; and (d) enabling at least one of the computer terminals to initiate a sharing routine for disseminating the digital image to the computer terminals associated with the one or more persons.

In another aspect of the present invention, a method for sharing a digital image depicting one or more faces is provided, the method characterized by: (a) linking a plurality of computer terminals to a computer network, each computer terminal associated with an individual and a plurality of cloud services with the digital images and metadata stored on each computer terminal and in a cloud-based data repository. (b) linking the digital image to at least one of the computer terminals; (c) enabling at least one of the computer terminals to initiate a face recognition routine on the digital image, the face recognition routine producing a list of one or more persons whose faces are depicted in the digital image, at least one of the persons being one of the individuals; and (d) enabling at least one of the computer terminals to initiate a sharing routine for disseminating the digital image to the computer terminals associated with the one or more persons.

In another aspect of the present invention, a method for sharing a digital image depicting one or more faces is provided, the method characterized by: (a) linking a plurality of a cameras or smart phones with cameras taking a picture or taking video images and linking a plurality of computer terminals to a computer network, each computer terminal associated with an individual and a plurality of cloud services with the digital images and metadata stored on each computer terminal and in a cloud-based data repository. (b) linking the digital image to at least one of the computer terminals; (c) enabling the cameras or smart phones with cameras to initiate a face recognition routine on the digital image, the face recognition routine producing a list of one or more persons whose faces are depicted in the digital image, at least one of the persons being one of the individuals; and (d) enabling at least one of the computer terminals to initiate a sharing routine for disseminating the digital image to the computer terminals associated with the one or more persons.

In a further aspect of the present invention, a system for recognizing one or more faces in a digital image is provided, the system characterized by: (a) one or more face coordinates corresponding to one or more candidate regions for one or more faces; (b) eye coordinates generated based on the face coordinates; (c) one or more projection images defined by the face coordinates and the eye coordinates; and (d) a similarity threshold for defining a best match between each projection image and one or more known projection images, the best match determining an identity corresponding to each of the one or more faces.

In a still further aspect of the present invention, a system for sharing a digital image depicting one or more faces is provided, the system characterized by: (a) a plurality of computer terminals linked to a computer network, each computer terminal associated with an individual; (b) a digital image operable to be linked to at least one of the computer terminals; (c) a face recognition routine operable to be initiated by at least one of the computer terminals, the face recognition routine producing a list of one or more persons whose faces are depicted in the digital image, at least one of the persons being one of the individuals; and (d) a sharing routine operable to be initiated by at least one of the computer terminals, the sharing routine disseminating the digital image to the computer terminals associated with the one or more persons.

In yet another aspect of the present invention, a method for providing secure targeted advertising is provided, the method characterized by: (a) tracking one or more demographic properties associated with an individual registered to a computer program; (b) retrieving from a first source a list of advertising pointers associated with one or more advertisements targeted based on the one or more demographic properties; (c) retrieving from a second source the one or more advertisements; (d) deleting the one or more demographic properties from the first source; and (e) presenting the advertisements to the individual.

In a further aspect of the present invention, a system for recognizing one or more faces in a digital image is provided, the system characterized by: (a) one or more face coordinates corresponding to one or more candidate regions for one or more faces; (b) eye coordinates generated based on the face coordinates; (c) one or more projection images defined by the face coordinates and the eye coordinates; and (d) a similarity threshold for defining a best match between each projection image and one or more known projection images, the best match determining an identity corresponding to each of the one or more faces.

In a still further aspect of the present invention, a system for sharing a digital image depicting one or more faces is provided, the system characterized by: (a) a plurality of computer terminals linked to a computer network, each computer terminal associated with an individual; (b) a digital image operable to be linked to at least one of the computer terminals; (c) a face recognition routine operable to be initiated by at least one of the computer terminals, the face recognition routine producing a list of one or more persons whose faces are depicted in the digital image, at least one of the persons being one of the individuals; and (d) a sharing routine operable to be initiated by at least one of the computer terminals, the sharing routine disseminating the digital image to the computer terminals associated with the one or more persons.

In yet a further aspect of the present invention, a system for providing secure targeted advertising is provided, the system characterized by: (a) one or more demographic properties associated with an individual registered to a computer program; (b) a first source operable to provide a list of advertising pointers associated with one or more advertisements targeted based on the one or more demographic properties; (c) a second source operable to provide the one or more advertisements; (d) a means for deleting the one or more demographic properties from the first source; and (e) a means for presenting the advertisements to the individual.

In a further still aspect of the present invention, a computer program product for recognizing one or more faces in a digital image is provided, the computer program product characterized by: (a) a computer readable medium including software instructions; and (b) the software instructions for enabling the computer to perform predetermined operations, the predetermined operations including the steps of: (i) generating one or more face coordinates corresponding to one or more candidate regions for one or more faces; (ii) generating eye coordinates based on the face coordinates; (iii) detecting each face using one or more projection images defined by the face coordinates and the eye coordinates; and (iv) comparing each projection image with one or more known projection images, wherein a similarity threshold is provided for defining a best match between the projection image and the known projection images.

In another aspect of the present invention, a computer program product for sharing a digital image depicting one or more faces is provided, the computer program product characterized by: (a) a computer readable medium including software instructions; and (b) the software instructions for enabling the computer to perform predetermined operations, the predetermined operations including the steps of: (i) linking a plurality of computer terminals to a computer network, each computer terminal associated with an individual; (ii) linking the digital image to at least one of the computer terminals; (iii) enabling at least one of the computer terminals to initiate a face recognition routine on the digital image, the face recognition routine producing a list of one or more persons whose faces are depicted in the digital image, at least one of the persons being one of the individuals; and (iv) enabling at least one of the computer terminals to initiate a sharing routine for disseminating the digital image to the computer terminals associated with the one or more persons.

In yet another aspect of the present invention, a computer program product for providing secure targeted advertising is provided, the computer program product characterized by: (a) a computer readable medium including software instructions; and (b) the software instructions for enabling the computer to perform predetermined operations, the predetermined operations including the steps of: (i) tracking one or more demographic properties associated with an individual registered to a computer program; (ii) retrieving from a first source a list of advertising pointers associated with one or more advertisements targeted based on the one or more demographic properties; (iii) retrieving from a second source the one or more advertisements; (iv) deleting the one or more demographic properties from the first source; and (v) presenting the advertisements to the individual.

The present invention, in a further aspect thereof, enables capturing portraits of people whose faces are located in an image. If faces are detected in an image, the computer program herein provided captures the XY coordinates of the location of the face and records this in the database. The computer program may be configured to adjust the size of the face region in order to capture and create a portrait (or thumbnail) of the person. Furthermore the computer program provided herein may automatically adjust the rotation of the face to render the face position vertically for the portrait with eyes on a horizontal plane.

The present invention, in a further aspect thereof, enables the utilization of portraits captured and stored in a database of people whose faces are located in an image. The computer program may select and merge a portrait with an advertisement or a product image for display to the consumer. The computer program may be configured to adjust the size of the portrait to match the size requirements of the advertisement or product image The present invention, in a further aspect thereof, enables hiding of people whose faces are located in an image. The computer program queries the database for the XY coordinates of the location of the face to be suppressed. The user of the computer program may select an image that is used to mask the existing face region. The computer program will overlay the selected image over the face of the selected person—in a single image or all images containing that person—and display the modified image to the consumer. This action may be taken for entertainment purposes or to hide negative memories. The computer program may be configured to adjust the size of the portrait to match the size requirements of the selected face size to hide. The computer program may store the modifications in metadata or apply the changes permanently to the original photo. The edges of the overlayed (replacement) image may be adjusted to match color, intensity, brightness, texture and other characteristics to blend into the original image and be more visually appealing.

Yet another aspect of the present invention enables the display of faces or portraits captured from photos in historical order. The computer program enables the capturing of portraits from images. The computer also tracks the date of the photo either from file information, EXIF (metadata) information or the user of the computer program may optionally specify a date for an image such as is required for scans of older non-digital photos. The computer program employs date data from photos correlated to portraits captured from such photos to arrange the display of the portraits according to date. The computer program can subsequently use photo morphing techniques to generate and display an animation the evolution of a person's face over time.

Yet another aspect of the present invention enables the faces or portraits captured from photos to be utilized as content for games and exercises. The computer program enables the capturing of portraits from images. The computer program also maintains a database of people in the photos and the relationships between people. The computer program, using such data, correlates the user of the program ("the player") with photos and portraits captured from such photos to arrange the display of said photos and portraits customized based on the player of the game or exercise. Such customization could be a simple as a slide show of the photos based on the relationship. The customization could also be games such as those useful for people with Alzheimer's or Dementia where personal photos and relationships can be presented to the Alzheimer patient as a game or exercise. This category of treatment is generally known as photo reminiscence therapy. The computer program using the index of photos and portraits extracted from photos retrieve such photos and portraits based on database queries and embeds selected images into games and exercises.

The present invention, in a further aspect thereof, facilitates the creation of a family tree as an index for the photos. The computer program queries the database for all portraits related to a given user and then presents the same to the user. The user of the computer program then selects the portraits and drags them on to a specific node in the family tree to add a new relationship. The computer program will dynamically spawn additional relationships as the user drags new portraits of relatives on to the family tree diagram. Once all portraits for a given family have been added to the family tree it is complete and then becomes a dynamic index for the consumer to display and locate photos. Optionally the same tree format can be used to connect friends together and show the (self-defined) relationships between different categories of friends. Example would be co-workers, high school friends, college friends, etc.

The present invention, in a further aspect thereof enables the use of group portraits to act as an index for the photos. This is of particular interest to any organization of people. Typically organizations maintain group photos by year. For example a sports team will have a team photo displaying the players for every season. A scout troop, orchestra, class photo, club etc. will typically use the same approach. The computer program enables the use of group photos and the resultant identification of subjects in said photos to act as an index to photos containing individuals within the group. This enables the organization and structuring of photo displays based on year/season as well as by group members, and group member subsets.

Yet another aspect of the present invention enables the displays of faces or portraits of missing children, FBI most wanted and similar requirements to find a person. The computer program displays these images to users of the computer program seeking the assistance of users to find the said persons. The computer also delivers the face signatures of the said person being sought and requests the users permission to compare said face signature with their personal database and report potential matches. Should there be a potential match the user will be presented with such potential match and can optionally notify the respective authority of such potential. This could enable the organization to determine a recent or current location of the individual. It could also enable the organization to determine the name of an individual, since the individual's name may be listed in one or more of the user's known persons list.

In accordance with an aspect of the present invention, there is provided a method performed by at least one computer, the method comprising: detecting at least one face in at least one digital image; determining and storing area co-ordinates of a location of the at least one detected face in the at least one digital image; applying at least one transformation to the at least one detected face to create at least one portrait of the at least one detected face; rotating the at least one portrait at least until the at least one portrait is shown in a vertical orientation and a pair of eyes of the at least one face shown in the at least one portrait are positioned on a horizontal plane; and storing the rotated at least one portrait.

In accordance with an aspect of the present invention, there is provided a system comprising at least one computer comprising at least one processor and a non-transitory computer readable memory comprising processing instructions, that when executed by the at least one processor, cause the computer to: detect at least one face in at least one digital image; determine and store area co-ordinates of a location of the at least one detected face in the at least one digital image; apply at least one transformation to the at least one detected face to create at least one portrait of the at least one detected face; rotate the at least one portrait at least until the at least one portrait is shown in a vertical orientation and a pair of eyes of the at least one face shown in the at least one portrait are positioned on a horizontal plane; and store the rotated at least one portrait.

In accordance with an aspect of the present invention, there is provided a method performed by at least one computer, the at least one computer comprising or interfacing with a database, the database comprising a plurality of portraits, each portrait associated with an identified person shown in the respective portrait, the method comprising: displaying the respective portrait of at least one identified person associated with a user; displaying a visual representation of at least one personal relationship to the user; assigning at least one of the displayed portraits to at least one of the displayed personal relationships, in accordance with a received user input; and storing the personal relationship assignments in the database.

In accordance with an aspect of the present invention, there is provided a method performed by at least one computer, the at least one computer comprising or interfacing with a database of portraits and digital images, each portrait associated with an identified person shown in the respective portrait, the method comprising: displaying at least one of the digital images; cross-referencing the displayed at least one digital image with the database of portraits to create a list of at least one identified person shown in the at least one digital image; indexing at least a subset of the digital images in accordance with the list of at least one identified person; and in accordance with a user input selecting at least one of the identified persons from the displayed at least one digital image, displaying at least one of the respectively indexed digital images.

In accordance with an aspect of the present invention, there is provided a method performed by at least one computer, the at least one computer comprising or interfacing with a database of portraits, each portrait associated with an identified person shown in the respective portrait, the method comprising: receiving at least one unidentified portrait; comparing face signature of the at least one unidentified portrait against face signatures of portraits of identified persons known to the user; in accordance with a positive result of the comparing, prompting the user for confirmation of the positive result; and in accordance with the confirmation, associating the at least one unidentified portrait with the at least one identified person confirmed by the user and storing the at least one unidentified portrait in the database.

In accordance with an aspect of the present invention, there is provided a method performed by at least one computer, the at least one computer comprising or interfacing with a database of digital images and respective metadata identifying a name of at least one identified person shown in the respective digital image, the method comprising: selecting one of the identified persons from the database; determining a count of a total number of digital images where the identified person appears; for each identified person shown in at least one of the digital images with the selected identified person, determining a count of a total number of digital images where the respective identified person appears with the selected identified person; and displaying a visual representation comprising: a first node representing the selected identified person and the respective count of the total number of digital images where the identified person appears; for each identified person shown in at least one of the digital images with the selected identified person, a second node representing the respective identified person shown in at least one of the digital images with the selected identified person, each respective node further comprising a visual representation of the respective count of the total number of digital images where the respective identified person appears with the selected identified person; and a link between the first node and each second node.

In accordance with an aspect of the present invention, there is provided a method performed by at least one computer, the at least one computer comprising or interfacing with a database of digital images and respective metadata identifying a name of at least one identified person shown in the respective digital image, the method comprising: selecting one of the identified persons from the database; determining at least one first identified person shown in at least one of the digital images together with the selected identified person; and displaying a visual representation comprising: for each first identified person, a first tier node representing the selected identified person and the respective first identified person being shown in at least one of the digital images together; and for each first identified person, a second tier node representing the respective first identified person being shown in at least one of the digital images without the selected identified person.

In accordance with an aspect of the present invention, there is provided a method performed by at least one computer, the at least one computer comprising or interfacing with a database of portraits, each portrait associated with an identified person shown in the respective portrait, the method comprising: selecting one of the identified persons from the database; ordering a plurality of the portraits associated with the selected identified person based at least partly on date metadata associated with each respective portrait; displaying a visual representation comprising: a timeline; and an arrangement of the plurality of the portraits along the timeline in accordance with the respective ordering.

In accordance with an aspect of the present invention, there is provided a method performed by at least one computer comprising or interfacing with a database of digital images and respective metadata identifying a date of the respective digital image, a plurality of the digital images showing at least one respective unidentified person ("unidentified digital images"), the method comprising: sorting the unidentified digital images by the respective date metadata; assigning a respective clustering token to each of the unidentified digital images, wherein the assigning comprises, in accordance with a determination that a subset of the unidentified digital images each show a common unidentified person, assigning a common respective clustering token to each of the unidentified digital images of the subset; grouping the unidentified digital images by respective clustering token; receiving a new digital image and respective metadata identifying a date of the respective new digital image, the new digital image comprising a new unidentified person; performing at least one comparison of the new unidentified person to the at least one respective unidentified person of the plurality of the digital images in an order, wherein for each group of unidentified digital images, performing only a single comparison of the new unidentified person to the respective common unidentified person; and assigning a clustering token to the new digital image in accordance with the comparison performing resulting in a determination of the new unidentified person common to a respective one of the groups of unidentified digital images.

In accordance with an aspect of the present invention, there is provided a method of suggesting an identification of an unidentified person in a received digital image, the method performed by at least one computer comprising or interfacing with a database of portraits and associated digital images, each portrait associated with an identified person shown in the respective portrait, the method comprising: determining that respective portraits of at least two identified persons shown in one of the digital images satisfy a comparison threshold with a portrait of the unidentified person determined from the received digital image; suggesting an identification of the unidentified person as the respective one of the at least two identified persons having a respectively associated portrait that is determined to be a closest match to the portrait of the unidentified person from amongst the at least two identified persons; and excluding a remainder of the at least two identified persons from being subsequently suggested from any other one of the digital images as an identification of the unidentified person.

In accordance with an aspect of the present invention, there is provided a method of suggesting an identification of an unidentified person in a received digital image, the method performed by at least one computer comprising or interfacing with a database of portraits and associated digital images, each portrait associated with an identified person shown in the respective portrait, the method comprising: determining that a respective portrait of at least one identified person shown in at least one of the digital images satisfies a comparison threshold with a portrait of the unidentified person determined from the received digital image; in accordance with the determined at least one of the digital images associated with metadata comprising a date corresponding to date metadata associated with the received digital image, suggesting an identification of the unidentified person as the at least one identified person.

In accordance with an aspect of the present invention, there is provided a method of suggesting an identification of an unidentified person in a received digital image, the method performed by at least one computer comprising or interfacing with a database of portraits and associated digital images, each portrait associated with an identified person shown in the respective portrait, the method comprising: in accordance with a determination that the received photo comprises at least one identified person associated with a defined group, suggesting an identification of the unidentified person based at least partly on a determination that a respective portrait of at least one identified person associated with the defined group satisfies a comparison threshold with a portrait of the unidentified person determined from the received digital image.

In accordance with an aspect of the present invention, there is provided a method of suggesting an identification of an unidentified person in a received digital image, the method performed by at least one computer comprising or interfacing with a database of portraits and associated digital images, each portrait associated with an identified person shown in the respective portrait, the method comprising: determining that a respective portrait of at least one identified person shown in at least one of the digital images satisfies a comparison threshold with a portrait of the unidentified person determined from the received digital image; in accordance with the determined at least one of the digital images associated with metadata comprising: a date corresponding to date metadata associated with the received digital image; and a location within a predetermined distance threshold of location metadata associated with the received digital image; suggesting an identification of the unidentified person as the at least one identified person.

In accordance with an aspect of the present invention, there is provided a method of suggesting an identification of an unidentified person in a received digital image, the method performed by at least one computer comprising or interfacing with a database of portraits and associated digital images, each portrait associated with an identified person shown in the respective portrait, the method comprising: determining that a respective portrait of at least one identified person shown in at least one of the digital images satisfies a comparison threshold with a portrait of the unidentified person determined from the received digital image; determining that the received digital image is associated with an event, based at least partly on metadata associated with the received digital image; in accordance with the determined at least one of the digital images being associated with the event, suggesting an identification of the unidentified person as the at least one identified person.

In accordance with an aspect of the present invention, there is provided a method of suggesting an identification of an unidentified person in a received digital image, the method performed by at least one computer comprising or interfacing with a database of portraits and associated digital images, each portrait associated with an identified person shown in the respective portrait, the method comprising: determining that a respective portrait of at least one identified person shown in at least one of the digital images satisfies a comparison threshold with a portrait of the unidentified person determined from the received digital image; extracting non-portrait visual information from the determined at least one of the digital images; in accordance with a determination of the extracted non-portrait visual information satisfying a comparison threshold with non-portrait visual information from the received digital image, suggesting an identification of the unidentified person as the at least one identified person.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Embodiments will now be described, by way of example only, with reference to the attached figures, wherein:

FIG. 24 illustrates copying the image of the face from a photo adjusted in terms of size and rotation and embedding the same in to an advertising message or in to a photo of a product.

FIG. 25 illustrates using an image to overlay on a photo over the face of a subject to hide negative memories.

FIG. 26 illustrates the display of faces captured from photos in historical order.

FIG. 31 illustrates the matching of face signatures to find people who look alike.

Figure 1:
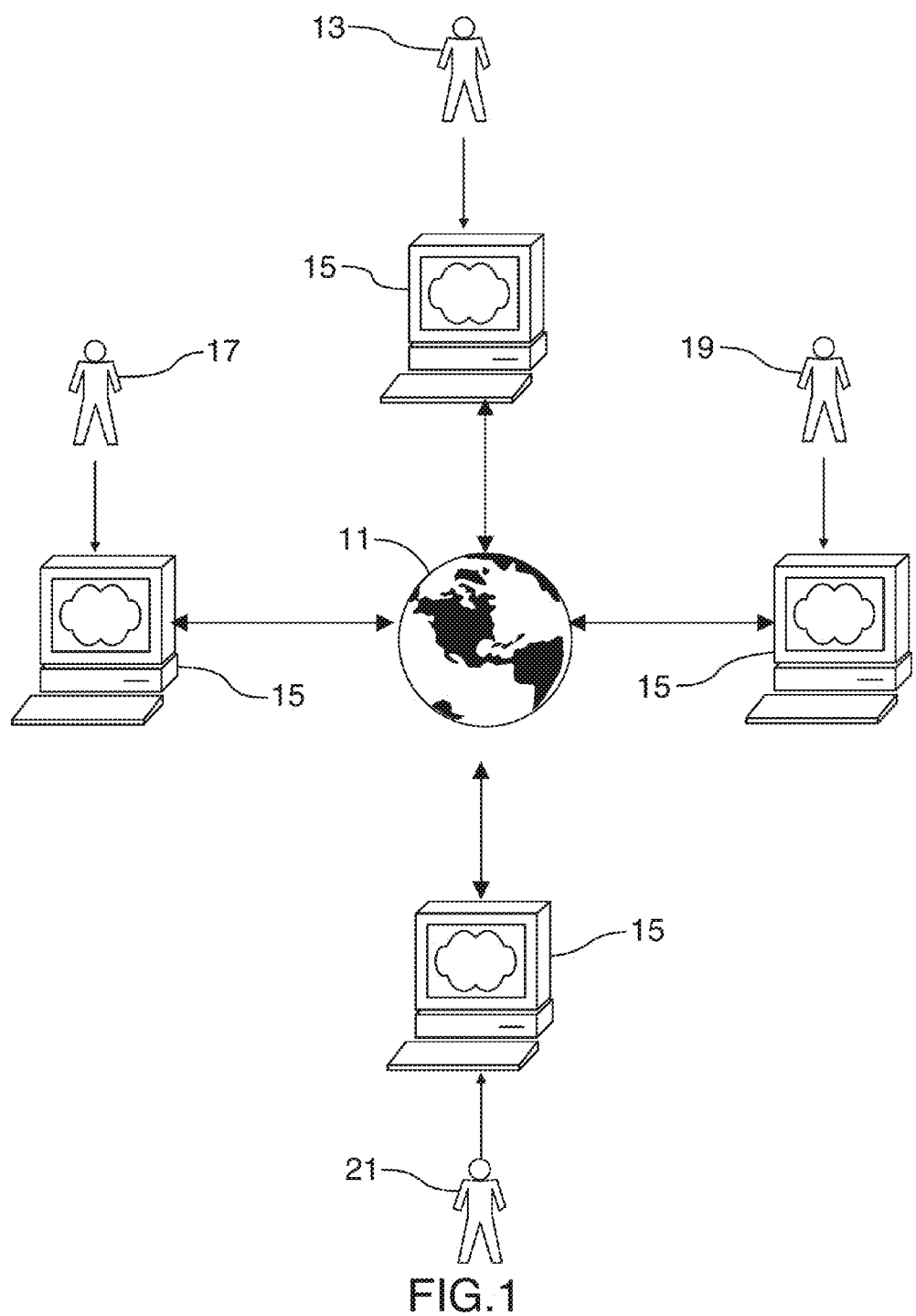
FIG. 1 illustrates a particular embodiment of the system of the present invention incorporating a social network service to perform targeted distribution of photos.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

Overview

The present invention, in one aspect thereof, provides a networked computer architecture enabling the automatic distribution of images relating to a plurality of individuals operating computer systems on the network.

The present invention, in another aspect thereof, provides a computer program operable to enable each of the individuals to interface with the networked computer architecture herein provided for sharing information including images. The computer program enables the individuals to upload images including images having depictions of the faces of one or more persons. The computer program may perform a face detection technique to detect the one or more faces in the image, which may result in the generation of one or more face signatures, each face signature corresponding to one of the faces. The computer program may then access a database, wherein the database links face signatures with a list of known persons, each known person being associated with one or more face signatures. Each detected face signature may be provided to the individual as associated to the corresponding known person, or where the face signature is not associated with any known person, that information can be provided by the individual. The individual may be provided a means to confirm the association between a face signature and a known person.

The present invention, in yet another aspect thereof, provides a novel method for generating face signatures based on faces depicted in images. Further provided is a means for reducing error rates in associating recognized face signatures with one or more face signatures linked to a database.

The present invention, in a further aspect thereof, enables the automatic selective distribution of images depicting faces. If the faces detected in the images are associated with a person that interfaces with the networked computer architecture herein provided, the computer program herein provided may automatically transmit the image to the person's computer for presentation to the person. It should be noted that the terms "photo" and "image" are used interchangeably herein.

The present invention, in a further still aspect thereof, provides a novel advertising method that is operable with the networked computer architecture herein provided.

Networked Computer Architecture

The present invention, in one aspect thereof, provides a networked computer architecture enabling the automatic distribution of images relating to a plurality of individuals operating computer systems on the network. FIG. 1 illustrates an example implementation of the networked computer architecture of the present invention. A plurality of individuals may each connect to the Internet (11) through computer terminals operable to access the Internet (11). The Internet (11) connection enables the transmission and reception of digital data from Internet connected devices, each of which may be operable as provided below.

Figure 15:
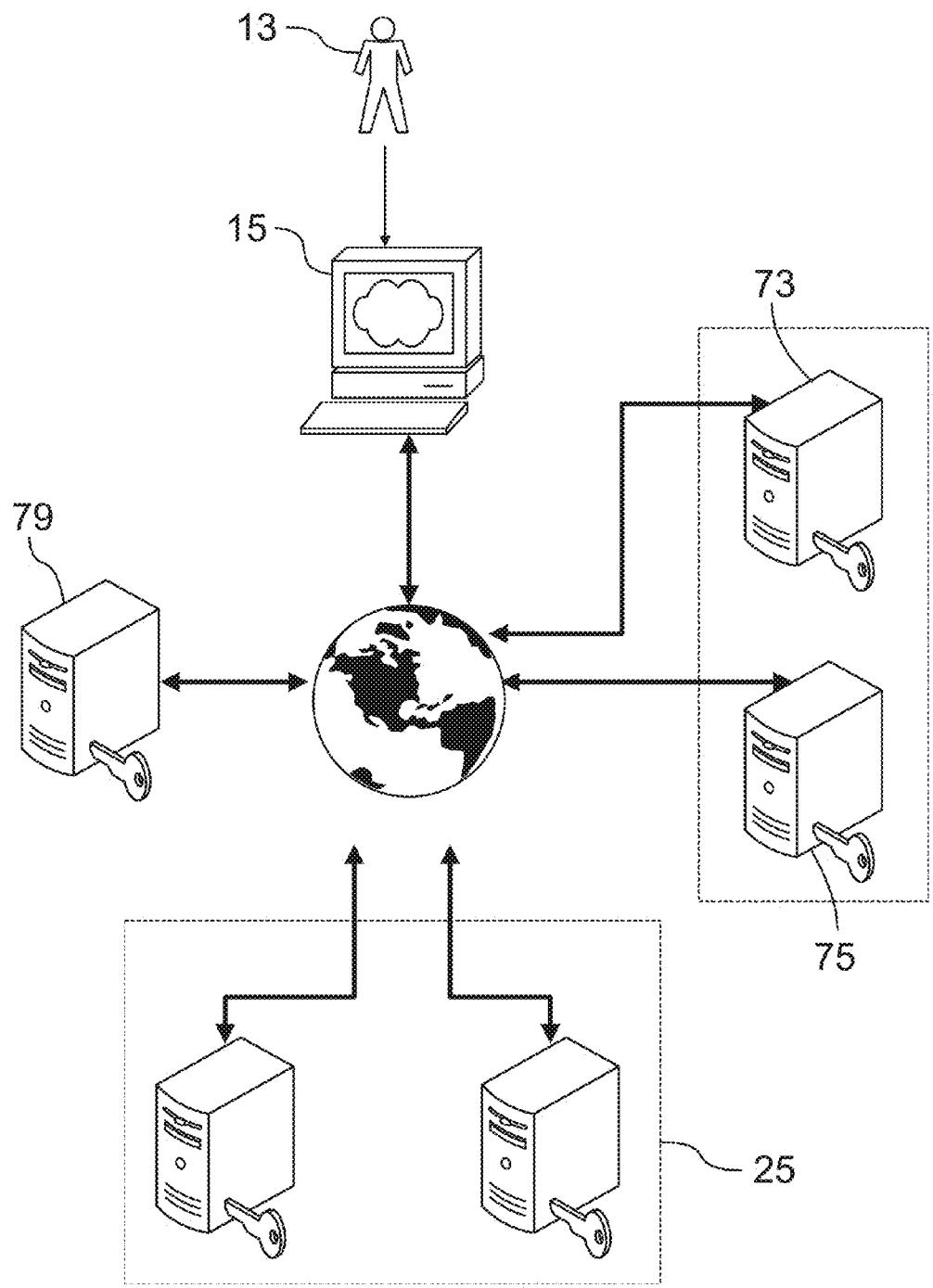
FIG. 15 illustrates an example configuration of the system of the present invention.

The present invention, in another aspect thereof, provides a computer program operable to enable each of the individuals to interface with the networked computer architecture herein provided. FIG. 15 illustrates an example configuration of the system of the present invention. The user (13) of the invention may register, download, and install the computer program to its computer system (15).

The computer program may, in one aspect thereof, allow the user (13) to invite and establish relationships with other users of the invention. The computer program may, in another aspect thereof, request ads from a set of advertising web servers (23) that deliver ads to the computer program for display to the user (13) on various portions of a graphical user interface ("GUI"). The computer program may, in yet another aspect thereof, transmit photos and metadata related to those photos to other users or to third-party websites the meta data can be stored in the EXIF or similar file header or be embedded inside the jpg or similar image file format in a manner similar to stenographic techniques (25) such as FLICKR™ and FACEBOOK™. These third-party websites (25) may encourage the use of their websites by publishing application programming interfaces (API's) to enable connection from client software or other web-based applications to their service.

The components of the computer program enabling implementation of the present invention may include:

A processing engine that may run as a background process on the operating system. It may scan for new digital photos that the user has uploaded or copied to the specified folders on the local and/or a remote or cloud computer that are being monitored for photos, or it may automatically detect new photos when removable media, such as a memory card, is inserted into the computer. When a new photo is detected the face detection, eye detection and face recognition steps may be performed, as described more fully below. The results may be stored in a database such as the database described more fully below. It should be noted that the processing engine could be executed on a remote computer or cloud service computer, such as where the computer program of the present invention is provided as a service, which may use the software-as-a-service model.

A GUI that may provide a user with the ability to navigate photos, train the application by identifying known persons, edit and correct the automatic results of the engine, create and modify albums based on search criteria, add peer group members, and send albums to third party websites, each such action described more fully below.

A database (such as a SQL database, for example) that may be located on a user's computer or on a remote computer or cloud computer, and may contain the results of the face detection, eye detection and face recognition steps described below. The database may also contain metadata for photos and people as well as relationships between known persons and the associated face images.

Figure 21:
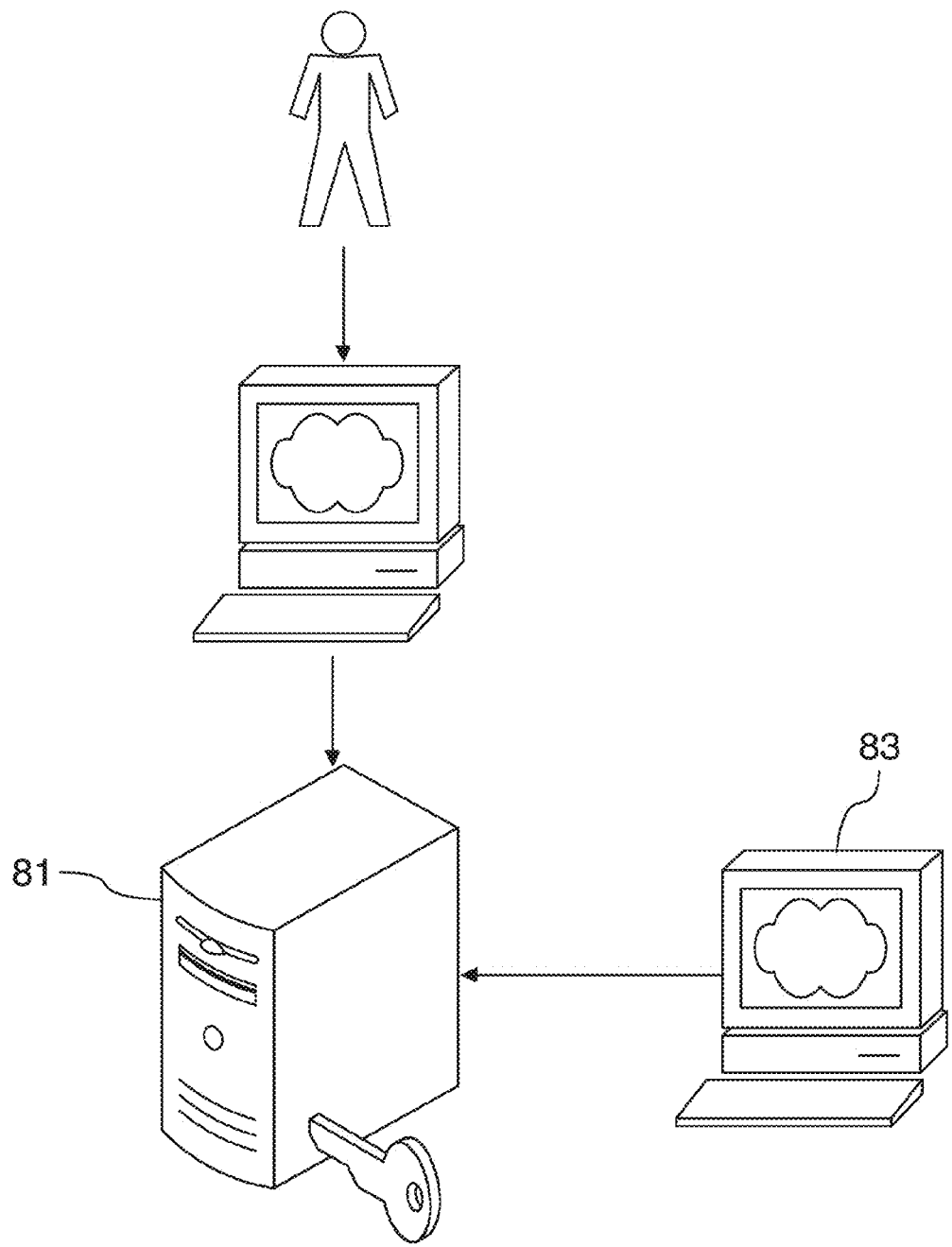
FIG. 21 illustrates one aspect of the present invention wherein a remote web browser or mobile device is enabled to access a proxy server, providing a connection to the functions of the present invention.

The GUI, the processing engine, and the database may be provided on one or more devices. FIG. 21 illustrates one aspect of the present invention wherein a remote web browser or mobile device (83) is enabled to access a proxy server (81), providing a connection to the functions of the present invention. The GUI may be provided on a mobile device (83) such as a PDA or cell phone and perform the face detection and recognition and indexing and transmit information back and forth to a remote engine running on a website, server, or a user's desktop or laptop computer. In such an implementation, the PDA or cell phone may be provided with a facility for performing face recognition, browsing of images and a facility for uploading images that are captured using a camera incorporated on the device. Uploading may be performed in accordance with the general uploading processes described more fully below.

The steps performed by the user using the computer program may include:
  Specifying the folder(s) to monitor for new digital photos.
  Training the application by identifying the names and metadata associated with faces found in the digital photos.
  Correcting the errors made by the application; both false positives and false negatives.
  Creating albums (collections of photos) by specifying search criteria including date ranges, Boolean combinations of known persons (via face selection), EXIF tags, and general tags. Optionally, the user may drag and drop individual photos or groups of photos to the album.
  Once an album is created the user may then specify various output options including:
    Third party websites such as Flickr™ and Facebook™.
    Slideshow formats such as Microsoft™ Powerpoint™ files.
    Document formats such as Adobe™ PDF™ files.
  Inviting other application users to join in a peer group, specifying the options related to those relationships in the peer group, and accepting invitations to join a peer group for another user.

The networked computer architecture may also include one or more servers to enable techniques described herein. For example, the face detection and recognition method provided herein may be enabled by the servers. The servers, which may be provided on one or more server systems, may include server programs that enable the functions of the servers, including one or more of the following:
  A registration server having a database enabling association of a list of email addresses, associated dates, and other administrative data. The registration server may present an interface such as a webpage to the user for collecting the registration data and then writing this data to the database. The user may then be given a means for installing the computer program described above, such as by being provided with an URL for downloading the client software.

An ad matching server may accept encrypted requests containing the demographic information for the user. This server may also accept ads in a plurality of formats (such as .JPG, .GIF, .SWF, etc.) from advertisers. For each ad submitted to the application the target demographic for the ad may also be recorded. The ad requests may be matched with the inventory of ads based on the target demographic data. Pointers (unique ID #'s) may be returned for matching ads to the requesting client software.

An ad delivery server may accept encrypted requests containing pointers to ads. The application may find the ad referenced by the pointer and return that ad to the requesting client software.

Peer Groups

Referring again to FIG. 1, a first user (13) of the invention may download the computer program from a website or be provided with any other installation means for the installing the computer program. The first user (13) may install the computer program, which may enable the system of the present invention on their laptop or desktop computer system (15) running an operating system (such as the MICROSOFT™ WINDOWS™, APPLE™, or LINUX™ operating system) or the program may be run within a browser such as Microsoft™ Internet Explorer™, Mozilla™ Firefox™, Google™ Chrome™, Apple™ Safari™ or mobile browsers and as a result the program is executed within the browser and on the back-end webservers.

The first user (13) may define friends (17) in a peer group by specifying their email address to the invention. The computer program may subsequently send an email invitation requesting that a friend (17) also download or otherwise enable the installation of the computer program. After installation, a corresponding computer program for the friend (17) may present to the friend (17) a pending request to join the peer group started by the first user (13). The friend (17), who may now be a second user (17), may be required to approve the connection to the peer group. Once approved, the computer program run by the first user (13) and the second user (17) can now exchange photos as well as metadata about those photos and about known persons, in accordance with the image sharing methods herein described.

The peer group may be expanded by the first user (13) or the second user (17) by inviting more people (19, 21) to join the peer group. The second user (17) may also create a new peer group that the first user (13) is not part of, and expand that peer group separately. There may be a "many to many" relationship between people and peer groups. Thus the first user (13) can be a member of multiple peer groups and the second user (17) can be a member of multiple peer groups. This enables the easy sharing of photos with other users based on peer group membership.

As described more fully below, the present invention, in one aspect thereof, enables a known person list. Known persons may optionally be added to one or more peer groups, as described above.

Peer groups may enable sharing of photos, metadata about photos, and known persons. The GUI may enable creation, modification and deletion of peer groups by a user. The GUI may also enable association of a face image or thumbnail of a known person into an existing peer group, for example by enabling a user to drag the face image or thumbnail over an area of the interface, such as a field or icon, representing the peer group. A user could assign a representative face image that is associated with their name and that face image is shared and distributed to show up in all peer group contact lists.

The computer program may generate an invitation each time a friend is added to a peer group. Alternatively, the user may manually add an invitee's metadata to the peer group if the invitee is not part of the known person list. The invitation to an individual may be sent to the invitee via email. For individuals that have installed the computer program of the present invention on their computer system, the email, once received, may prompt the invitee to accept the invitation. Optionally, the individual will be required to enter a code in the computer program to accept the invitation.

If the friend has not yet installed the computer program or is not registered in the cloud service implementation of the present invention on their computer system, the email, once received, may include a link register or to download or otherwise enable installation and activation of the service and may provide directions for installing the computer program on a computer system. Following successful installation of the computer program the new user may be presented with the invitation, and may accept the invitation to join the peer group in accordance with the steps described above.

Once the invitation is accepted by the invitee, the invitee may be added to the peer group. The update may be disseminated over the networked computer architecture to enable the corresponding peer group information to be updated in the computer program of each person associated with the peer group.

In accordance with the face detection technique described below, the peer group may enable automatic selective dissemination of information across the networked computer architecture. The dissemination technique is also more fully described below.

Face Detection

Figure 3:
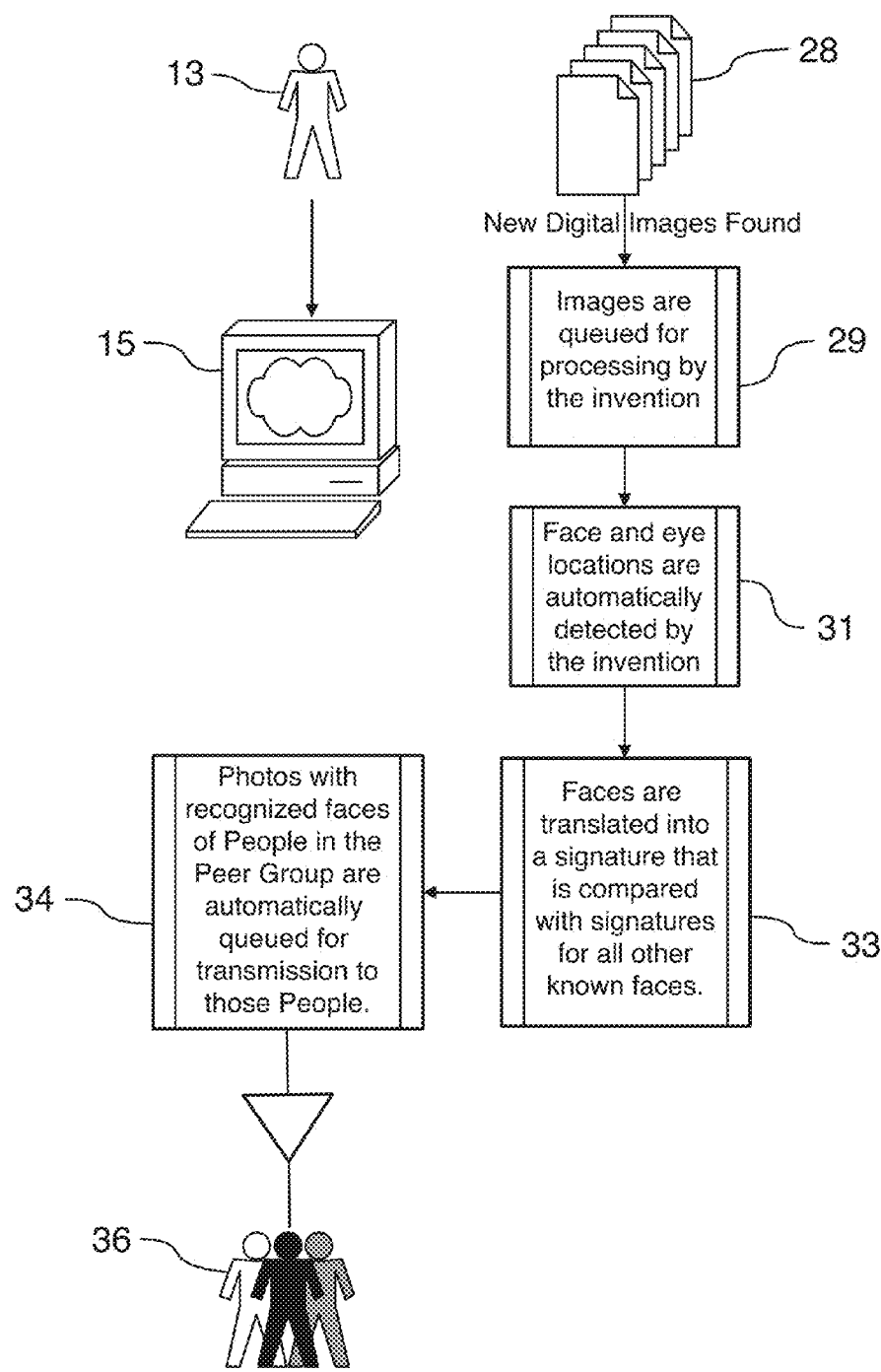
FIG. 3 illustrates the face recognition method of the present invention, in one aspect thereof, for generating face "signatures" that are compared with signatures of known persons.

The present invention, in one aspect thereof, provides a novel method for generating face signatures based on faces depicted in images. FIG. 3 illustrates a face recognition method in accordance with the present invention, in one aspect thereof. A user (13) may provide images to a computer system (15) operable to enable the execution of a computer program. The computer program may monitor file folders associated with the computer system (15) via operating system notifications that may be generated when new files are added or existing files are modified. When new images are found (28) they may be queued (29) for processing.

Faces in the photos may be located (31) by using any one of multiple techniques that may include: generating face coordinates, which may define a bounding box around the face; determining eye coordinates based on the face coordinates; and creating face signatures (33) for the face based on the face and eye coordinates and by using a face signature technique. The face signature technique may be Principal Component Analysis (PCA), which is known to those skilled in the art. The face signatures may be compares to known face signatures (34) and the photos may be automatically and selectively disseminated to other users (36). Further details of these aspects of the invention are provided below.

Figure 4:
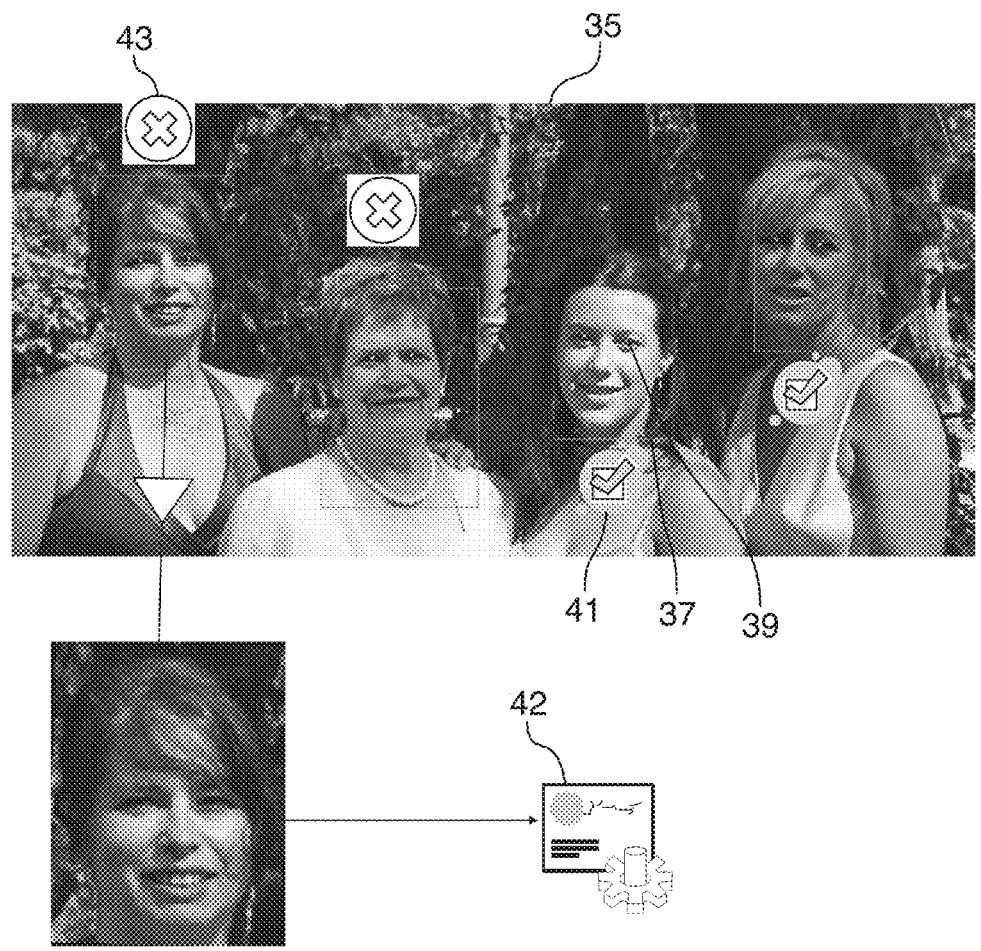
FIG. 4 illustrates linking the results of a face detection, eye detection and face recognition technique in a face database on the storage device of the local computer system.

FIG. 4 illustrates linking the results of a face detection, eye detection and face recognition technique in a face database on the storage device of the local computer system or alternatively can be in a face database on the storage device of the cloud computer system. The results may be the coordinates of the associated object. In the case of face detection, the coordinates may define the outline of the face (37) with top left, top right, bottom left and bottom right pixel locations on the original photo which is referred to as a bounding box. In the case of eye detection, the coordinates may represent the pupil location (35) of the left and right eyes. In the case of face recognition, the result may be a face signature (42).

The graphical user interface (GUI) for the invention may display the face (37) and eye (39) locations on each image (35). As described more fully below, the present invention, in one aspect thereof, provides a list of known persons. If the face signature (42) corresponding to a detected face is associated with a person listed in the known persons list, the GUI may indicate such an association to the user using a graphic notation on or around the image. Otherwise, the GUI may indicate that there is no such association to the user using another graphical notation on or around the image. In the example depicted by FIG. 4, the known faces may be identified with check marks (41) and the unknown faces with the symbol "X" (43).

Initially all faces may be unknown to the system until the user "trains" the invention to recognize faces. The training method may involve the user. The user, via the GUI of the invention, may use the mouse or other input device to identify the face as belonging to a specific person, by clicking anywhere on the visual bounding box surrounding the face and dragging the face over top of the person's name (or an icon representing the person). Alternatively, the user may drag the icon representing that person over top of the target face. In yet another alternative, the user may click anywhere on the visual bounding box and select a function for identifying a previously unknown face, which may enable the user to enter data related to that person such as name, email address and other details, which may collectively be referred to as metadata corresponding to the person. This training step may be performed once for each known person. The signature that was created for the face may then enable comparison of all of the unknown face signatures in the face database with the person identified. Both the method for comparison and the method of face detection, eye detection, and face recognition are described more fully below.

The present invention, in a further aspect thereof, facilitates an optimal training stage by ordering the unknown faces such that the user can identify groups of detected faces that are most likely associated with a single individual. For example, an algorithm could be used to cluster similar faces together based on face signatures. The similarity may be based on certain aspects of their face signatures even when the faces are not already associated with an individual in the face database. Thus a user can identify a cluster of faces as belonging to a particular known person and thereby optimally carry out the training method described above.

The present invention, in a further aspect thereof, facilitates an optimal training by more than one face signature associated with a person thus improves accuracy by supporting multiple poses of a person and addresses changes to the persons face due to aging, glasses or changes to the face such as caused by a beard or mustache.

Association of Faces with Known Persons

Figure 16:
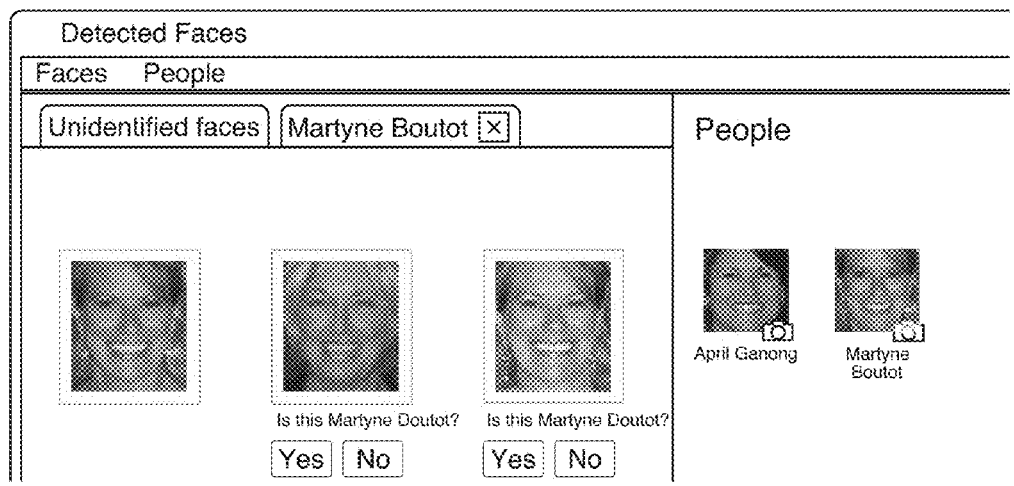
FIG. 16 illustrates an interface for enabling a user to confirm the identity of a face appearing in an image.

FIG. 16 illustrates an interface for enabling a user to confirm the identity of a face appearing in an image. A face signature in an image may be within a similarity threshold to a face signature associated with a known person. In this case, an association may be made between the detected face and the known person. One method of comparing face signatures is described more fully below.

If there is an association between the face and a known person, a further association may be created in the database between the face signature and the known person. Every previously identified face for every known person may be compared with each new face processed by the system. When viewing the faces related to a specific known person, any suspected matches generated by the invention may be displayed and the user may be asked to confirm that the matches are correct.

Over time, as the number of identified faces increases, the overall accuracy of matching new faces with the correct person may increase since there will typically be many different views of a person with each new face. In accordance with the method of comparing face signatures provided herein, the number of false positives therefore typically decreases over time.

Figure 5:
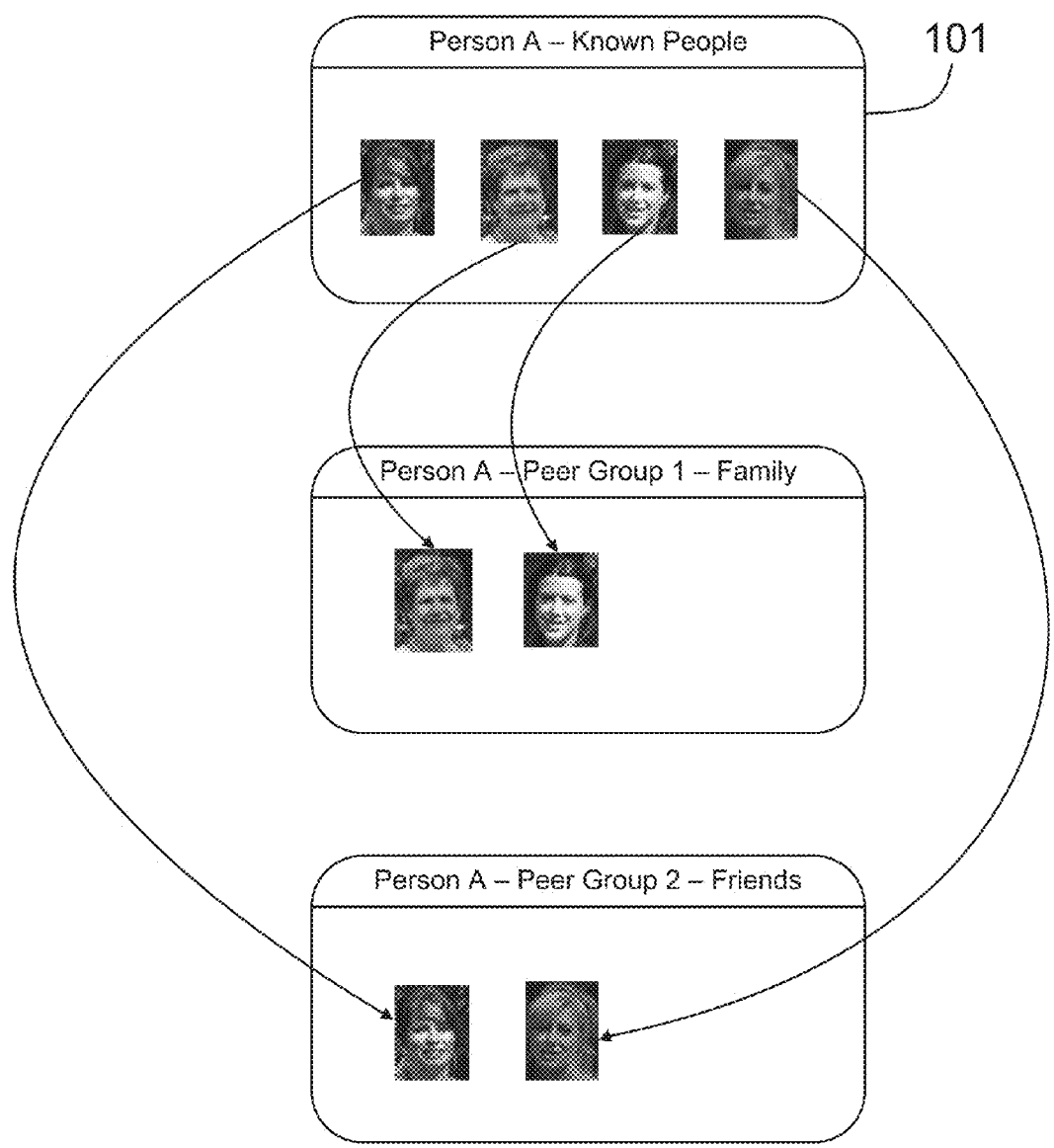
FIG. 5 illustrates how peer groups can grow and evolve over time as the list of known persons grows.

FIG. 5 illustrates how peer groups can grow and evolve over time as the list of known persons grows. The list of known persons (101) grows as the user works with the invention, because the user may continue to associate unknown faces with known persons.

Dissemination

Figure 2:
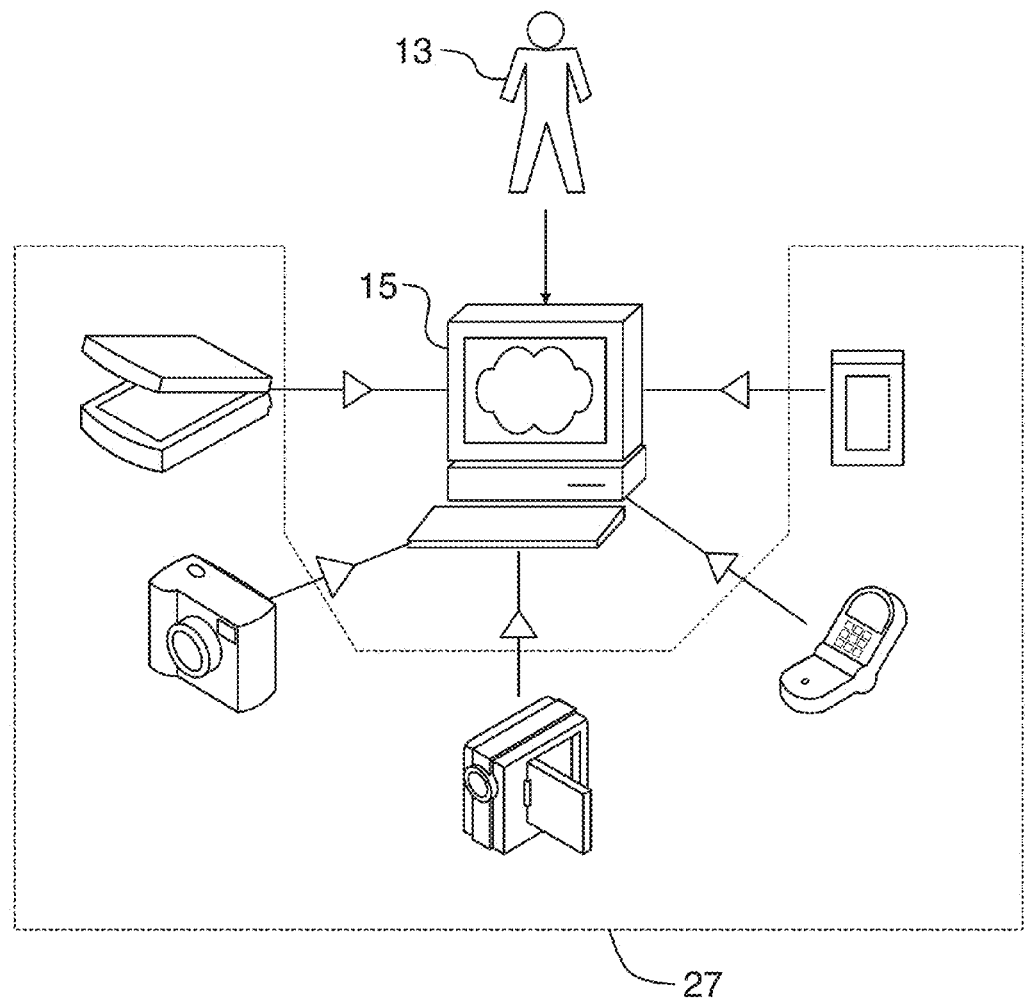
FIG. 2 further illustrates the system illustrated in FIG. 1, wherein users add new digital images from various devices over time.

The present invention, in another aspect thereof, provides a computer program operable to enable each of the individuals to interface with the networked computer architecture herein provided for sharing images. FIG. 2 further illustrates the system of the present invention. A user (13) may capture digital images and periodically copy them from one or more image device storage systems (27) to a computer system (15). The user (13) may configure the computer program to monitor specific file folders on the computer system (15) for new images, by inputting the names of the file folders to the computer program using a GUI as described above.

In accordance with the novel method for face recognition provided by the present invention, the present invention, in one aspect thereof, enables the automatic selective dissemination among a peer group to users whose faces are depicted in images. This is more fully described below.

Detection Optimizations

Figure 6:
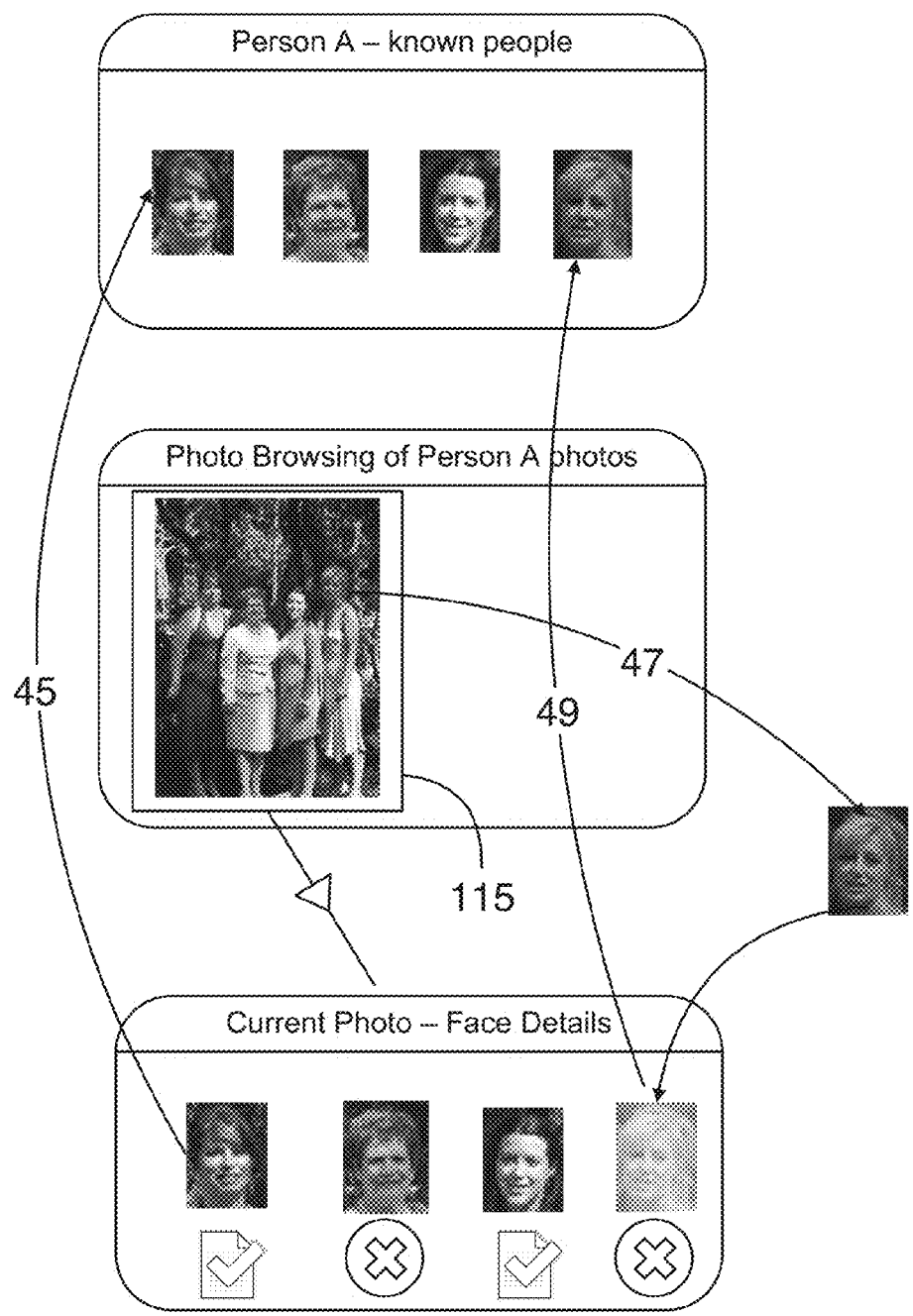
FIG. 6 illustrates potential methods of correcting errors that may result from the automatic face detection, eye detection, and face recognition steps.

The present invention, in one aspect thereof, provides a novel technique for optimizing face detections in accordance with other aspects of the present invention. FIG. 6 illustrates potential methods of correcting errors that may result from the automatic face detection, eye detection, and face recognition steps. The invention uses a novel way of involving the user through the GUI to correct these inevitable errors.

Figure 17:
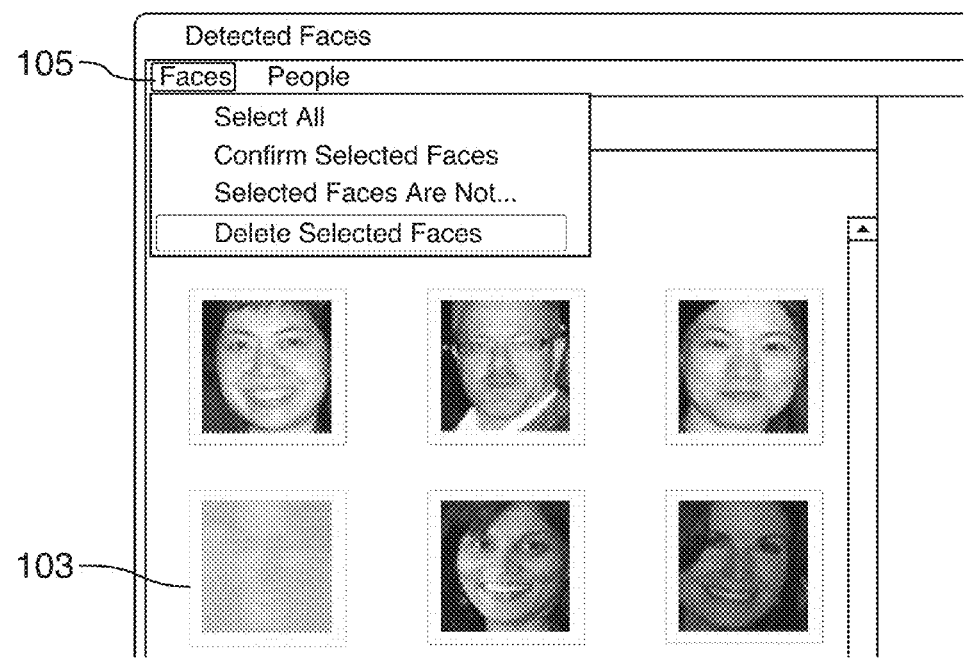
FIG. 17 illustrates a means by which a user may delete false positive face detections in an image.

FIG. 17 illustrates a means by which a user may delete false positive face detections in an image. During the face detection and eye detection phases, there may be false positive errors. These may occur when the face detection technique determines that a face exists even though there is actually no face on the original photo image. To correct these errors the GUI may enable the user to delete false positive errors by moving the face (103) (with the face being identified by a bounding box on the image) over a deletion area (which may be represented by a wastebasket or other representative icon) using a mouse or other input device, by pressing a keyboard's delete key while the face is highlighted, or by selecting a menu option (105) corresponding to deletion of the face.

Figure 18:
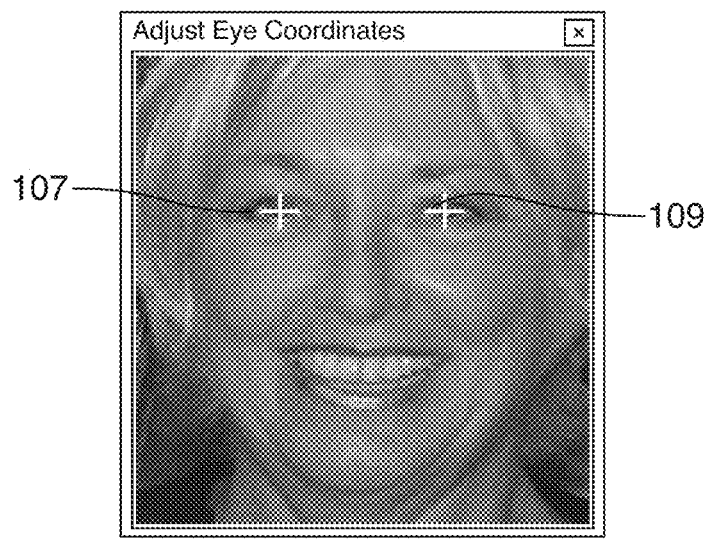
FIG. 18 illustrates a means by which a user may reposition detected eye coordinates corresponding to a face in an image for the purpose of increasing accuracy of the detection algorithm.

FIG. 18 illustrates a means by which a user may reposition detected eye coordinates corresponding to a face in an image for the purpose of increasing accuracy of the detection algorithm. During the face detection and eye detection phases, there may be errors in eye location coordinates (107). The method of the present invention may determine the eye pupil location and display the eye coordinates (107) visually on the image, but the generated coordinates may not be perfect because they may be an approximation in some cases (for example, a face with sunglasses). The GUI may allow the user to manually reposition the eye coordinates (107), for example by moving the icons (109) representing the eye location with a mouse or other input device. In this way, the accuracy and performance of the invention can be increased as the eye coordinates (107) are typically used to generate a face signature for the face. A change in the eye coordinates (107) may therefore generate a change in the face signature that may significantly affect associating signatures with other with known faces. In addition to the use of eye coordinate the method of the present invention may employ an edge detection technique to align face templates with the detected faces in an image. The alignment method provides another method to confirm the face to reduce false positives. This technique could be performed by aligning the top/bottom and left/right sides of the face with the alignment template and generating a numeric measure of confidence.

Figure 22:
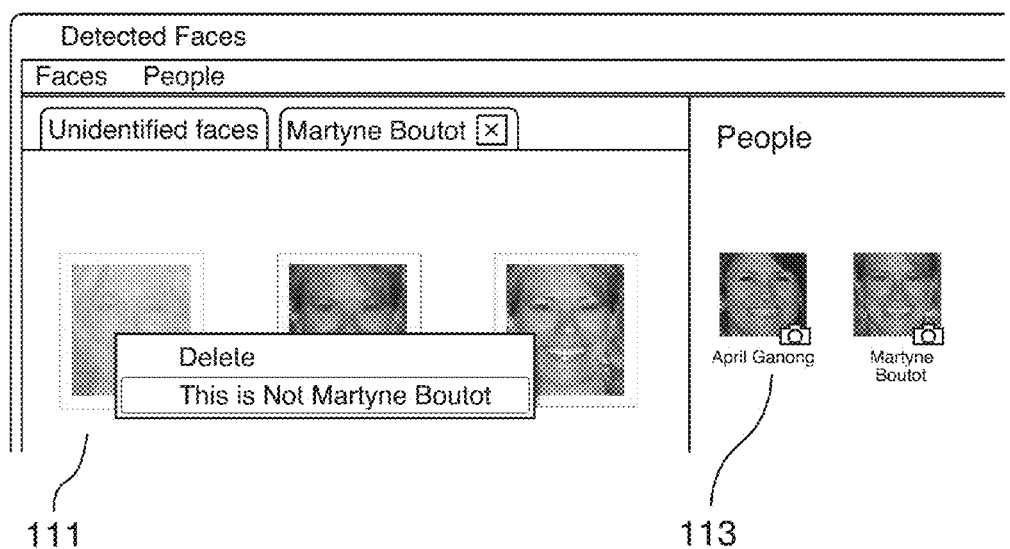
FIG. 22 illustrates deletion of a false positive face detection error.

FIG. 22 illustrates deletion of a false positive face detection error. During the face recognition phase, there may be false positive errors related to incorrect association of a face with a known person. A false positive error may result if the invention matches a face signature to a known person and it is not a correct relationship. The GUI may allow the user to drag the face image (111) (thumbnail) over the face image (thumbnail) of the correct known person (113). The invention may then modify the link in the database to show the new relationship between the face and the known person. The old relationship may also be deleted.

Another category of errors is false negatives. There may be two situations categorized as false negative errors, which are illustrated in FIG. 6:

1) Where the system does not detect a face in an image when there actually is a face (47), the GUI may allow the user to draw a bounding box around the face using a mouse, or other input means, and then place both eye locations by using icons representing the eye location. The system may then use the manually entered information to generate a face signature and perform the face recognition method provided herein. Alternatively, the system may enable the user to manually associate a tag with the face without involving the face detection or recognition process. This manual tagging method may also be used to tag other objects and animals in the images—such as pets—where the human face detection method employed does not result in automatic detection of said object or animal.

Figure 19:
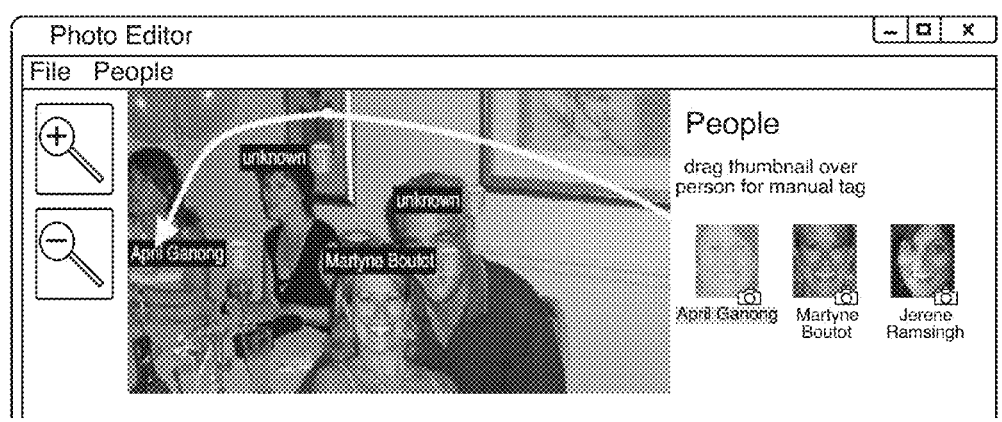
FIG. 19 illustrates the process of manually tagging a face in an image.

2) There may also be a false negative error where the system detects a face but the face signature is not matched with any known face signatures even though it is a face of a known person. This may occur if the difference between the signature for the face and any other face signatures for that particular person are too dissimilar. In this case, the system may not automatically detect the relationship and the face may remain unknown. In this circumstance, the GUI may allow the user to drag (49) the face image over the face image of the known person. By doing this the system may link the face image to the known person in the database. With this assistance from the user, the system now has another face signature that will be used for future comparisons with new and unknown face signatures. This may improve the accuracy of the present invention. FIG. 19 further illustrates the process of manually tagging a face in an image.

Automatic Selective Dissemination of Images

Figure 7:
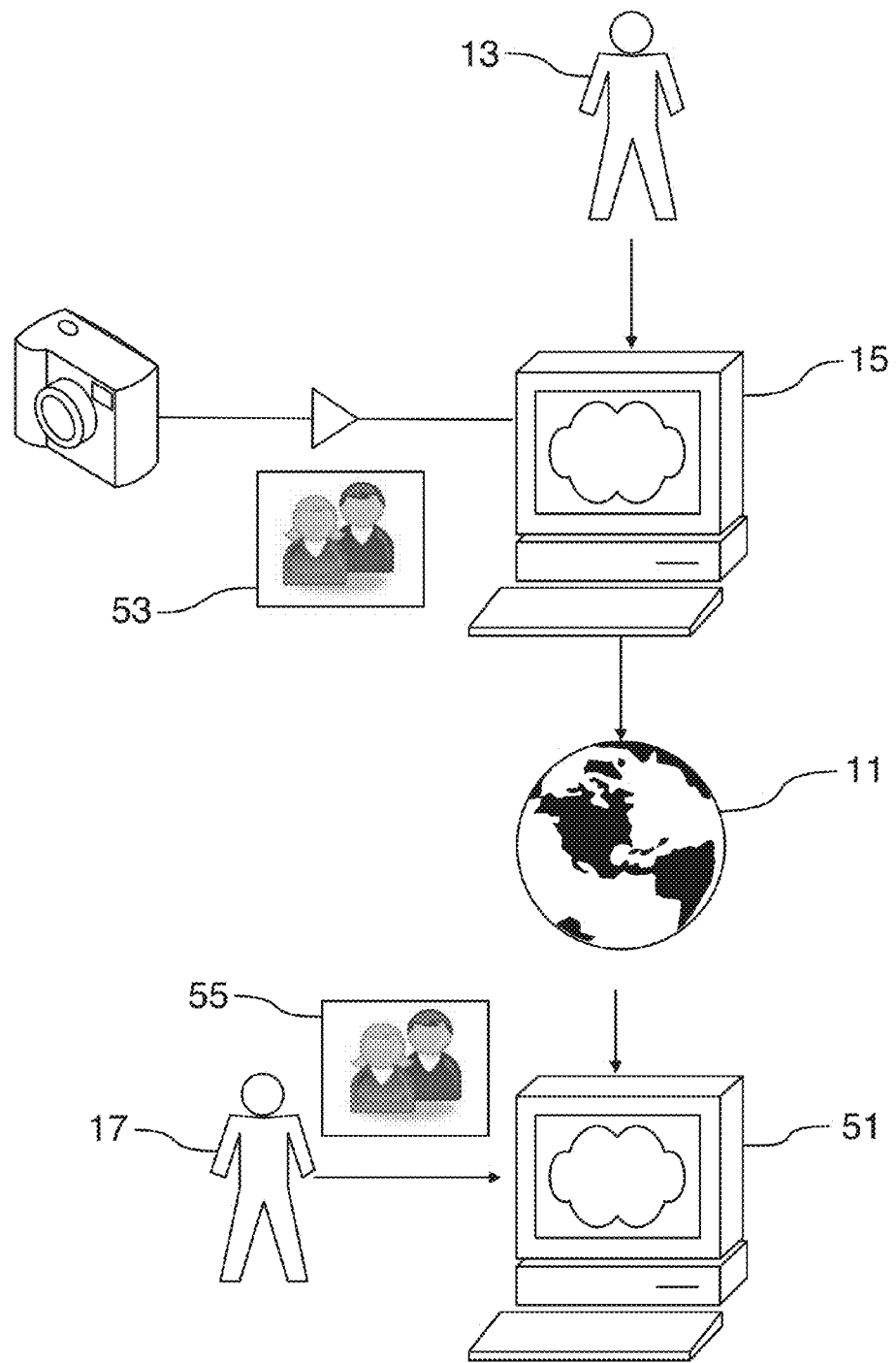
FIG. 7 illustrates a system and method for providing the automatic selective dissemination of photos between users of the invention in the same peer group.

FIG. 7 illustrates a system and method for providing the automatic selective dissemination of photos between users of the invention. When the face of a known person that is a member of a peer group is recognized within a photo (53), the photo (53) may be queued to be transmitted across the Internet (11) in a secure fashion to the peer group member. For example, a first user (13) may upload to their computer system (15) a photo containing the face of a known person that is a second user (17), who is also a peer group member. In this case, when the system determines a face match, the photo (53) may be queued for transmission. Prior to transmission the photo (53) may be reduced to a smaller version and metadata may be included in the digital photo file. The corresponding reduction in size may optimize the use of bandwidth. In a cloud implementation the photo may be physically transferred or the file ownership may be expanded to include the peer group member. The file may or may not be transferred or duplicated.

The next time the second user (17) accesses the computer program on their computer system (51) it may receive a confirmation request showing a reduced image of the original photo and the associated metadata orthe notification could go to the second user via email also with thumbnails included in the body of the email or as attachments to deliver the confirmation request. The second user (17) may be prompted whether they would like a copy of the photo (55) on its computer system (51). If the second user (17) responds affirmatively then the system may copy the full image across the Internet from the first user's computer system (15) to the second user's computer system (55) along with the metadata for the photo (55) and the known faces and signatures from the photo.

Another novel aspect of the present invention uses existing social network service and web-based photo storage sites to share photos with peer group members. The invention may transmit a single photo or group of photos to a target web or cloudbased service. The transmitted photos may already contain metadata from the invention about the people that are in the photos. For example, the social networking site FACEBOOK™ offers the facility to upload photos, share photos, and to manually tag photos to denote which friends are in the photos. The tagging process is manual and time consuming. The present invention may automate such an upload process and eliminate the need to manually tag the photos thereby offering a significant benefit to the social networking user. The present invention may be equally adaptable to other social network service and web-based photo storage sites. As described above, a user may also upload photos directly from a mobile device that incorporates a camera across the Internet.

Yet another novel aspect of the present invention is that the initial list of known persons can be loaded from the user's social networking account to save further time in configuring the system provided by the present invention.

Figure 8:
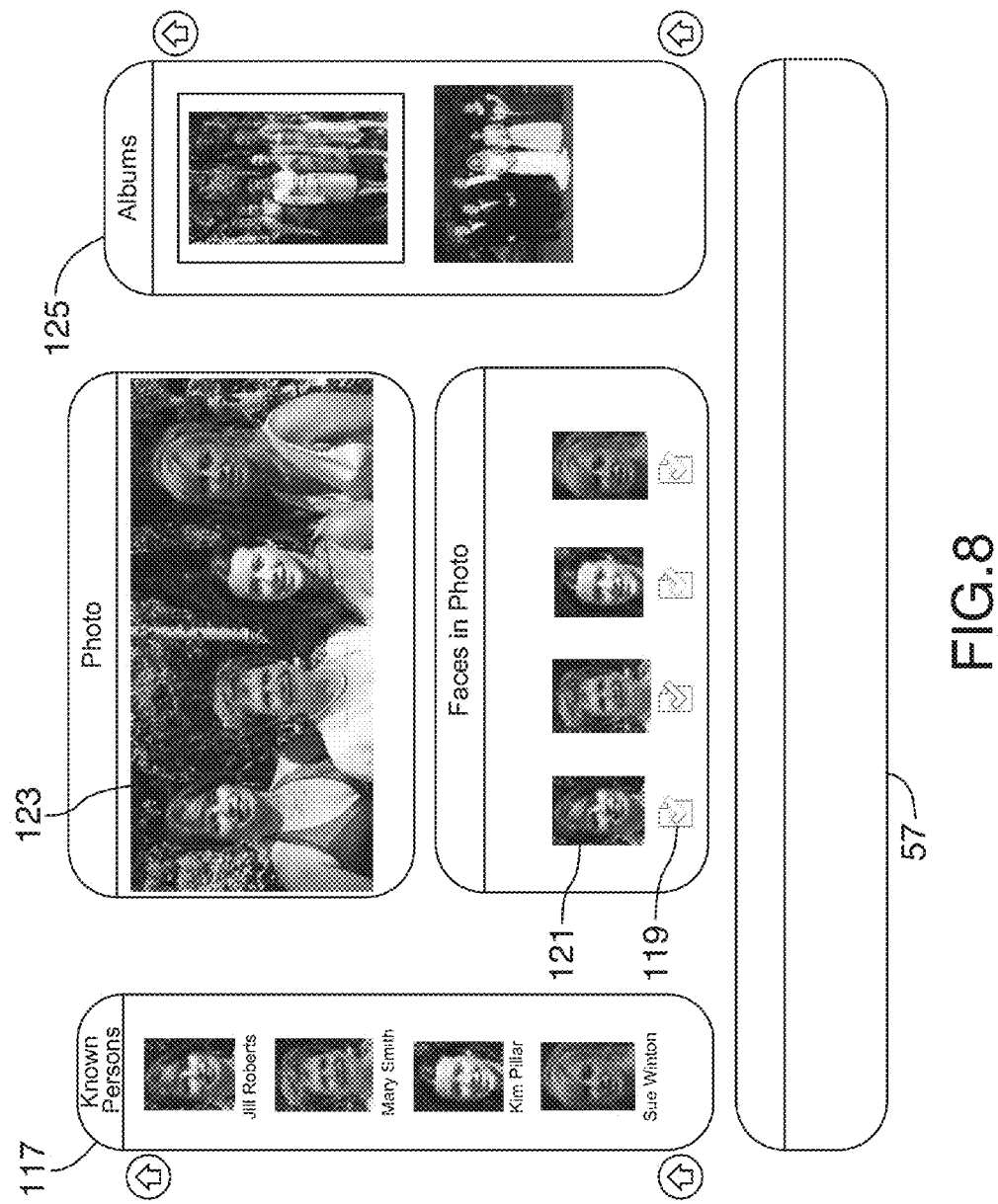
FIG. 8 illustrates an example embodiment of the graphical user interface that may enable browsing of photos and the face database managed by the computer program.

FIG. 8 illustrates an example embodiment of the GUI that may enable browsing of photos and the face database managed by the computer program. In this example a user interface is shown with optional banner advertising (57) that could be sold to advertisers. A user may select a photo (123) from an album (125), and the GUI may display thumbnails (121) corresponding to known persons (117) found in the photo (123). Checkboxes (119) may also be used to indicate the presence of the known persons (117) in the photo (123).

Figure 9:
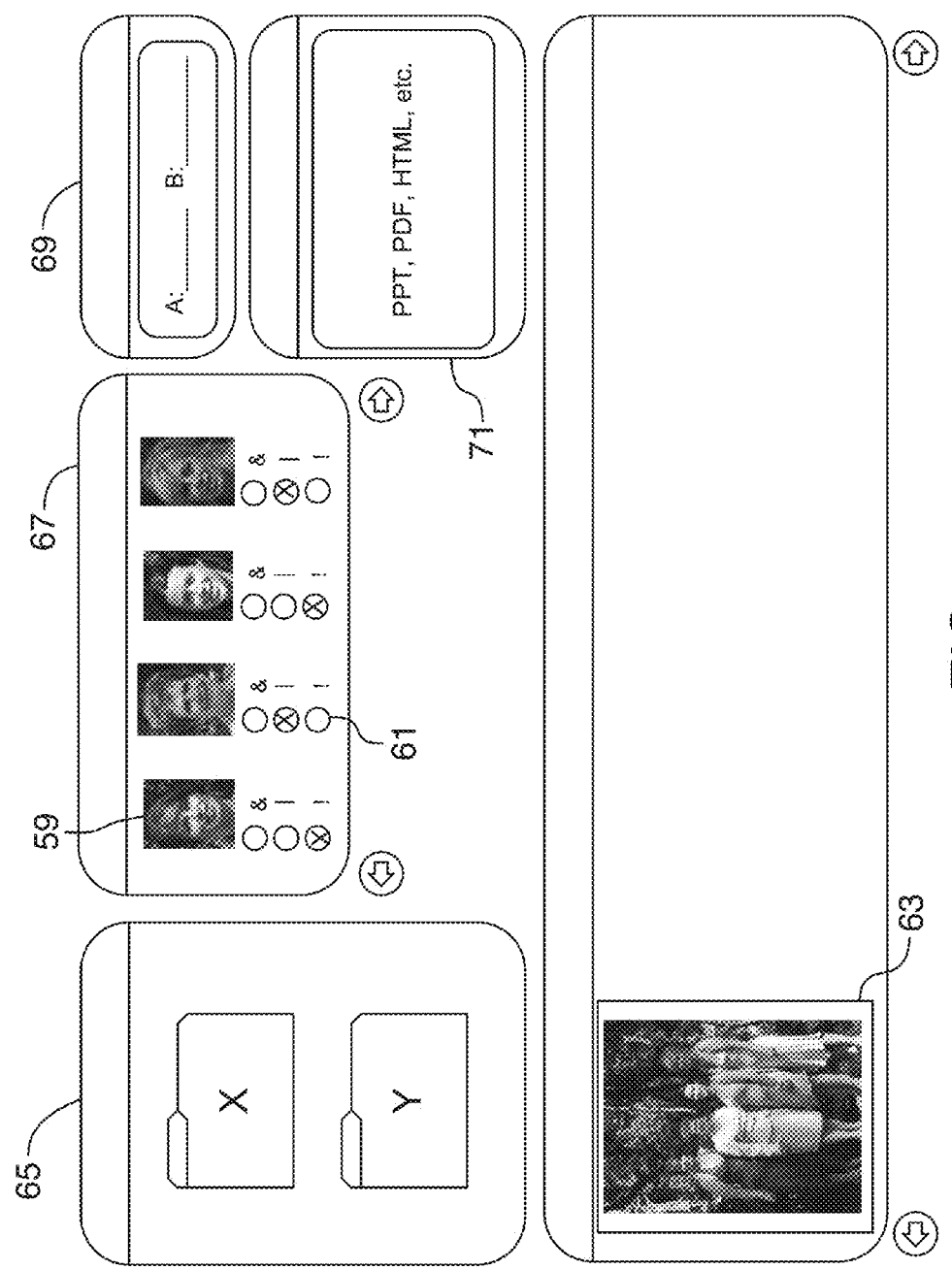
FIG. 9 shows face images for known persons plus Boolean operators to narrow the field of photos.

The example depicted in FIG. 9 shows face images for known persons plus the checkboxes for applying Boolean searching such as AND, OR, and NOT selections associated with names of known persons or metadata related to images. A novel feature of the invention is the ability to select photos in a visual manner by allowing the user to click on a thumbnail view of the faces of known persons (59), and applying Boolean operations (61) for each face enabled by checkboxes. This aspect of the GUI enables the creation of an album by combining various search criteria and filters that are applied against the total photo and face database. In a further embodiment of this invention, the user could assign an image (real, hand-generated or computer generated) to a specific person and that replacement image is overlaid over the portion of every image where that specific person is found.

Search criteria provided by the computer program may include:
  Folder selection (65), indicating the folder location or file name of photo images on the computer storage device;
  Known persons (67), providing the selection of Boolean operations (AND, OR, or NOT) associated with the faces of the known persons;
  Date range (69), providing the selection of a range of dates corresponding to the photo images to be included in the specific album;
  EXIF data, providing a selection means based on standard photo related information usually appended to the photo by the camera during the photo taking process.

An alternative method of selecting photos for an album may provide the user the ability to drag and drop individual photos or groups of photos over top of the name of the album (63), or to otherwise associate the photos with the album (63), using the GUI.

An album (63) may be a group of photos that are saved as a logical entity under the name of the album. The user may specify via the GUI that it wants to send the album to various target file types or locations (71), including a slide show, MICROSOFT™ POWERPOINT™ or other presentation computer programs, ADOBE™ PDF™ or other document file, a web-based sharing site such as FLICKR™ or FACEBOOK™, or a third party printing service.

Advertising Method

The present invention, in an optional, non-limiting aspect thereof, provides a novel advertising method that is operable with the networked computer architecture herein provided.

Figure 10:
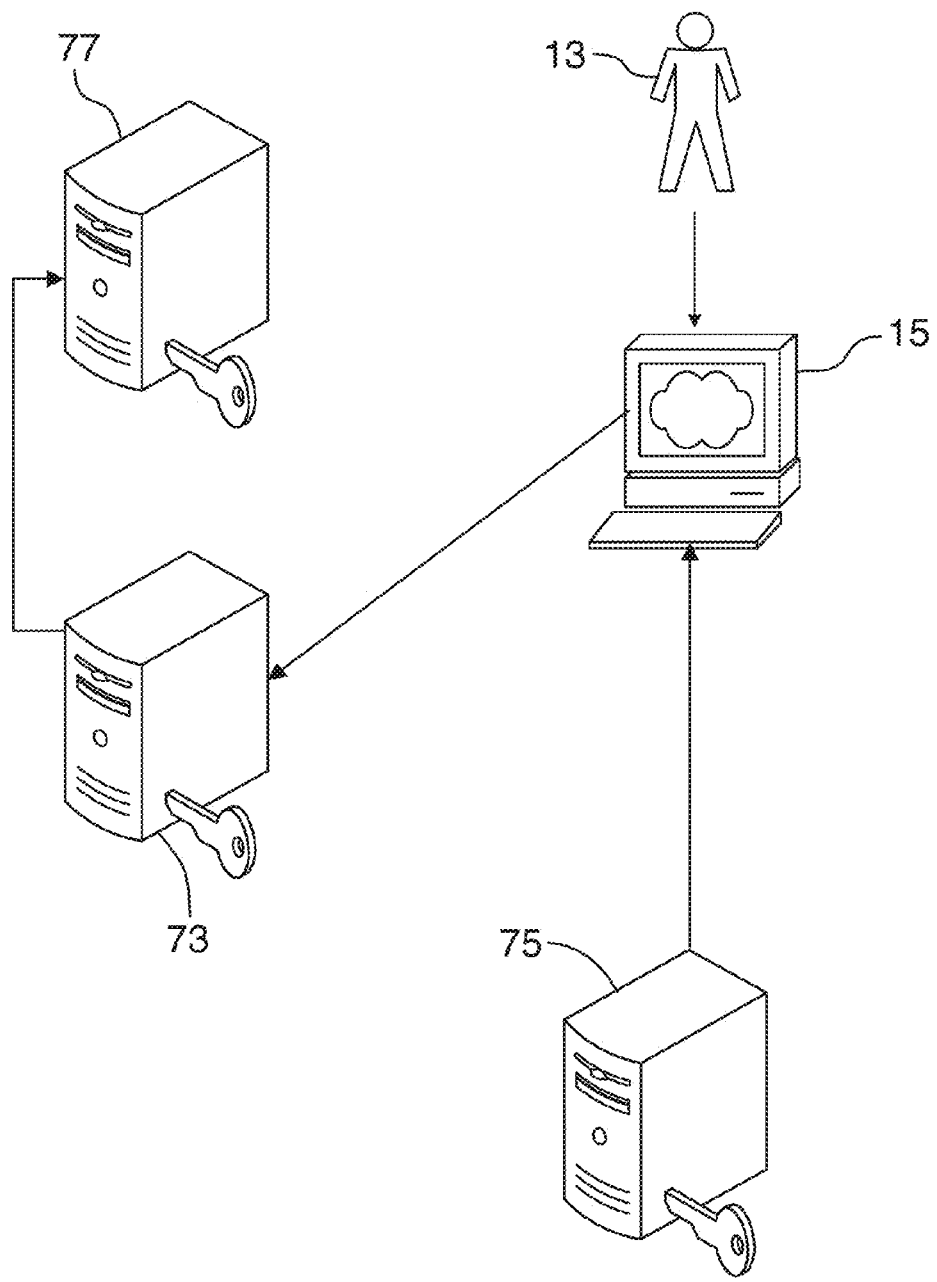
FIG. 10 illustrates an optional advertising display capability provided by the GUI.

FIG. 10 illustrates an optional advertising display capability provided by the GUI. This is a novel feature of the present invention providing a secure method for simultaneously targeting advertising based on user demographics and maintaining user privacy. The GUI may prompt new users (13) for demographic information that may at a minimum include gender, age and location data. This information may be stored locally on the computer system (15) running the computer program. A request may periodically be sent to a web-based server (73) to return a list of ad pointers. The request may contain an encrypted transmission of the demographic data for the user. The request may also be signed using a certificate issued by a registration server (77). This latter step may verify the authenticity of the request. The web-based server (73) may conduct a process of matching ads, which are associated with target demographic information, to the requesting user (13) based on their specific demographic information. A list of pointers (i.e. references to ads that exist on different ad servers) may be returned to the requesting user's computer system (15) and passed to the computer program. The computer program may then issue another request to a different web-based server (75) to download the ads referenced by the pointers. The web-based server (73) may then discard the demographic data to protect the privacy of the individual user.

By separating the web-based servers (73, 77) that perform the ad matching process from the servers (75) that actually deliver the ads, and by not storing the personal demographic data of the user on either of the web-based servers (73, 77), the personal information about the user is significantly more secure than it otherwise would be. The ad delivery servers (75) may store information about ads served for billing purposes but there may be no personal information included in that data. This is a novel implementation for serving ads to any web browser or software program in a secure fashion using demographic data.

Further Implementations

In another exemplary non-limiting optional aspect of the present invention, another capability of the present invention may enable a computer program to receive digital face images or signatures from the central registration server. For example, an organization seeking to find an individual (such as a missing child or a wanted criminal) may post the individual's face data. Those users that have opted to share their face database may download the data enabling an automatic comparison of the face data with their face database. The organization may be alerted if a match is found between the target individual and a known person for a specific user. This could enable the organization to determine a recent or current location of the individual. It could also enable the organization to determine the name of an individual, since the individual's name may be listed in one or more of the user's known persons list.

Yet a further embodiment provided by the present invention may enable an individual to find other persons with similar facial features as themselves. Such an application may be useful for a person to find their twin, for example. In this embodiment, a user may submit a photo including an image of their face, from which the present invention may generate a face signature. The face signature may then be compared to other individuals' face signatures that have been previously uploaded. Based on a predetermined similarity threshold, one or more similar faces may be reported to one or all of the individuals whose faces match. A system in accordance with this embodiment may provide a means for a user to approve contact with others. Matched individuals could choose to send a message to one another if they have specified their approval for such contact. A similar embodiment could be deployed as part of a dating service to match people based on looks.

Face Detection, Eye Detection and Face Recognition

The present invention, in yet another aspect thereof, provides a novel method for generating face signatures based on faces depicted in images. The face signatures may be generated by using a technique that includes the steps of face detection, eye detection, and face recognition.

Face Detection

The present invention, in one aspect thereof, provides a method for utilizing a texture-based face detection algorithm as a base method for face detection. One example of a texture-based face detection algorithm is the open source library of routines known as OPENCV™.

The texture-based face detection algorithm may have a low true-positive rate for specific facial poses, for example rolled frontal faces. This may be due to the texture pattern being trained on frontal face images which differ from the varied facial poses found in normal digital photos. In reality, having a mismatch between the texture pattern used to train the face detection algorithm and the type of poses in the target photos on which the algorithm is applied would result in a higher percentage of errors. Two well-known challenges presently faced in face detection include decreasing false-negative errors in the case of rolled frontal faces and reducing false-positive errors while not increasing false negative errors.

The present invention enhances the texture-based face detection by applying novel techniques involving three steps to improve the accuracy of the face detection process. In the first step a novel application of the known skin color ratio test on a texture-based face detector is provided to improve the accuracy of the detector. In the second step, a novel method for reducing false-positive face objects is provided by reducing the size of detected face object regions to a predefined size. In the third step, a novel face orientation compensation method is provided.

Figure 11:
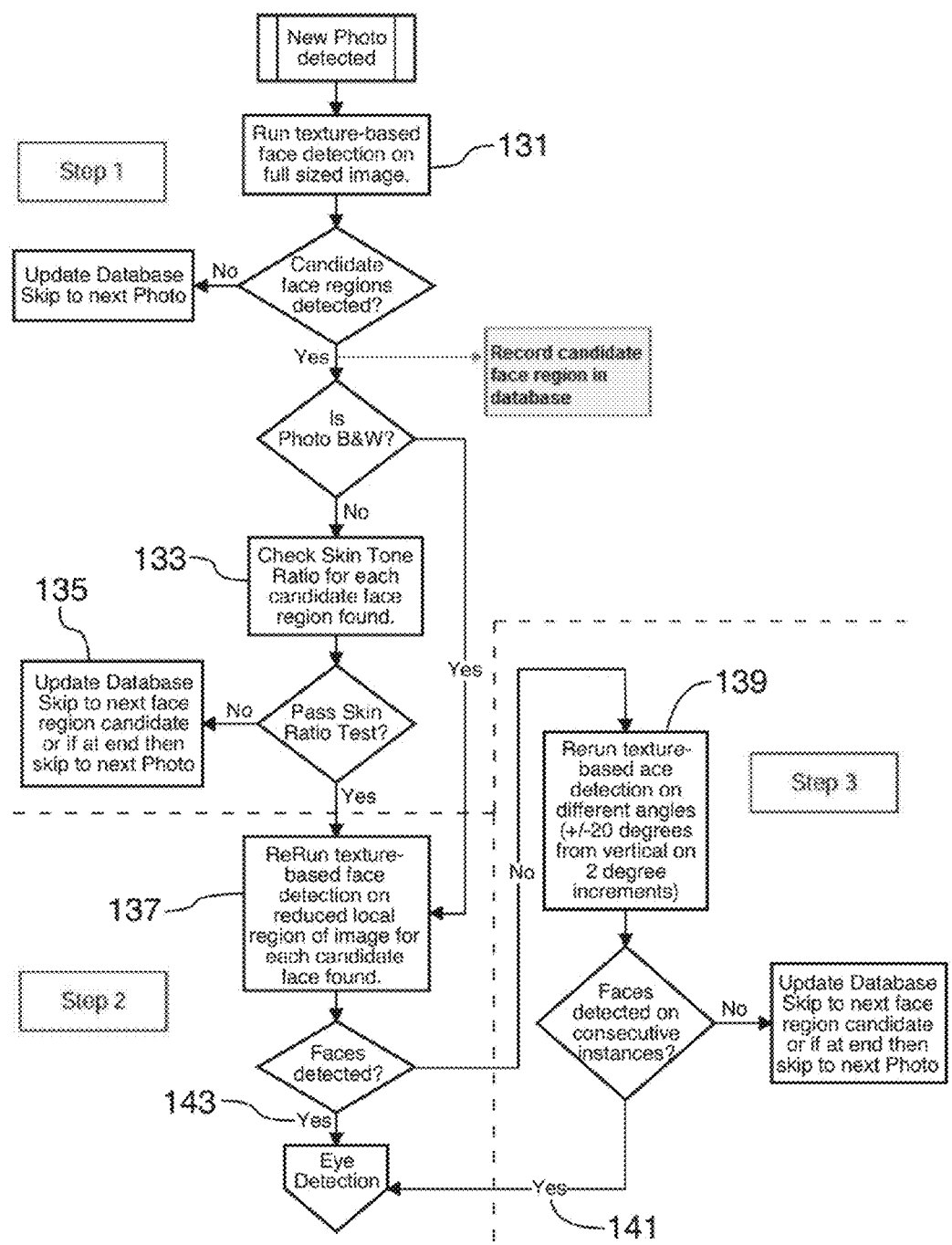
FIG. 11 illustrates the texture-based face detection method of the present invention, in one aspect thereof.

FIG. 11 illustrates the texture-based face detection method of the present invention, in one aspect thereof.

In one particular implementation of the texture-based face detection method, in the first step, the texture-based face detector (131) may initially be set for a high target true positive rate which has a corresponding high false positive rate. The texture-based face detector may be run with the entire photo image as input. The results from this run may give a list of potential face objects in the photo. Any candidate face regions detected may be recorded in a database. For a color photo, a skin color detection test (133) may be performed on the potential face objects to reduce the false positive rate. This skin color test may compare the ratio of the face object area containing skin color to the total area of the object. If the ratio does not exceed a pre-determined threshold then the potential face object may be skipped (135).

In the second step, detected face object regions that result from the first step may be reduced to a predefined size (such as 44 by 44 pixels). On these reduced regions, the texture-based face detector may be run again (137). The goal of this step is to reduce false-positive face objects. By running on a small size (such as 44 by 44 pixels) input region, false positive errors from incorrect texture patterns from non-faces may be reduced while true positive texture patterns may be preserved. This may result in a reduction in the false positive rate of face detection while preserving the true-positive rate. Face objects that are deemed to be faces in the second step may be accepted (143) as true faces. Those that do not pass this second step may be passed to a third step.

In the third step, a face orientation compensation method is provided. In the second step described above, in which face detection is performed on smaller regions of the image, the true positive rate may be reduced in the case of rolled faces. The texture pattern in rolled faces may be deemed to be a non-face by the face detector due to the size reduction applied in the second step. To preserve the true positive rate in rolled face cases, face orientation compensation (139) may be performed together with face detection. In this method, the local image region is rotated with an incremental angle and each angle instance may be run through the face detector. One example implementation would rotate the image 2 degrees starting at −20 degrees from the vertical axis and repeating the rotation through +20 degrees from the vertical axis. If rotated face regions are recognized and exist in instances with consecutive incremental angles then the local image region may be determined (141) to be a true face.

These modifications to a texture-based face detection algorithm may significantly reduce the false positive error rate.

Eye Detection

Figure 12:
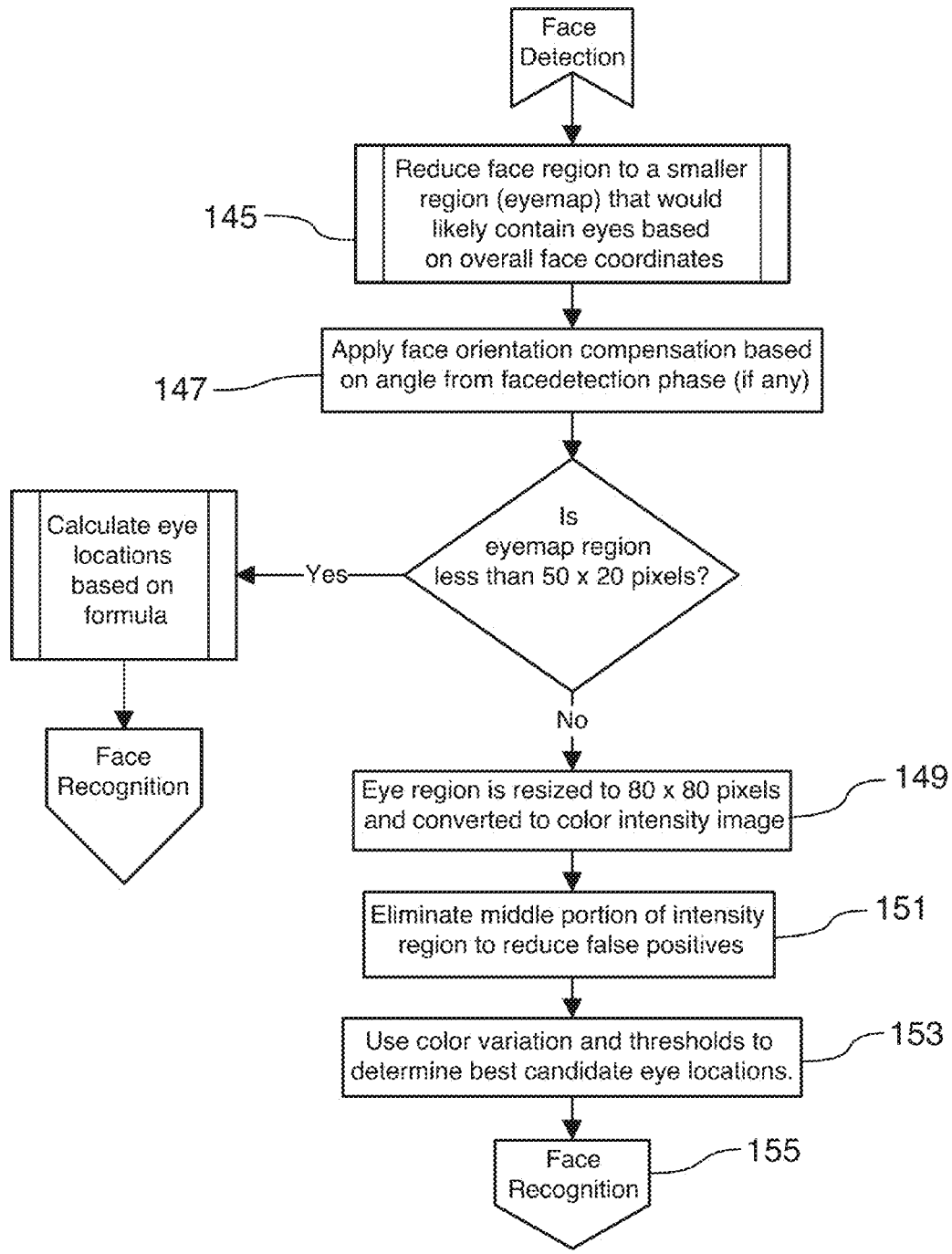
FIG. 12 illustrates a method for eye detection, in one aspect of the present invention.
Figure 14A:
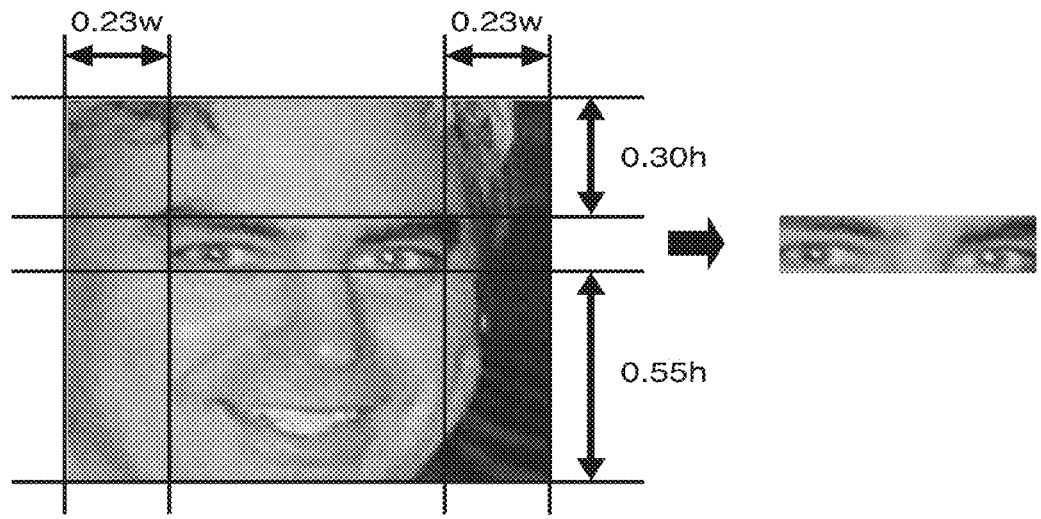
FIGS. 14A, 14B, and 14C illustrate a method of isolating eyes in a photo.

FIG. 12 illustrates a method for eye detection, in one aspect of the present invention. The eye detection method applies novel techniques to improve the accuracy for detecting the pupil locations in detected face regions. The first step may be to reduce the overall face region to a smaller region (an "eyemap") (145) that would likely contain the actual pupil/eye locations. A formula may be used to crop the eyemap region from the face region. For example, the formula used to crop the eyemap region may be to remove 0.23 w on the left, 0.23 w on the right, 0.55 h on the bottom and 0.30 h on the top; where w is the width of the face region and h is the height of the face region. FIG. 14A illustrates a particular embodiment of the method of cropping the eyemap region from the face region.

Furthermore, if the face was detected in the third step of the face detection method on a specific angle instance, then the angle of rotation may be applied (147) to the eyemap region to enable a more accurate selection of the eye locations.

Figure 14B:
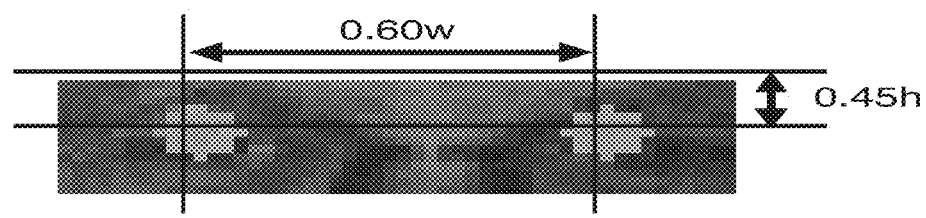

FIG. 14B illustrates that the formula used to crop the eyemap region may be altered to ensure that the eyemap region is large enough to ensure satisfactory pupil detection results.

Once the eyemap region has been cropped, the eyemap region may then be resized to a fixed size (such as 80×80 pixels) (149) so that a fixed template color variation method may be applied to determine the candidate eye locations. This method may be based on the darker intensity of the pupil relative to the surrounding area of the eyemap region.

Figure 14C:
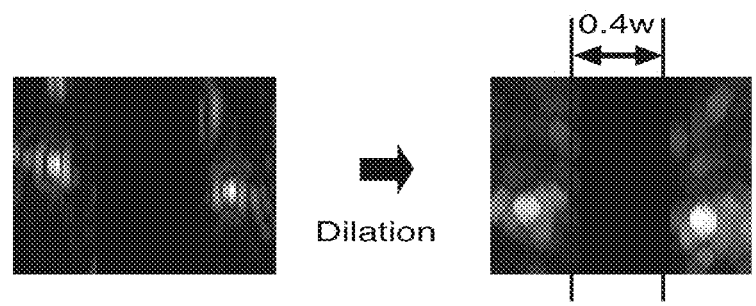

The middle of the color intensity image may be set to zero/black (151) in the intensity map to remove potential pupil candidates that typically result from light reflecting off lenses and the frames of glasses. FIG. 14C illustrates this process.

The color variation image may be obtained from the color intensity image and may then be passed through a threshold filter so that only a small percentage of the eye region is white (for example, a 2% threshold may be applied) (153). Next, a "best fit" method may be applied to choose the eye locations with the highest intensity of color variation (left and right side). The best candidate pupil location coordinates may be passed along (155) to the face recognition method of the present invention.

Face Recognition

Figure 13:
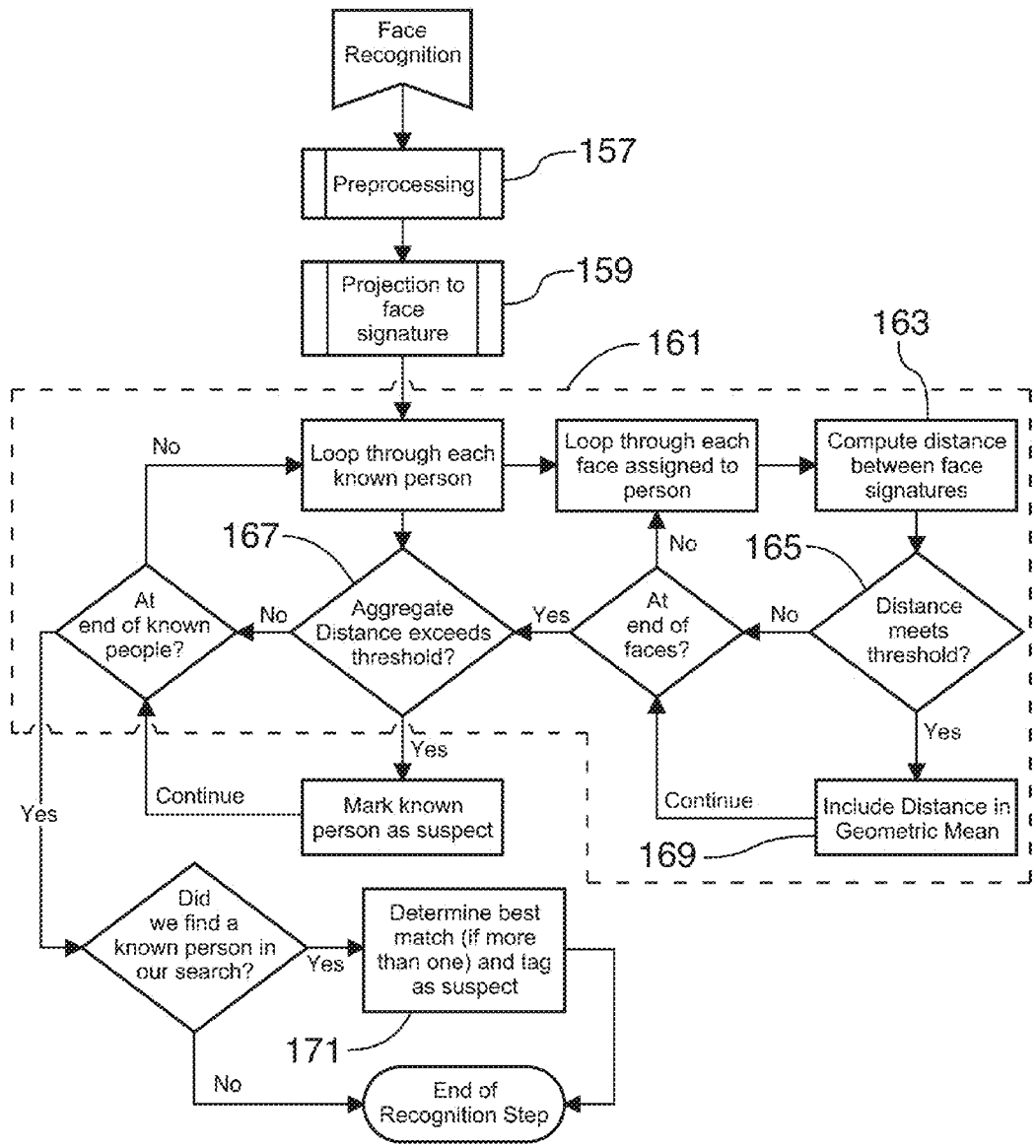
FIG. 13 illustrates the face recognition method, in one aspect of the present invention.

FIG. 13 illustrates the face recognition method, in accordance with aspects of the present invention. Face recognition may generally be performed through pre-processing (157), projection (159), distance calculation (163) and aggregation (167). Principal Component Analysis (PCA) may be employed by the face recognition method. PCA is a known method, used abundantly in all forms of analysis because it is a simple, non-parametric method of extracting relevant information from confusing data sets.

The present invention may employ PCA in a novel way that overcomes its traditional issues with respect to high sensitivity to subject lighting and pose, given that personal photos may have little variation in pose since most subjects may tend to look directly at a camera. The present invention may take advantage of the fact that sets of photos depicting particular persons may be taken over a variety of pose and lighting conditions. The present invention provides a method of aggregating the comparison between the target unknown face and this plurality of faces associated with each known person.

Pre-processing (157) may first be applied to the image. The face region and eye coordinates provided as input to the face recognition phase may be used to normalize the face region. The normalization process may include translating, rotating and scaling the face region to a predetermined template size. The normalization process may use the eye coordinates as reference points such that the face region image is adjusted to place the eye coordinates on specific image pixels. A standard fixed masking process, potentially limiting the face region to the area inside an ellipse, may then be applied to the image to filter out non-face portions. A flattening process, involving running a two dimensional linear regression on the intensity of the pixels in the face region, may be used to ensure pixel intensity is spatially uniform across the image. Finally, a histogram image equalization (an image processing method known to those skilled in the art whereby the contrast of an image is adjusted using the image's histogram) may be performed in the greyscale domain.

Projection (159) may then be applied to the image. The resulting pixels of the normalized face region may be passed through a PCA-based formula to create a PCA vector that is used as the face signature by the invention. The PCA vector may comprise a projection image resulting from principal components extracted from a large set of generic images.

The face signature created from this method may be an array (from the PCA vector) of real numbers of a given dimensionality. Although the exact dimensionality of the vector space may be determined adaptively with its maximum value set to the value capturing, for example, 95% of the input image energy, the default value used may be a dimensionality in the range of 50 to 100.

Finally, looping (161) may be applied to match the unknown face with a known person. Each face signature (represented as an array of numbers) may be mathematically compared to any other face signature using linear or non-linear classification logic to determine a distance value (163). For example, two signatures may be compared by computing a normalized inner product distance.

To compare a face to all of the faces associated with a known person, all of the individual one-to-one comparisons may be made, and then either all of the results may be used in the next step or a set of best matches as determined by comparison to some threshold (165) may be used. The threshold chosen may be chosen such that on average half of the distances obtained when comparing a face to a non-matching person are kept.

Some form of aggregation may be used to combine the set of distance values obtained in the previous step to determine the distance between the face and a known person. This aggregation may be the computation of the geometric mean (169) of the distance values. The geometric mean may be an averaging technique similar to an arithmetic mean, but it may be computed by multiplying the N numbers to be averaged and then taking the Nth root of the product as the desired average. The closest match between the face and each known person may be found by computing this aggregate distance (167) between the face and each known person in the database and choosing the minimum distance.

Finally, the closest match distance may be compared (171) against a static or dynamically determined threshold to reduce the rate of false positive matches. If a dynamically chosen threshold is used, this threshold may be determined by first assuming the aggregate distance values obtained when comparing a face to a non-matching person having N associated faces are normally distributed (for each possible value of N), and then using the inverse cumulative normal distribution function to compute a threshold which ensures that, on average, a fixed maximum number of or fixed ratio of the unknown faces are falsely matched to a known person. This threshold may vary from person to person as the number of faces, N, associated with each person changes. The advantage of this dynamic threshold calculation includes that the fixed maximum number (or ratio) may be kept as small as possible to limit false positive matches while maintaining an acceptable level of true positive matches for the user.

Figure 13A:
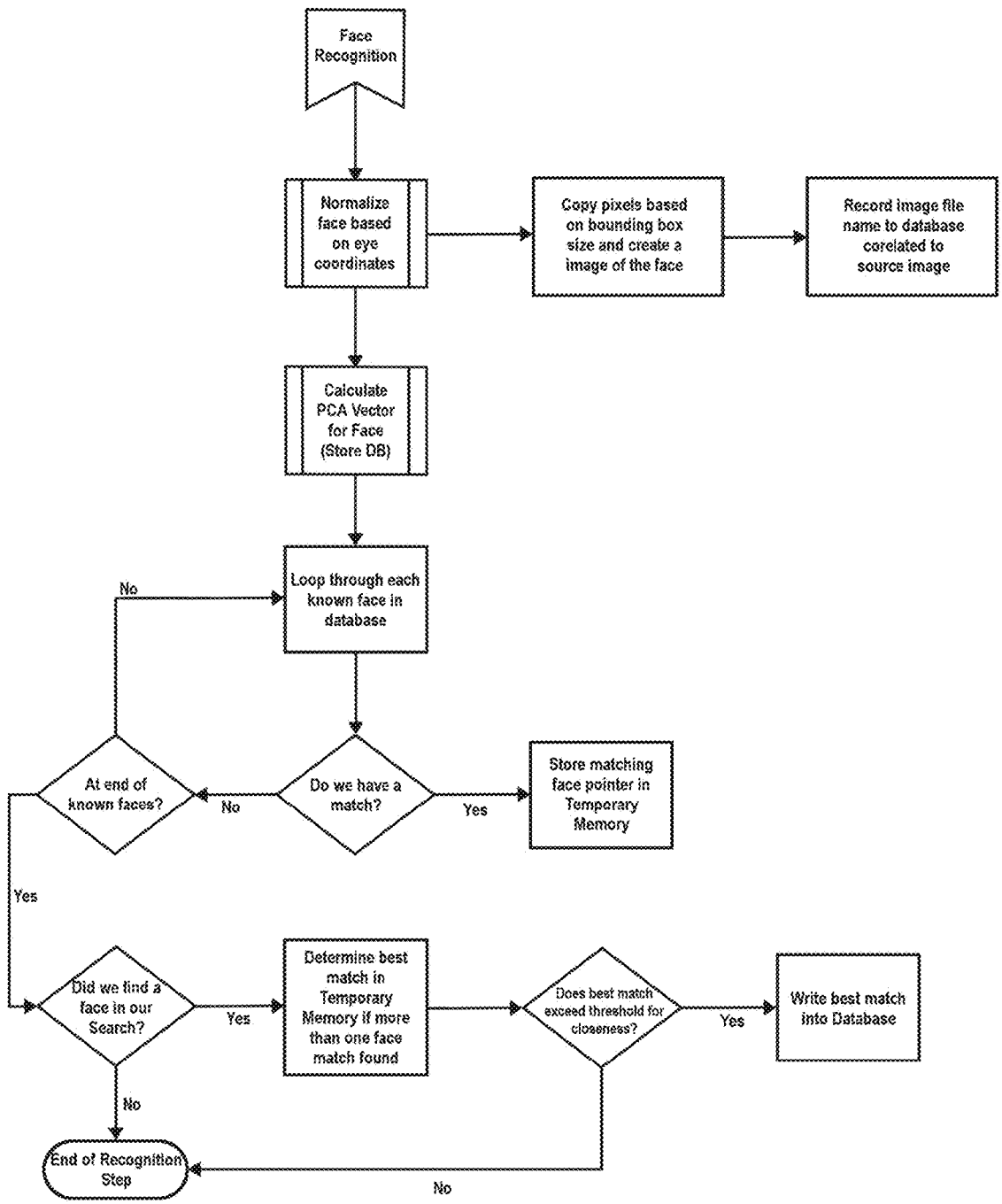
FIG. 13a illustrates the face recognition method, in one aspect of the present invention.

FIG. 13a also illustrates the face recognition method, in accordance with aspects of the present invention. The face recognition method shown may normalize a face based on eye coordinates. Each face may be defined by a bounding box determined by the face recognition method. The pixels based within the bounding box may be extracted to create an image of the face. The face image may be recorded to a database and associated with the respective source image from where the face image was extracted. The a PCA vector for the normalized face may then be calculated and stored in a database. The PCA vector may be compared against the known faces in the database. If a match is found, a face pointer may be stored in memory, such as temporary memory. If after looping through all of the known faces in the databases a match is not found, then the face recognition method determines whether a face was found in the search. If no face was found, then the face recognition ends. If a face was found, then the face recognition method may determine the best match in memory if more than one face match is found. The face recognition method determines whether the best match exceeds a threshold for closeness, as described above. If the threshold for closeness is exceeded, then the best match is written to the database. If the threshold for closeness is not exceeded, then the face recognition ends.

The present invention, in a further aspect thereof, facilitates an optimal training by more than one face signature associated with a person thus improves accuracy. The invention may allow the user to select the representative subset of known faces for a given individual and thus over-ride the subset chosen by the invention. That subset would then be used by the recognition engine to determine suggested matches and ignore other known faces for that person. Examples where this would be beneficial would be where there multiple poses of a person. It also addresses changes to the persons face due to aging, glasses or changes to the face such as caused by a beard or mustache. By selecting more recent photos as the representative subset, the probability of successful automatic selection for future photos would increase. As the number of face signatures grows that are linked to known people in the local face database, the accuracy of the invention may increase in detecting known people automatically in future photos that are processed. This is a novel feature of this system.

The invention may learn a face by determining the closest match for a previously identified face from the group of known persons. An advantage of the present invention is that as the number of face signatures linked to known persons in the local face database grows, the accuracy of the invention may increase in detecting known persons automatically in future photos that are processed.

Video Scanning

Figure 20:
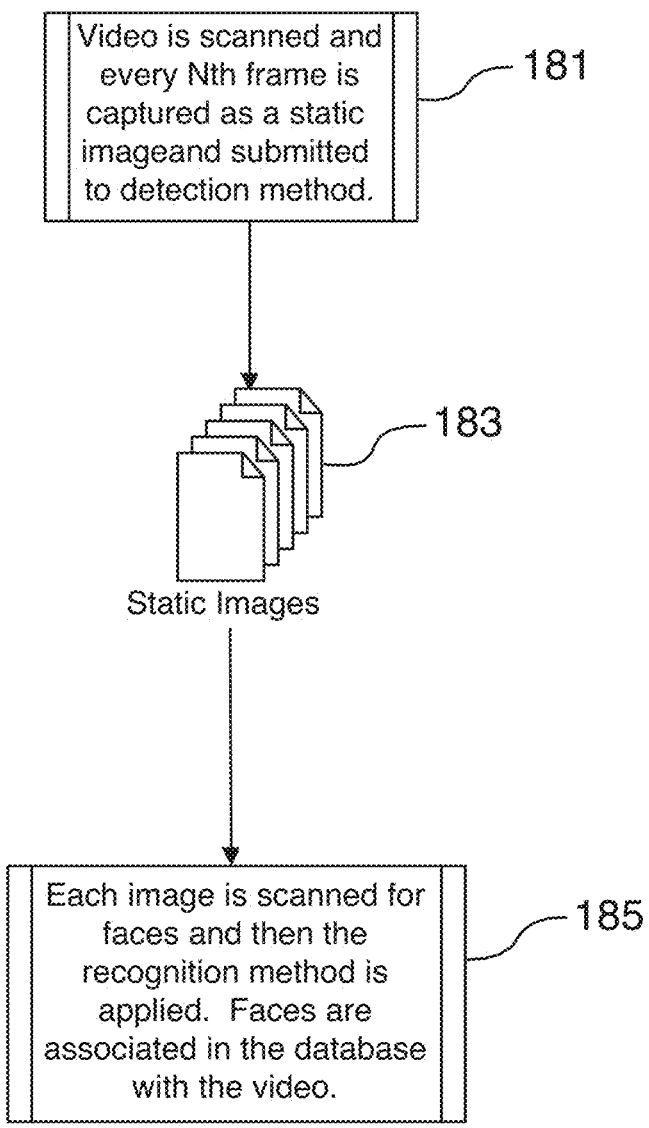
FIG. 20 illustrates a video scanning method whereby frames of video are extracted and face detection is performed on these frames.

FIG. 20 illustrates a video scanning method whereby frames of video are extracted and face detection is performed on these frames. A number N may be set (where N is adjustable) such that video may be scanned every N frames (181) of the video as individual photo images (183) where the previously mentioned techniques (185) would be applied to detect and recognize faces and known persons. The video could then be disseminated in accordance with the techniques provided herein.

An optional, non-limiting embodiment provided by the present invention enables an individual to find other persons with similar facial features as themselves. Such an application may be useful for a person to find their twin, for example. In this embodiment, a user may submit a photo including an image of their face, from which the present invention may generate a face signature. The face signature may then be compared to other individuals' face signatures that have been previously uploaded. Based on a predetermined similarity threshold, one or more similar faces may be reported to one or all of the individuals whose faces match. A system in accordance with this embodiment may provide a means for a user to approve contact with others. Matched individuals could choose to send a message to one another if they have specified their approval for such contact. A similar embodiment could be deployed as part of a dating service to match people based on looks.

Face and Portrait Extraction and Creation

Figure 23:
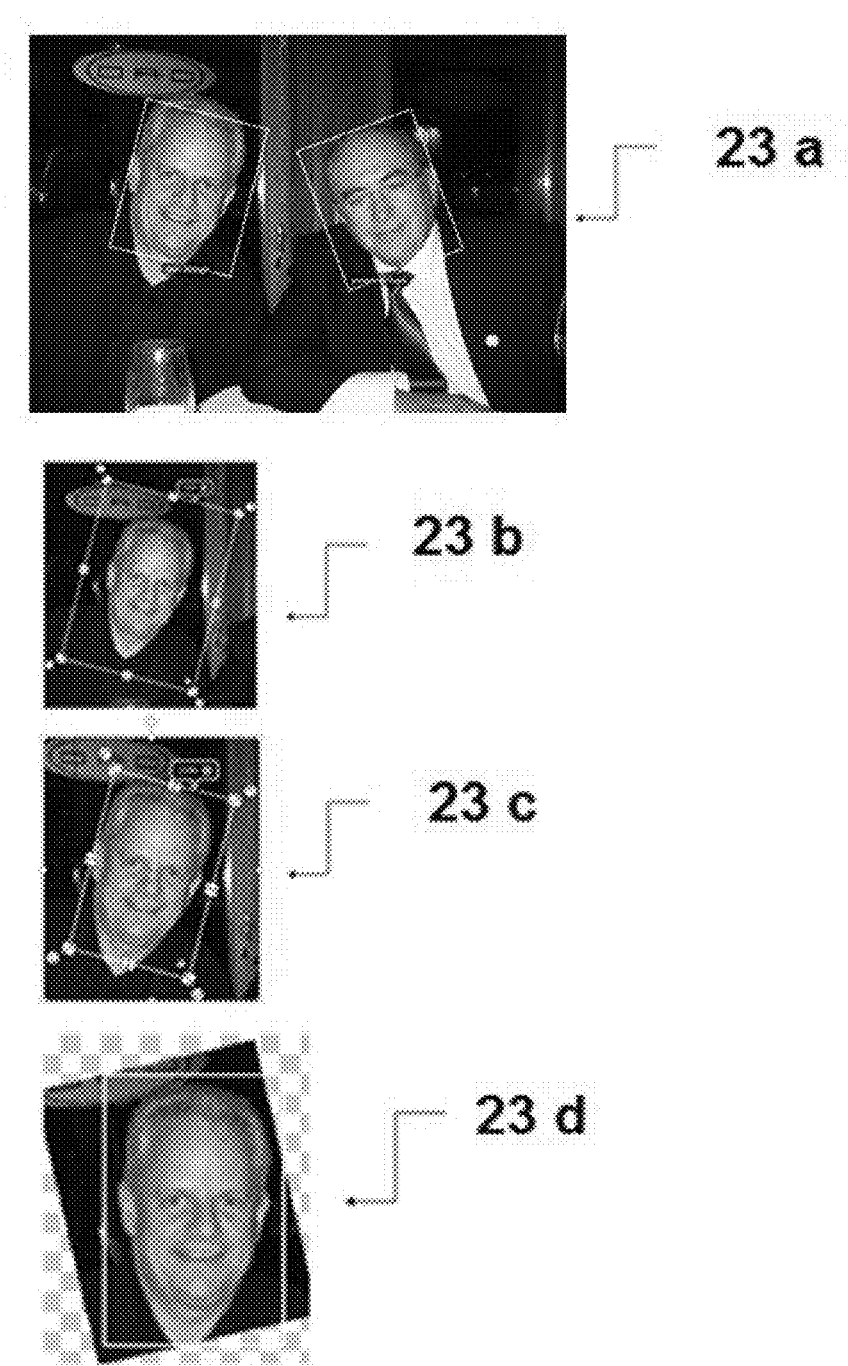
FIG. 23 illustrates one aspect of the present invention wherein faces are located in an image which captures the xy coordinates of the location of the faces providing a method to capture a face and adjust the image of the face both in terms of size and rotation to create a portrait—either full size or thumbnail.

FIG. 23 illustrates the creation of thumbnails or portraits in one aspect of the present invention. Where faces are located in an image 23a one aspect of the present invention captures the XY coordinates of the location of the faces shown in image 23a providing a method to capture a face and adjust the image of the face both in terms of size and rotation to create a portrait, which may either be full size or a thumbnail. As illustrated in FIG. 23 the coordinates may define the outline of the face with top left, top right, bottom left and bottom right pixel locations on the original photo which is referred to as a bounding box. The XY coordinates are recorded in the database as illustrated in FIG. 11.

As illustrated in FIG. 23, the faces are located as shown in image 23a and a corresponding bounding box for each located face determined by the XY coordinates is established and recorded in the database as illustrated in FIG. 11. As shown in images 23b and 23c of FIG. 23, the XY coordinates to make the bounding box may be adjustable to make subsequent creation of the bounding box, the area around the face, larger or smaller. Using eye location and identification as depicted in FIG. 18 by reference numbers 107 and 109, the face may be rotated to make the face vertical as shown in image 23d of FIG. 23.

The record of the portrait/thumbnail image 23d may be recorded in the database as illustrated in FIG. 13 for future use.

In accordance with at least one exemplary implementation of the present invention, at least one computer terminal, server, or other computing device may detect at least one face in at least one digital image. The computer may determine and store area co-ordinates of a location of the at least one detected face in the at least one digital image. The computer may apply at least one transformation to the at least one detected face to create at least one portrait of the at least one detected face. The computer may rotate the at least one portrait at least until the at least one portrait is shown in a vertical orientation and a pair of eyes of the at least one face shown in the at least one portrait are positioned on a horizontal plane. The computer may then store the rotated at least one portrait. Each detected face may correspond to a person. A copy may be made of or extracted from the portion of the digital image comprising the detected face prior to the application of the at least one transformation.

An identification of a person may be associated with each stored face portrait in a database stored at or linked to one or more computers.

Where a digital image shows more than one person, the one or more computers may associate relationships between identified persons based at least partly on respective identified persons being included in the digital image.

Advertising and Product Personalization

FIG. 24 illustrates merging portraits or thumbnails adjusted in terms of size and rotation and embedding the same into an advertising message or product, or any other type of marketing material or image. The thumbnail or portrait 24a, also illustrated in FIG. 23 as image 23d may be adjusted in size to match the size requirements of an advertisement 24b. For example, the computer may apply at least one additional transformation to the at least one stored portrait for matching a portrait size requirement of the marketing image.

Figure 32:
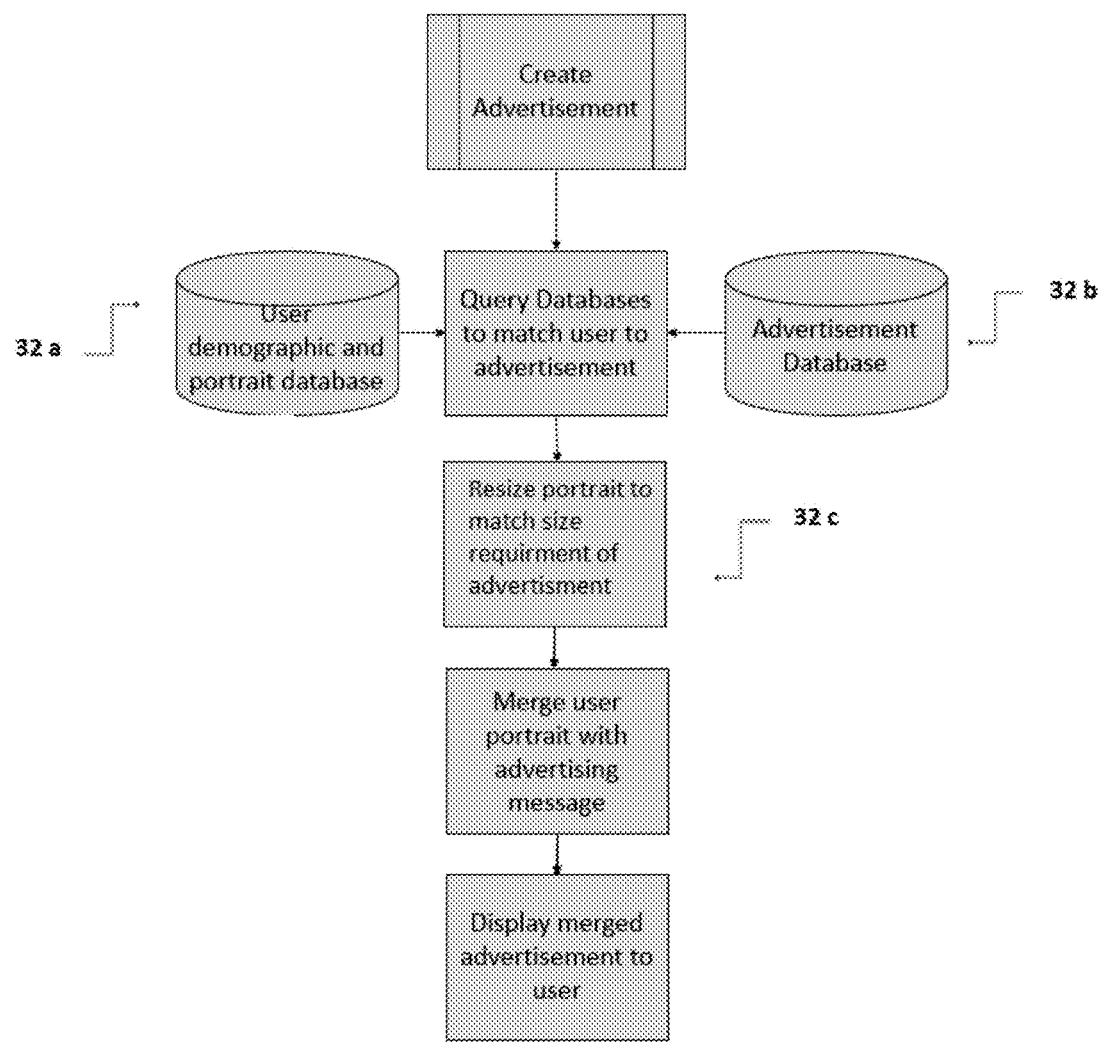
FIG. 32 illustrates the workflow to create a customized advertisement.

FIG. 32 illustrates the workflow for the creation of the advertisement. As illustrated in FIG. 32 when an advertisement is to be personalized one aspect of the present invention matches an advertisement retrieved from an advertisement server database 32b to a user which is retrieved from the user demographic and portrait database 32a. The portrait retrieved from the user demographic and portrait database 32a may be resized at 32c to match size requirements of the advertisement retrieved from the advertisement server database 32b. The user portrait can be merged with or overlaid on top of the advertisement to display a personalized advertising message. In addition to the portrait, the user's name or other information pertinent to the advertisement message may also be merged with or overlaid on top of the advertisement to display a personalized advertising message as demonstrated by the advertisement 24b.

Figure 33:
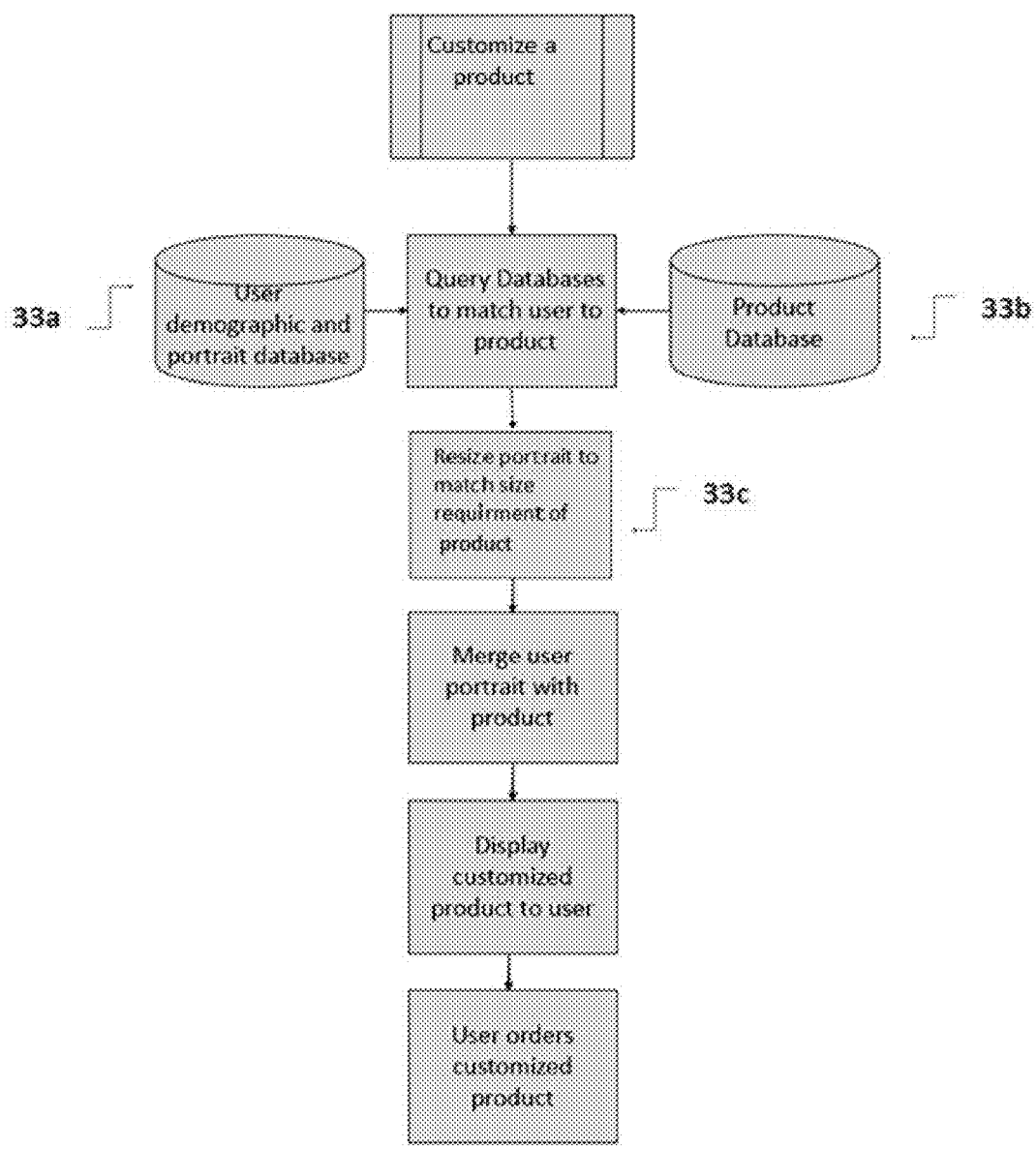
FIG. 33 illustrates the workflow to create a customized product.

FIG. 33 illustrates the workflow for the personalization of a product. As illustrated in FIG. 33 when a product is to be personalized one aspect of the present invention matches a product retrieved from product database 33b to a user which is retrieved from the user demographic and portrait database 33a. The portrait retrieved from the user demographic and portrait database 33a is resized at 33c to match the size requirements of the product retrieved from the product server database 33b. The user portrait can be merged with product to display the personalized product 24c shown in FIG. 24. In addition to the portrait, the user's name or other information pertinent to the product may also be merged with the product to display a personalized message as demonstrated by the resulting personalized product 24c.

Face Substitution

FIG. 25 illustrates using a selected image to overlay on a digital image photo to cover the face of a subject, also known as face substitution. An application may be to hide negative memories.

Figure 34:
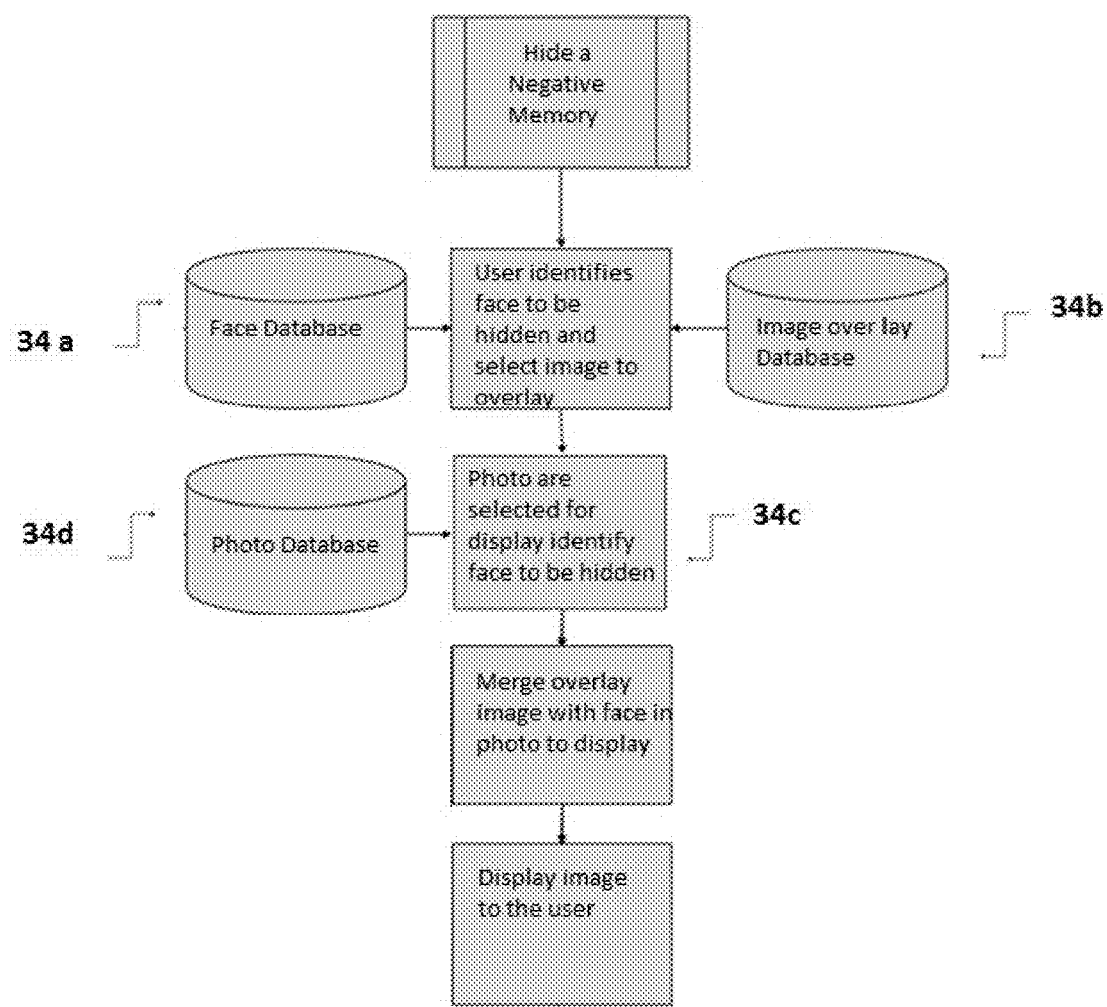
FIG. 34 illustrates the workflow to hide a negative memory.

FIG. 34 illustrates a workflow for face substitution. When a user wants to hide negative memories one aspect of the present invention may matche faces in the face database 34a to be hidden in the photos from the photo database 34d with an image that is selected or provided by a user which is stored in the negative memory image database 34b. The databases 34a, 34b, and 34d may be found on one computer server in a single database, in separate databases on the same computer, or on databases stored on or across multiple computers. The image retrieved from the negative memory image database 34b is resized 34c to match the size requirements of the faces to be hidden in the photos 25a retrieved from the photo database 34d. The image is merged with photo 25a such that when the photo is displayed the image hides the face of the negative memory as demonstrated by the resulting hidden face photo 25b. In a non-limiting aspect of the present invention, one or more computers may receive a selection of at least one face to be suppressed, optionally as any form of user input. The one or more computers may then mask the area co-ordinates corresponding to the location of the at least one face to be suppressed in the at least one digital image.

Optionally, the masking may comprise overlaying a selected image over the area co-ordinate corresponding to the location of the at least one face to be suppressed. Optionally, the one or more computers may adjust the selected image to correspond to size of the area co-ordinates to be masked. Optionally, the one or more computers may adjust edges of the overlayed image to blend with image characteristics of the at least one digital image. For example, the edges of the overlayed image may be blurred or the opacity of the edges may be modified. Optionally, the image characteristics to be blended may include one or more of color, intensity, brightness, and texture. Optionally, the selection of the at least one face to be suppressed may include a command to suppress a particular individual from being displayed in any digital image, the method comprising identifying any digital image comprising a face corresponding to the particular individual (identified person) to be suppressed and flagging the identified digital images to mask the area co-ordinates corresponding to the location of the at least one face to be suppressed. This may be accomplished by directly modifying the respective digital image(s) or updating associated metadata or other information or data to cause a display of the respective digital image(s) in a non-destructive manner such that the original source digital image is not permanently modified in the database. Accordingly, as mask may be applied to the digital image permanently, or the masking may involve modifying metadata of the digital image to cause the digital image to be masked when displayed.

FIG. 26 illustrates the display of faces captured from photos in historical order, by date associated with the respective photos, optionally in metadata stored with the photo or elsewhere. The respective date may be the date the photo was created, copied from a camera, transferred to a computer system of the present invention, or any other date associated with the photo. With such ordering the selected faces can be merged to create a single composite image as illustrated by 26b. Such faces can also be automatically fed into a morphing application such that the aging of a person can be animated.

Optionally, date data may be associated with the digital image. Stored portraits corresponding to a common person may be displayed in accordance with the respective associated date data. Optionally, an animated representation may be generated of an evolution of the stored portraits corresponding to the common person over time.

Figure 27:
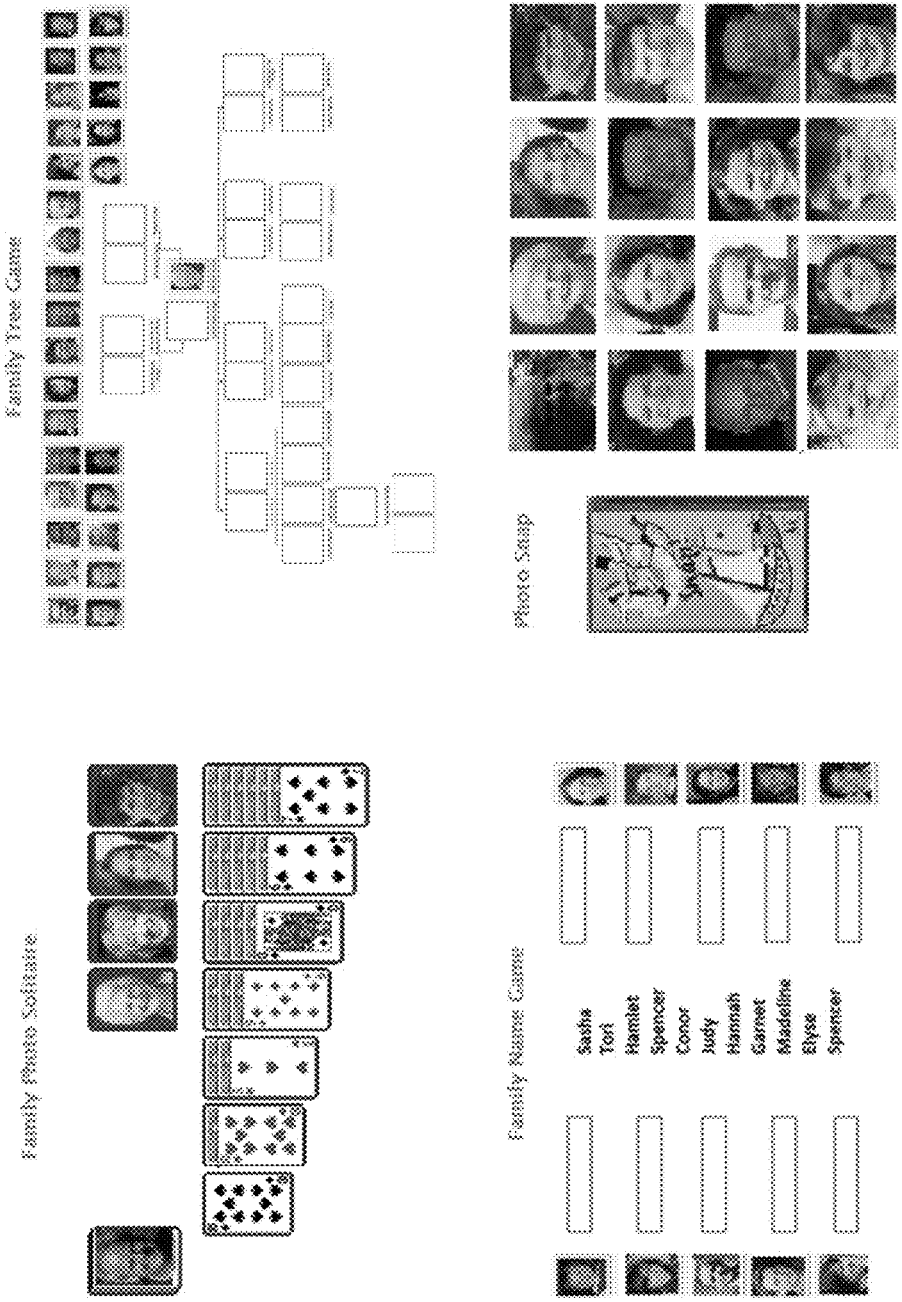
FIG. 27 illustrates the display of faces/portraits captured from photos and embedding the same in to games and exercises.

FIG. 27 illustrates the display of faces/portraits captured from photos and embedding the faces or portraits into games, exercises, or other interactive applications.

Figure 35:
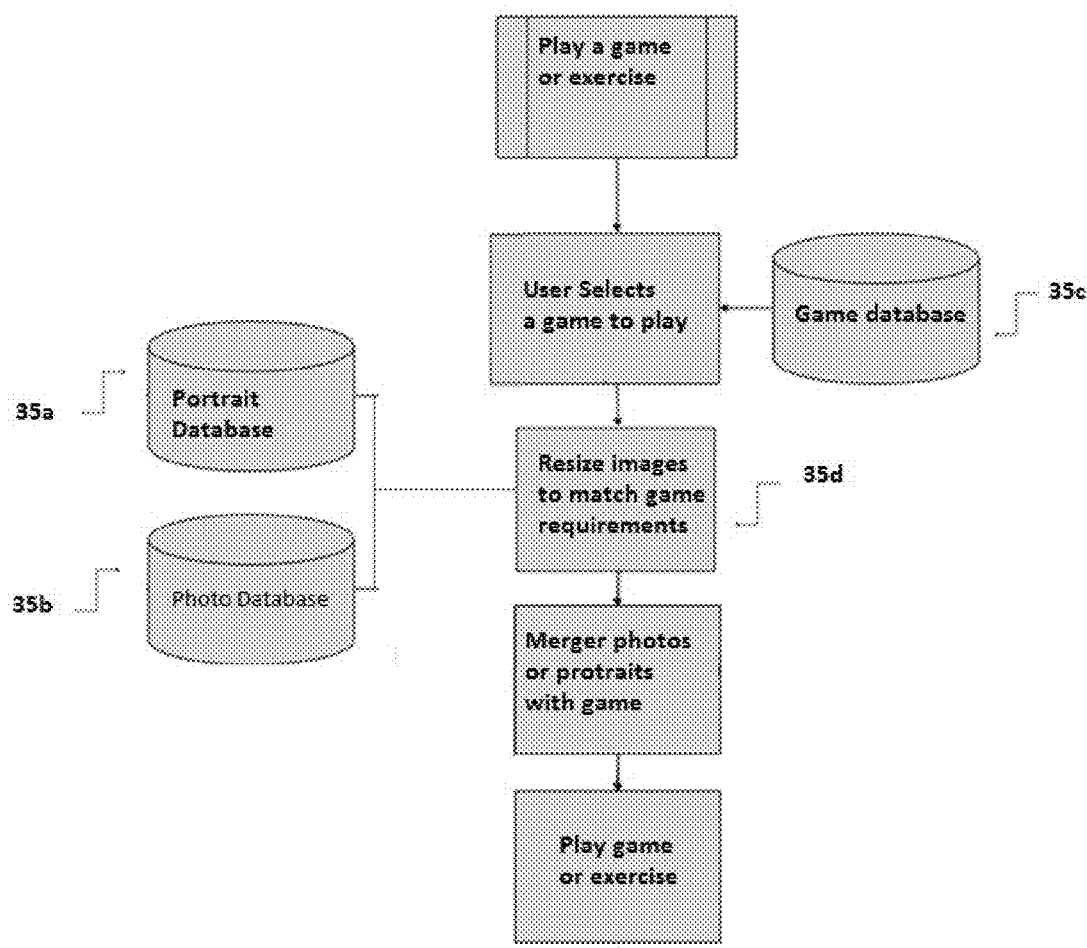
FIG. 35 illustrates the workflow to create customized games and exercises.

FIG. 35 illustrates a workflow for creating customized or personalized games and exercises using user portraits and photos, in accordance with aspects of the present invention. A user may select a game or exercise to be played from the game database 35c. The invention selects portraits from the portrait database 35a or photo database 35b for display. The portraits or photos are resized at 35d to match the size requirements of the game to be played. The resized portraits or photos are merged with the game's user interface for the user to play. Databases 35a, 35b, and 35c may be found on one computer server in a single database, in separate databases on the same computer, or on databases stored on or across multiple computers.

Optionally, the one or more computers may populate an interactive computer game with the stored portraits and relationships. The interactive computer game comprises a photo reminiscence therapy game.

Indexing Systems Automated Using Face Recognition

Figure 28:
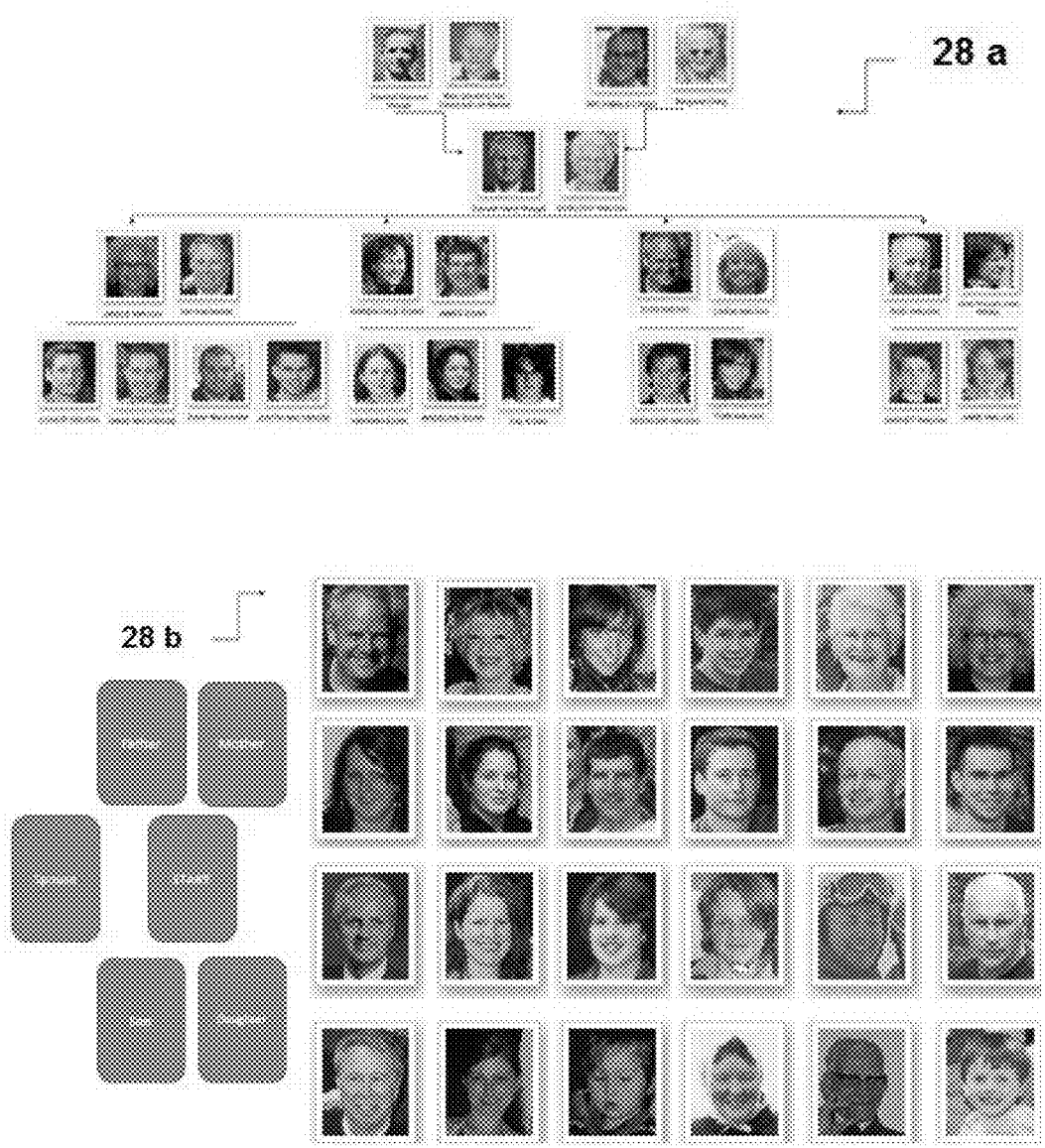
FIG. 28 illustrates the creation and use of a family tree to be an index for photos.
Figure 36:
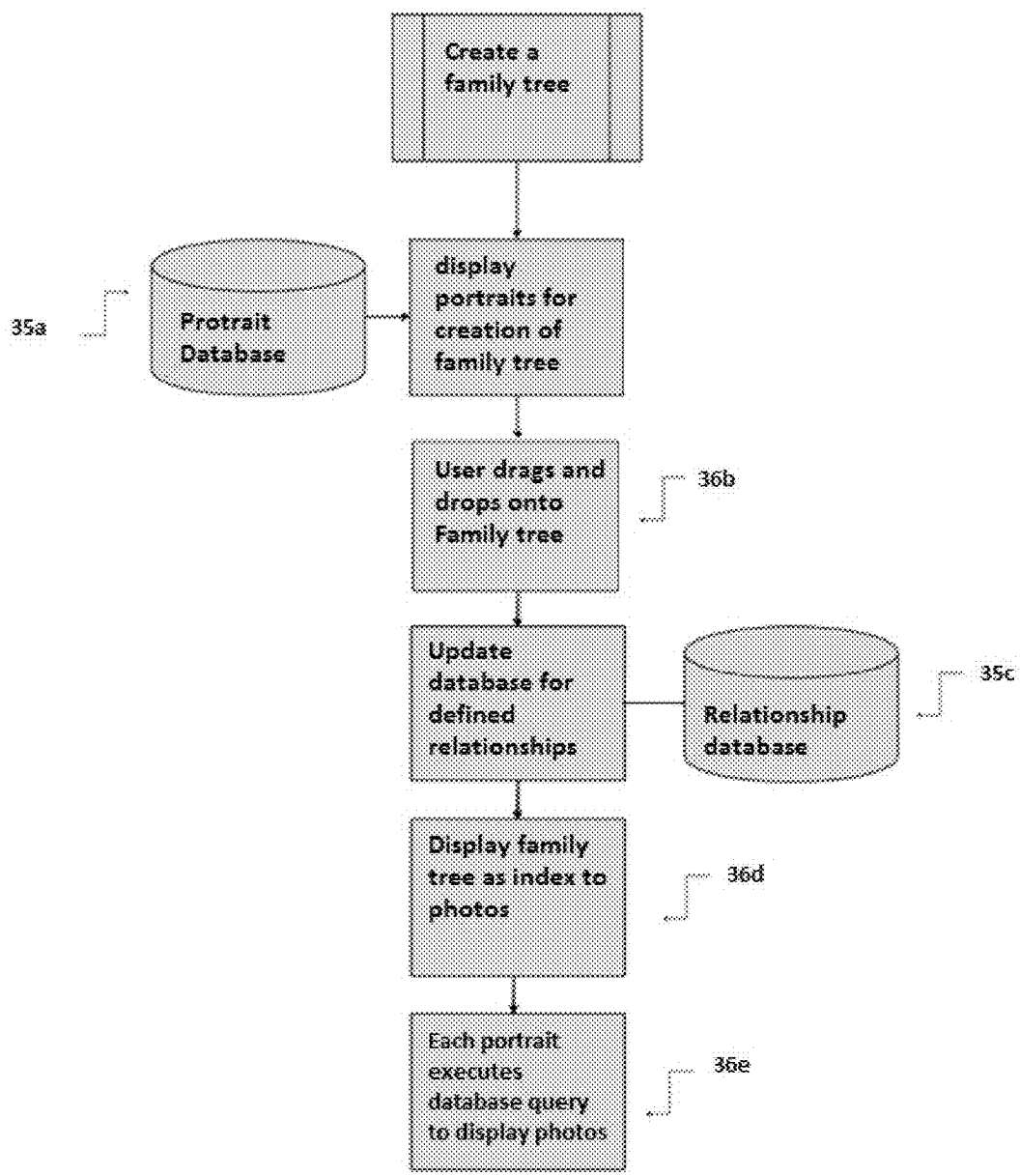
FIG. 36 illustrates the workflow to create a family tree.

FIG. 28 illustrates the creation and use of a family tree to index photos and FIG. 36 illustrates a corresponding workflow. Portraits may be displayed from the portrait database of identified people. The user may drag and drop each portrait on to the family tree at 36b using the relationship template 28b as illustrated in FIG. 28. In a non-limiting example, each user of the system of the present invention may have six basic relationships of mother, father, sibling, spouse, daughter and son, as shown in template 28b. As the user drags portraits on to the family tree the family tree grows to show the new nodes. Optionally new blank nodes are added for the common relationships to the selected node. As more persons are added the family tree expands as users are added and relationships are defined. When the user has dragged all portraits the family tree is completed by eliminating extraneous relationship or persons such as friends and colleagues. Users will likely have friend and colleague relationships that are pertinent to their personal social map but are identified in a modified network map using a similar drag and drop method.

The family tree 28a which is created may be used as an index to the user's photos at 36d. When a user selects or clicks on a photo a database query will be executed at 36e to display the photos in which the selected person appears.

Instead of a family tree 28a, other types of organizational structures representing relationships between persons may be presented in a chart format for populating by dragging portraits thereto, or otherwise selecting portraits. For example, a corporate organization chart may be created by providing a blank, or incomplete corporate organization chart. The user may then be presented with portraits from the database for placement on the chart.

In accordance with a non-limiting aspect of the present invention, at least one computer may include or interface with at least one database that stores a plurality of portrait images. Each portrait image may be associated with an identified person shown in the respective portrait. The identification of the person may be stored in the database, another database, or in metadata associated with the respective portrait image. The at least one computer may display the respective portrait of at least one identified person associated with a user. The at least one computer may display a visual representation of at least one personal relationship to the user. The at least one computer may assign at least one of the displayed portraits to at least one of the displayed personal relationships, in accordance with a received user input. The at least one computer may store the personal relationship assignments in the database. The visual representation may include a representation of a tree organizational structure with a plurality of tree nodes, such as for a family tree, where each tree node corresponds to one of the at least one personal relationships. The at least one computer may spawn a tree node for the visual representation corresponding to at least one additional personal relationship in accordance with a user input adding at least one of the displayed portraits to the visual representation. For example, the family tree structure may grow as additional portraits are added to the tree. The user may then specify a relationship for the newly added portrait, or a default relationship may be assigned, or the at least one computer may attempt to determine an appropriate relationship for the new relationship based at least partly on data found on a social network system to which the user is a member. The database of portraits, or another database accessible to the at least one computer, may include a plurality of digital images, and the at least one computer may index at least a subset of the plurality of digital images in accordance with the visual representation. Accordingly, the family tree structure may be used to link to other digital images featuring members of the family tree. In particular clicking on one member of the family tree may link to one or more digital images showing at least that member of the family tree.

Figure 29:
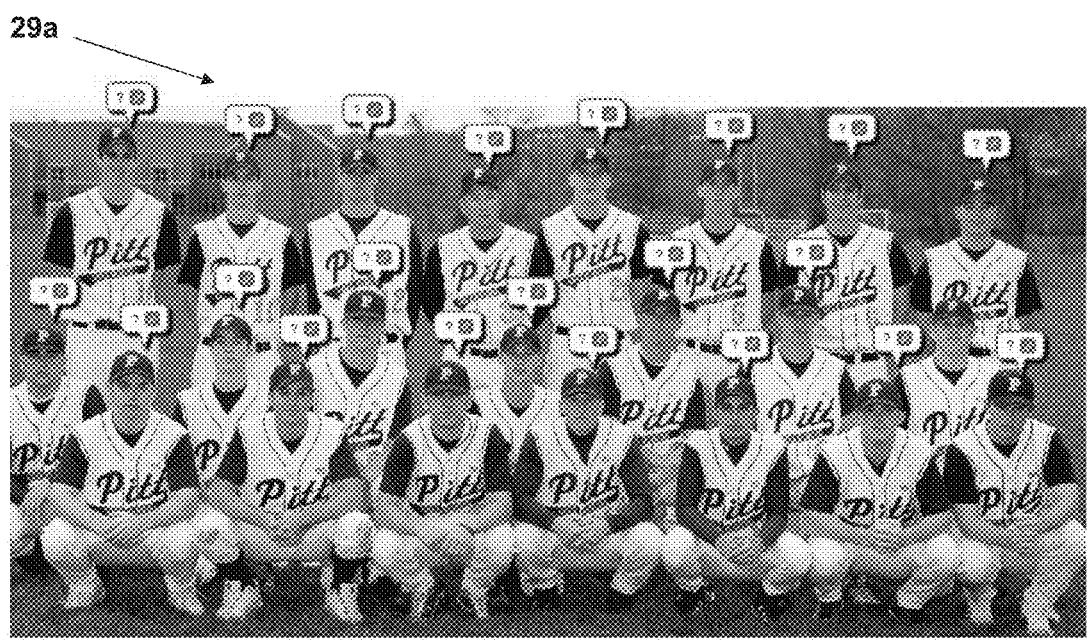
FIG. 29 illustrates the use of group photos to be an index for photos.
Figure 37:
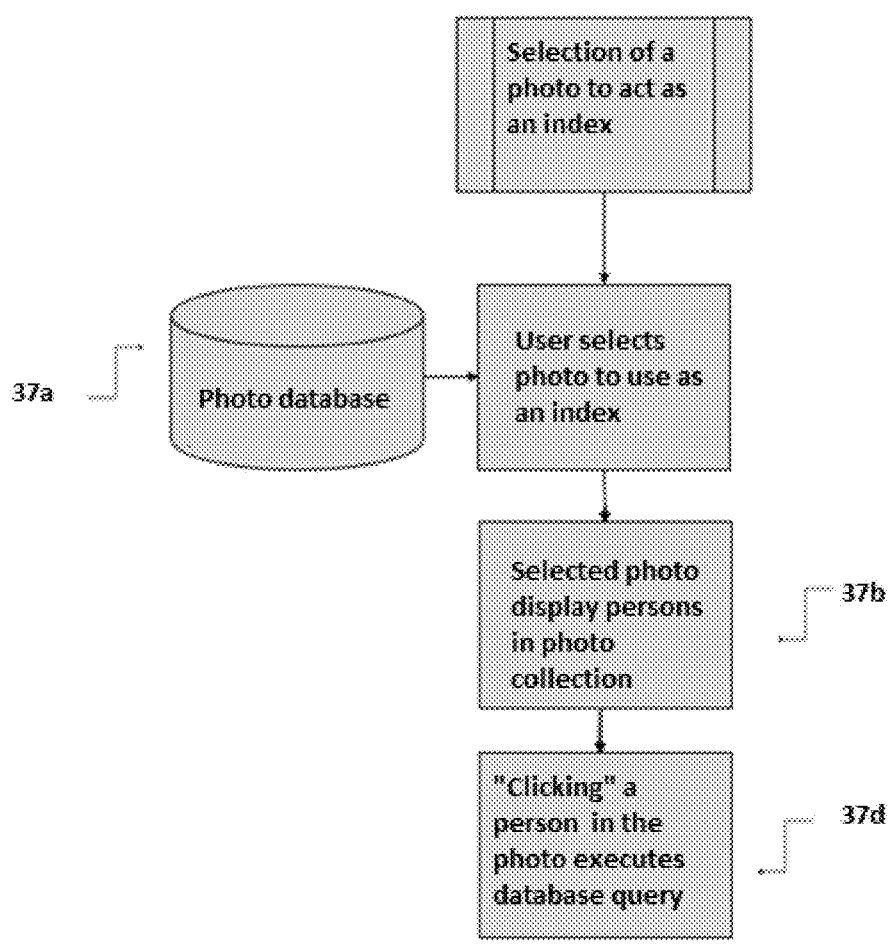
FIG. 37 illustrates the workflow to use a photo as an index.

FIG. 29 illustrates the use of group photos to be an index for photos in the photo database, and FIG. 37 illustrates a corresponding workflow. A user may select a photo or photos from the photo database 37a. The photo selected is recorded as a photo for indexing photos and becomes an index in one aspect of the invention. When a user selects or clicks on a face in the photo the one or more computers may search database 37a or another database for more digital images including the identified person corresponding to the face in the photo the user has selected.

In accordance with a non-limiting aspect of the present invention, at least one computer may include or interface with a database of portraits and digital images, each portrait associated with an identified person shown in the respective portrait. The at least one computer may display at least one of the digital images and cross-reference the displayed at least one digital image with the database of portraits to create a list of at least one identified person shown in the at least one digital image. The at least one computer may index at least a subset of the digital images in accordance with the list of at least one identified person. In accordance with a user input selecting at least one of the identified persons from the displayed at least one digital image, the at least one computer may display at least one of the respectively indexed digital images. Optionally, the indexing may include displaying visual representations of the indexed digital images organized by identified person.

Solicited and Automated Search for Missing Persons

Figure 30:
FIG. 30 illustrates the displays the delivery of face signatures of missing children and wanted criminals.
Figure 38:
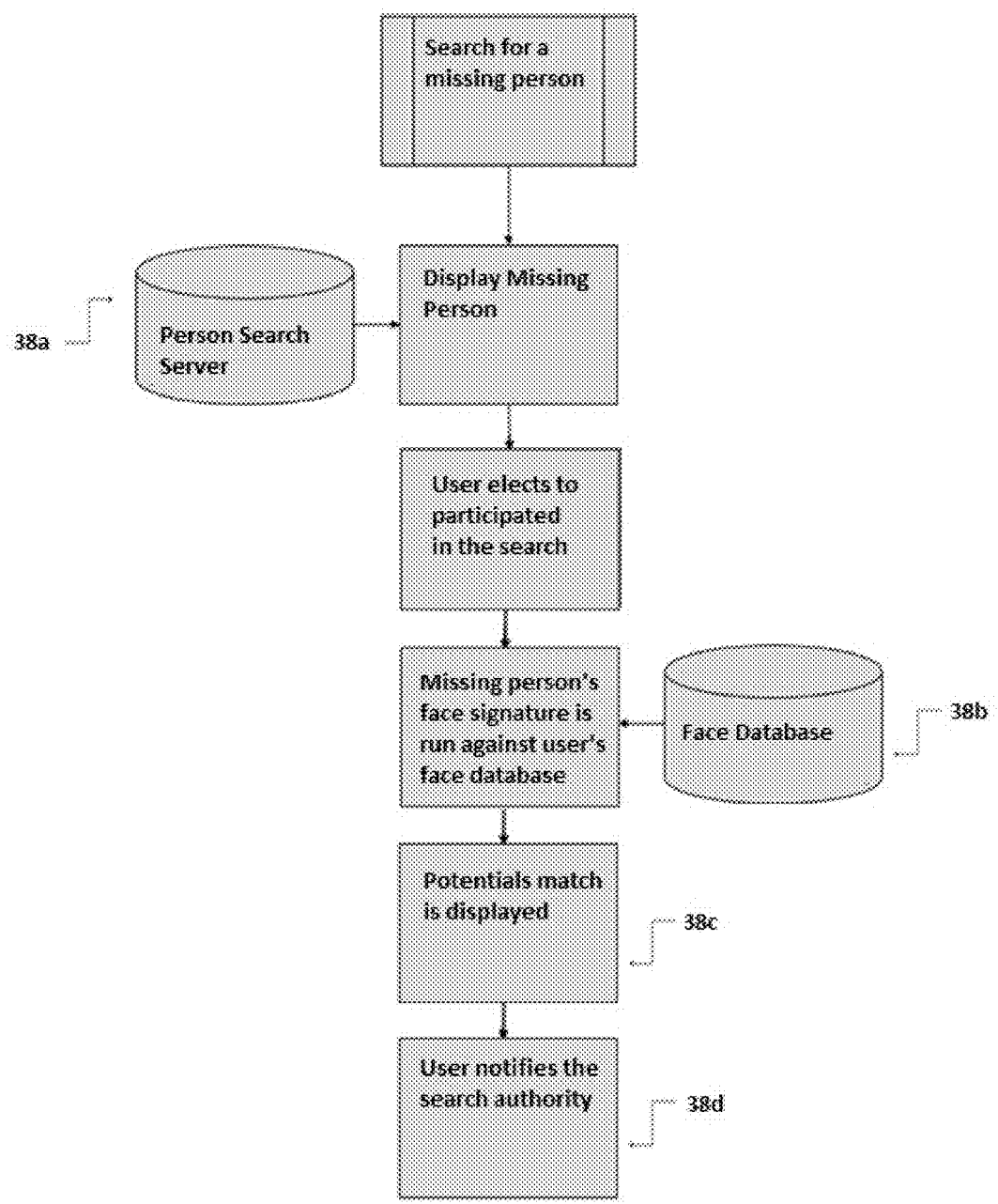
FIG. 38 illustrates the workflow to find a missing person.

In yet another aspect of the present invention, the present invention may enable a computer program to receive digital face images or signatures from a third party server, such as a central person search server. FIG. 30 illustrates displaying the delivery of face signatures of missing children and wanted criminals that a user could elect to use for searching the user's photo database(s) for potential matches. A corresponding workflow is shown in FIG. 38. For example, an organization seeking to find an individual (such as a missing child or a wanted criminal) may post the individual's face data shown in images 30a and 30b. The face data may originate from a person search server 38a. Those users that have opted to share their face database 38b may download the data enabling an automatic comparison of the face data with their face database 38b. The results of the comparison may be displayed to the user at 38c for validation. The user may notify the organization at 38d if a match is found between the target individual and a known person for a specific user. This could enable the organization to determine a recent or current location of the individual. It could also enable the organization to determine the name of an individual, since the individual's name may be listed in one or more of the user's known persons list.

Figure 39:
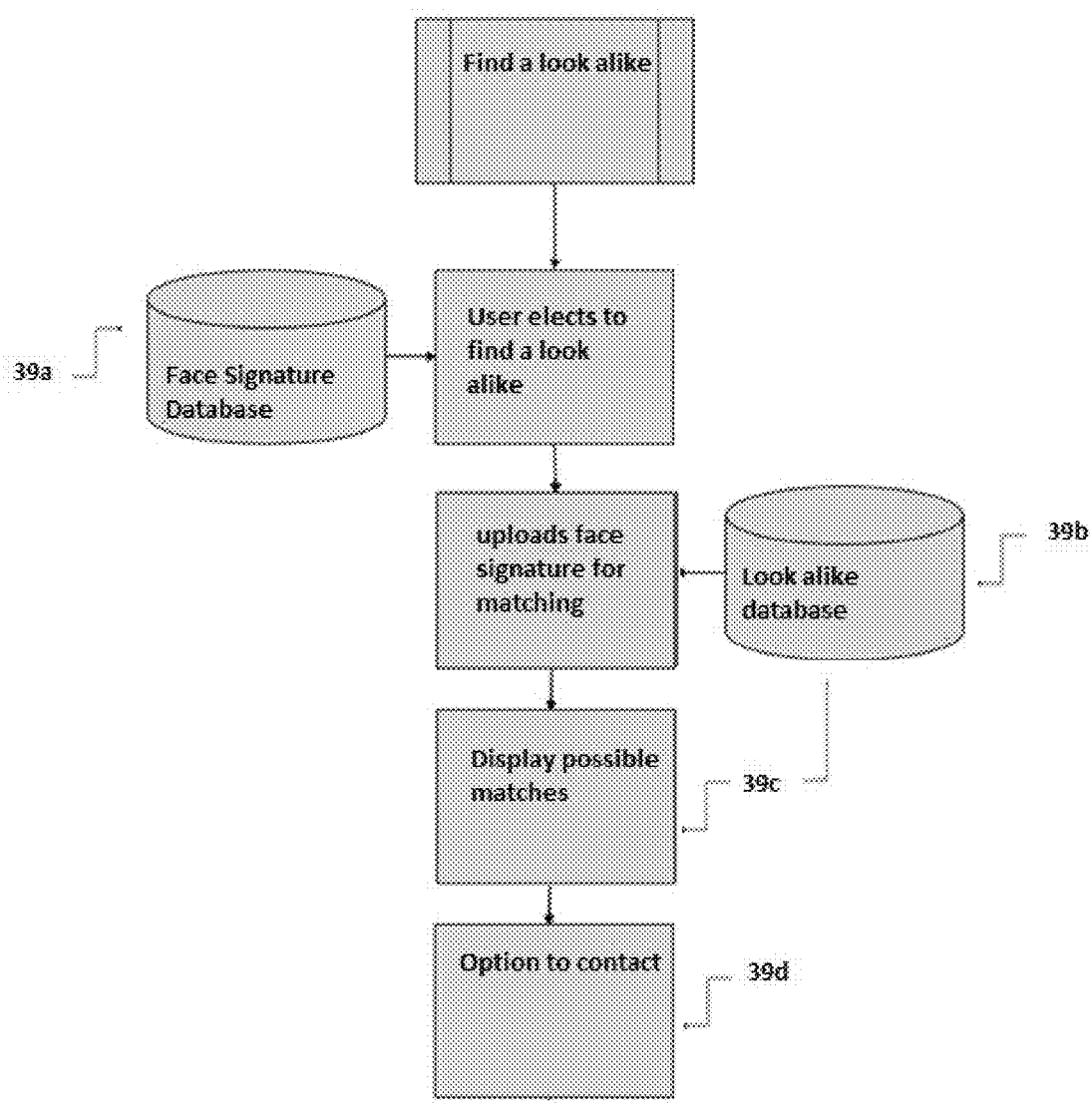
FIG. 39 illustrates the workflow to find a look alike.

Yet a further embodiment of the present invention, described in reference to FIG. 31 and corresponding workflow FIG. 39, may enable an individual to find other persons with similar facial features as themselves. Such an application may be useful for a person to find their twin, for example. In this embodiment, a user may elect to submit a photo including an image of their face, from which the present invention may generate a face signature stored in face signature database 39a. The face signature may then be compared to other face signatures that have been previously uploaded to database 39a or to look alike database 39b. Based on a predetermined similarity threshold, one or more similar faces may be reported to one or all of the individuals whose faces match at 39c. A system in accordance with this embodiment may provide a means for a user to approve contact with others at 39d. Matched individuals could choose to send a message to one another if they have specified their approval for such contact. Another variation on this invention would be to look for people with similar facial features taken separately from the entire face—such as mouth, nose, and eyes.

In accordance with a non-limiting aspect of the present invention, at least one computer may include or interface with a database of portraits, each portrait associated with an identified person shown in the respective portrait. The at least one computer may receive at least one unidentified portrait and compare a face signature of the at least one unidentified portrait against face signatures of portraits of identified persons known to the user. In accordance with a positive result of the comparing, the at least one computer may prompt the user for confirmation of the positive result. In accordance with the confirmation, the at least one computer may associate the at least one unidentified portrait with the at least one identified person confirmed by the user and store the at least one unidentified portrait in the database.

Optionally, the unidentified portrait shows a missing person. Optionally, the receiving may include several steps. First, the digital image may be received. The at least one computer may then detect at least one face in the received digital image. The at least one computer may determine and store area co-ordinates of a location of the at least one detected face in the received digital image. The at least one computer may apply at least one transformation to the at least one detected face to create the at least one unidentified portrait of the at least one detected face. The at least one computer may rotate the at least one unidentified portrait at least until the at least one unidentified portrait is shown in a vertical orientation and a pair of eyes of the at least one face shown in the at least one unidentified portrait are positioned on a horizontal plane.

Visualizing Relationships from Photo Metadata

When a set of digital photos contains name tags that identify the people represented in those photos then there is potential to "mine" that information and generate potentially interesting, entertaining, and useful techniques for displaying relationships between people that have been tagged in those photos. How the name tags are made available to the computer system is not limiting to the concept of using that data to display interesting graphs and charts. One approach to generating the name tags quickly is to use face detection and recognition technology. This technology speeds up the tagging process by automating most of the manual steps. The name tag data could simply exist in the photo metadata, such as in the Adobe XMP format, or it could exist in a SQL or other database.

Figure 46:
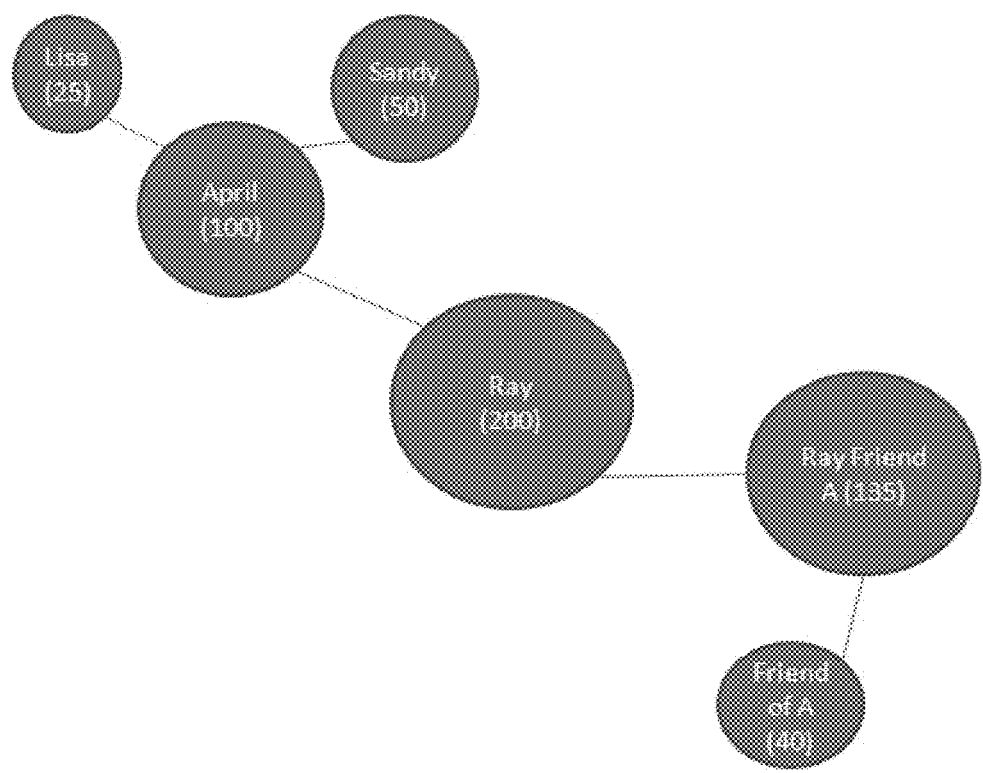
FIG. 46 illustrates a relationship diagram showing frequency of identified persons appearance together, in accordance with an aspect of the present invention.

FIG. 46 depicts a graph generated in accordance with an aspect of the present invention. The relationships between people appearing in photos are shown by interconnected lines between people. Starting with a central, or selected person (in this example: Ray), the invention shows a node that represents the number of photos in which Ray appears. The node may be sized relatively according to the number of photos. Any nodes attached directly to the central "Ray" node may identify people that appear in photos with Ray. So for example, April appears in 100 photos with Ray, and "Friend A" appears in 135 photos with Ray. Then the next layer of the diagram shows people that don't appear with Ray, but appear with the people connected directly with the Ray node. So, Sandy and Lisa appear together with April in photos. This method is used to graph all relationships moving outward from a central person. Each node may show a frequency of appearance together of the person named at the node and the person named at the immediately preceding node.

This graph in FIG. 46 could be used as an index to the photos. By clicking on any node in the graph, the corresponding photos represented by that node could be displayed in slideshow or thumbnail list format. The at least one computer could query the one or more photo databases in advance of receiving a click on any of the nodes in order to be prepared to present the corresponding photos, or the at least one computer could perform any such query or queries after having received the click user input.

In accordance with a non-limiting aspect of the present invention, at least one computer may include or interface with a database of digital images and respective metadata identifying a name of at least one identified person shown in the respective digital image. The at least one computer may select one of the identified persons from the database and determine a count of a total number of digital images where the identified person appears. For each identified person shown in at least one of the digital images with the selected identified person, the at least one computer may determine a count of a total number of digital images where the respective identified person appears with the selected identified person and display a visual representation, such as a graph or chart as shown in FIG. 46. The visual representation could include a first node representing the selected identified person (e.g. "Ray" in FIG. 46) and the respective count of the total number of digital images where the identified person appears. For each identified person shown in at least one of the digital images with the selected identified person, a second node may be presented representing the respective identified person shown in at least one of the digital images with the selected identified person. Each respective node may further include a visual representation of the respective count of the total number of digital images where the respective identified person appears with the selected identified person. Each second node may be linked to the first node, optionally in the form of a visible line or by other means of displaying a visible link.

Optionally, for each identified person displayed with a respective second node (a "second person"), for each identified person shown in at least one of the digital images with the respective second person, the at least one computer may determine a count of a total number of digital images where the respective identified person appears with the respective second person. In this case, the visual representation may include, for each identified person shown in at least one of the digital images with the respective second person, a third node representing the respective identified person shown in at least one of the digital images with the respective second person, each respective node further comprising a visual representation of the respective count of the total number of digital images where the respective identified person appears with the respective second person; and a link between the respective second node and each respective third node.

Figure 47:
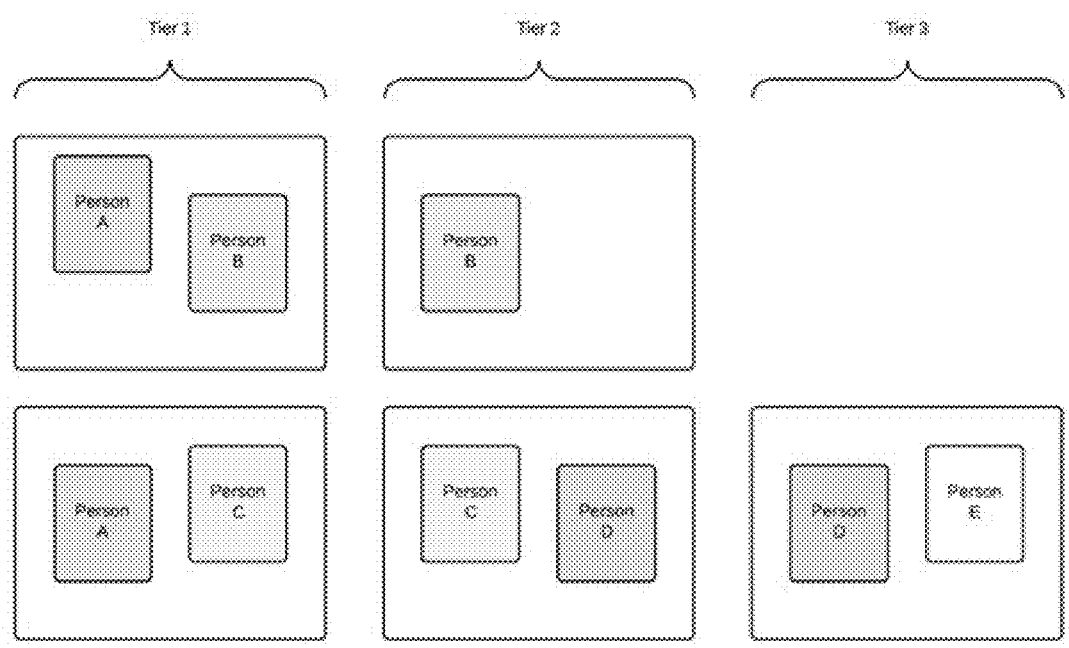
FIG. 47 illustrates displaying photos in a tiered list format in accordance with an aspect of the present invention.

Another non-limiting exemplary implementation could show the relationships purely in list format based on the tiers away from the central person. FIG. 47 shows how those photos may look arranged by tiers.

Figure 48:
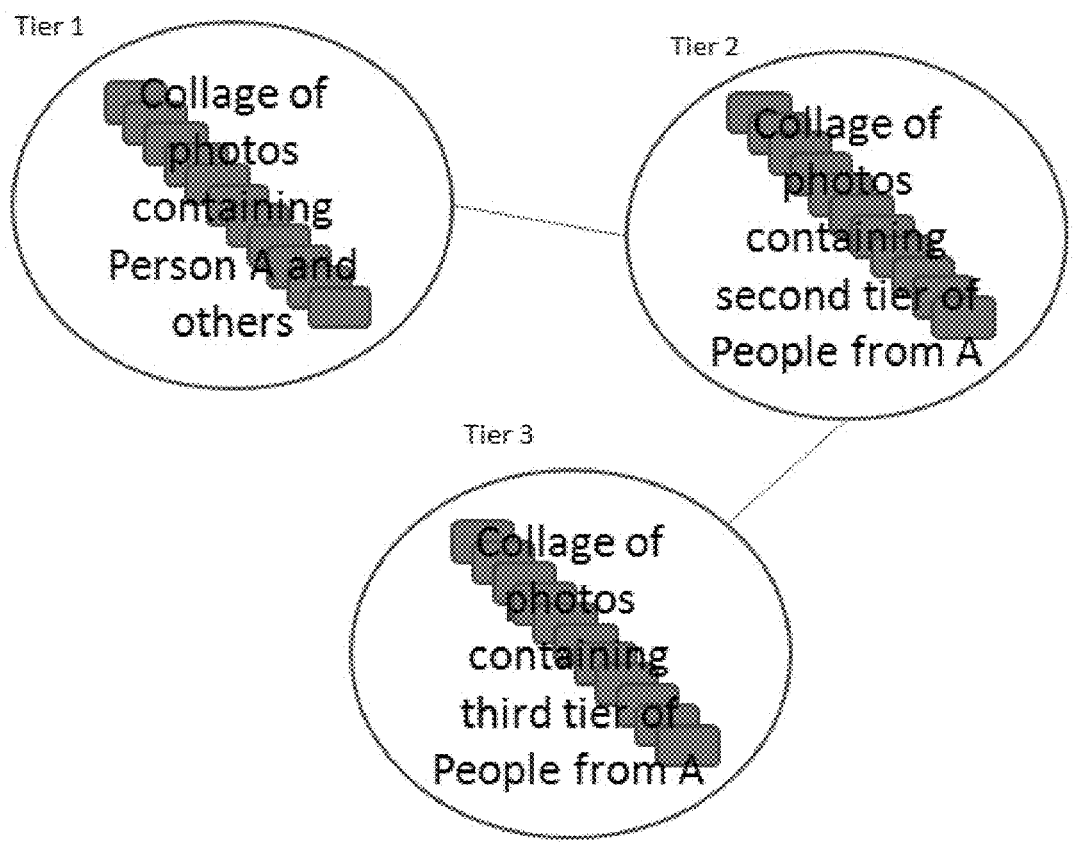
FIG. 48 illustrates a collage of photos representing the tiers shown in FIG. 48.

Another non-limiting exemplary implementation for representing the tiers may be to show a collage of photos contained in that tier. FIG. 48 shows a possible display that demonstrates this method.

Figure 49:
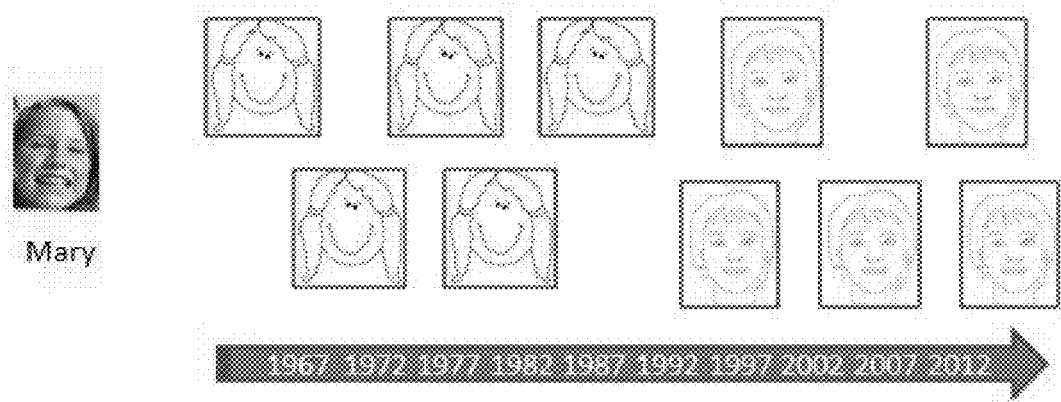
FIG. 49 illustrates displaying a timeline of face portraits for an identified person, in accordance with an aspect of the present invention.

Another non-limiting exemplary implementation of the present invention for showing the data available from the name tags in photos is to extract the face of a person from photos and display those faces on a timeline. FIG. 49 provides an example. Starting with a selected person (selected by the at least one computer or in accordance with user input), all faces of that person may be extracted from each photo in which they are tagged and displayed along some form of date or time axis. If more than one photo of the selected person is available, this may show the evolution of a person over time.

In accordance with a non-limiting aspect of the present invention, at least one computer may include or interface with a database of portraits, each portrait associated with an identified person shown in the respective portrait. The at least one computer may select one of the identified persons from the database, ordering a plurality of the portraits associated with the selected identified person based at least partly on date metadata associated with each respective portrait, and displaying a visual representation. The visual representation may include a timeline; and an arrangement of the plurality of the portraits along the timeline in accordance with the respective ordering.

More details regarding use of face detection and recognition for tagging purposes will now be described. Face detection algorithms operate in many different ways, but the net result of scanning a digital image and applying one or more of these algorithms is the presentation of a list of possible face regions. These regions are usually identified by a bounding box defined by four coordinates (e.g. top/left, top/right, bottom/left, bottom/right).

If a set of new photos is offered to a face detection system of the present invention, then the system may return a list of faces to the user and ask the user to tag the faces—in other words—attach a name to the faces. This name could be input via the keyboard or via drag and drop from an existing contact list or address book. The user may also typically provide input to delete any false positive faces where the system has falsely identified a region of a photo as a face.

A face recognition system of the present invention may take the face detection results (e.g. a list of bounding box coordinates and a pointer to the original digital image) and generate digital signatures for each face. These signatures are mathematical representations of the pixels that constitute the face as defined by the bounding box or other mask area applied to the bounding box or a subset of the bounding box. For example, it may be possible to use the eye coordinates of the face to center an oval mask over the face region to attempt to eliminate non-specific features like hair, hats, and other non-facial objects. Then only the pixels within this mask area are used to generate the face signature.

These mathematical signatures could be a sequence of numbers (real or complex) or a single digital string or a multi-dimensional array depending on the algorithm. Other functions performed by a face recognition system of the present invention may be to:

1. Compare two face signatures together to determine a "likeness" score. If that score passes a dynamic or pre-defined threshold then it becomes a "suggested" match between the two.
2. Combine "like" face signatures together into clusters of faces that are similar. This also uses a dynamic or pre-defined threshold to determine whether face signatures belong together in the same cluster.

An optional function is to find a representative signature for a single person that has a list of face signatures based on tagging activity by the user. In essence, this person is "known" to the system because faces have been tagged with the same name.

In accordance with aspects of the present invention, the present invention may enable the visualization of data relationships extracted from photo metadata—specifically name tags and dates that are attached to digital photos. This data could be attached to photos directly via common metadata formats (e.g. EXIF, Adobe XMP, etc.) or could exist separate from the photos in a database that links the photo name to the metadata contained in database tables.

Based on people identified via the tags (or in the database) and the frequency of appearance and who they appear with in the photos, data relationships are determined that can be graphed in different ways. These graphs provide ways to visualize the relationships.

The graphs may automatically be created by the invention or the user of the invention may request a graph be created starting with a specific person selected by the user. The specific person would become the center of the graph in a network representation, or left starting point in a "left to right" representation.

To collect the data required to display a graphic representation like FIG. 46, multiple queries may have to be run against a database containing metadata—specifically the name of people appearing in photos. If the data only existed in the metadata directly attached to the digital photos then this metadata would have to be collected via an image scanning process. The resulting collection could be placed in computer memory (such as an array of text fields) or it could be placed into a permanent or temporary SQL database for subsequent query purposes. For purposes of this part of the description, assume that the data resides in a SQL database.

The initial query would find a count for all images containing people that appear with the selected "starting" person in one or more photos. We'll call these people "acquaintances". The resulting list could be sorted in descending order based on number of appearances for each acquaintance. The graph would display the starting person as a node in the graph. The size of the node may or may not vary based on the number of photos. The number of photos in this case would be the total number of photos in which the "starting person" appears.

The next node displayed would be the first or largest acquaintance in the list. The size of the node may or may not vary with the number of times they appear in photos with the "starting person". This node would be attached via a connector to the original starting node. This process would continue until all the acquaintances are exhausted in the list. One non-limiting implementation would limit the size of the list to a minimum number of appearances together. The graph could represent people that appear in at least 3 photos with the starting person.

Once the list is exhausted, then for each acquaintance another query would be run to determine all of the people that appear together with that acquaintance but NOT with the starting person. Based on this list then nodes would be added to the graph with connectors back to the acquaintance.

This process would continue until all acquaintance nodes in the graph are exhausted. In order to limit the size of the graph—especially in the case of a person with tens of thousands of photos—it is possible that the user could specify a limit of X tiers away from the starting person.

The other types of graphs identified that show this "tier relationship" would be generated in a similar fashion to the above, but the method of display differs. For FIG. 47, the photos may be shown as thumbnails or scrollable images on a "Tier by Tier" basis. This could be a tabbed interface that offered a "tab per tier". For FIG. 48, the photos are shown in a collage format for each tier away from the central starting person. Each collage could be a separate graph or page, or they could be combined into one large graph.

To generate FIG. 49, the dates for the images may be used to define the ordering of faces along the timeline. The face images themselves may be extracted from the original photos using coordinates for a pre-determined bounding box around the face. The bounding box may be determined based on a face detection method that identifies the coordinates containing a face automatically, or the user may manually define a bounding box by physically drawing a box around the face with the aid of a mouse, touchpad or touch screen user interface.

In accordance with a non-limiting aspect of the present invention, at least one computer may include or interface with a database of digital images and respective metadata identifying a name of at least one identified person shown in the respective digital image. Each person may have been previously identified using face detection and recognition techniques described herein. The at least one computer may select one of the identified persons from the database, determine at least one first identified person shown in at least one of the digital images together with the selected identified person, and display a visual representation. The visual representation may include, for each first identified person, a first tier node representing the selected identified person and the respective first identified person being shown in at least one of the digital images together. The visual representation may also include, for each first identified person, a second tier node representing the respective first identified person being shown in at least one of the digital images without the selected identified person.

Optionally, the visual representation may include, for each first identified person, a second tier node representing the respective first identified person being shown in at least one of the digital images without the selected identified person, but with a second identified person, wherein the second identifier person is determined not to be shown in any of the digital images showing the selected identified person.

Optionally, the visual representation may include, for each second identified person, a third tier node representing the respective second identified person being shown in at least one of the digital images without the respective first identified person.

Optionally, each first tier node may include a collage of the digital images that show both the selected identified person and the respective first identified person.

Optionally, each first tier node may include a collage of digital images that show both the selected identified person and the respective first identified person; each second tier node may include a collage of the digital images that show the respective first identified person without the selected identified person; and each third tier node comprises a collage of the digital images that show the second identified person without the respective first identified person.

Clustering Description

An optional function of the present invention may be to find a representative signature for a single person that has a list of face signatures based on tagging activity by the user. In essence, this person may be "known" to the system because faces have been tagged with the same name. For purposes of determining a likeness score and suggesting a match between two photos, the representative signature is used to compare with each unidentified face to determine if there is a match. The representative face signature could also be a set of face signatures such that each item in the set may represent a single cluster of face signatures for that specific person.

Finding a representative face for a group of faces assigned to a person may be useful in order to reduce the time required to compare a large number of known faces (e.g. potentially hundreds of known faces, or more) with each new unidentified face. Furthermore, people age over time and change their appearance for a variety of reasons so using a set of face signatures representing clusters of similar faces for a particular person can provide better results while at the same time reduce the number of comparisons necessary versus comparing every specific known face.

A further use of clustering may be to present "like" faces to the user in batches for tagging purposes. This may save time in providing the ability to tag many faces with one name, instead of tagging each individual face.

One challenge with clustering is that for performance reasons it is not desirable to have to re-cluster the entire set of unidentified faces as new faces are introduced to the set. It may be more efficient to employ various techniques that allow for the creation and management of incremental clusters.

Details will now be described regarding clustering for the purposes of finding the representative faces for an individual during the recognition step. The plurality of faces associated with a known person may be grouped using a form of hierarchical clustering, where face signatures are compared as described above, to create groups of faces having similar appearance. To compare an unknown face to the known person, all of the individual, one to one, face comparisons may be made, and then the results may be combined by arithmetic mean to form one or more aggregate results, one for each group of similar faces.

To enable effective comparison of the aggregate results a linear correction which depends on the number of individual results used to compute the aggregate result may be applied. This linear correction may be determined by first comparing a group of known faces having a particular number, "N", with a large number of individual faces known to belong to different people to determine the distribution of results.

Then the linear correction may be determined to be that which best aligns this distribution to a standard normal distribution. Finally, the correction may be further adjusted so as to give larger groups of faces an advantage in the comparison with unknown faces by either increasing the standard deviation or shifting the mean. This final step ensures that people who appear frequently in a user's collection of photos have an appropriate increase in their likelihood of being suggested as a match for a new unknown face.

The plurality of corrected aggregate results obtained by comparison of a single unknown face to all of the known persons may be compared against either a fixed threshold or a dynamically chosen threshold. If a dynamically chosen threshold is to be used, it may be selected to be the threshold that yields the maximum number of unknown faces for which only a single person has results exceeding the threshold. The advantage of such a dynamically chosen threshold is that it maximizes the number of true person suggestions while simultaneously minimizing false positive suggestions.

In one embodiment of the invention this clustering process could employ a similar method to what is described under the term "hierarchical clustering" in Wikipedia (See: http://en.wikipedia.org/wiki/Hierarchical_clustering). The initial clustering may be "agglomerative" (a bottom up approach where each observation starts with its own cluster, and pairs of clusters are merged as one moves up the hierarchy) while the selection of representative faces may be "divisive" (a top down approach where all observations start in one cluster, and splits are performed recursively as one moves down the hierarchy). Initially every face is considered to be its own separate cluster. Each face is compared to every other face and the score (likeness) values are recorded and sorted. Scores below a certain pre-determined threshold are discarded. Then, starting with the highest score (the two faces that are most alike) and working towards the lowest score, each pair of faces are joined by an edge if they are not already joined via some path of edges. That is, two separate clusters are merged but faces within a cluster are not further joined by additional edges. The result is several distinct dendrograms (trees), each one representing a cluster. Note that within each dendrogram there are no loops and the number of edges is one less than the number of faces. For each cluster where the number of faces is larger than some specific integer threshold (e.g. 20), we select a subset of the faces to represent the cluster.

Selection of the subset could be implemented as follows. First find the edge with the lowest score and remove it to split the tree into two smaller subtrees. Then decide how many faces will be selected from each subtree so that the counts are in equal proportion to the size of the subtree. For example, if we are looking for 15 faces and subtree A is twice as big as subtree B, then we will want to select 10 faces from subtree A and 5 faces from subtree B. If the number of faces in the subtree is equal to the number we want, then those faces are simply output as the result and processing of that subtree terminates. If the number of faces is greater than the number we want, this process is applied again recursively. That is, within the subtree, the next edge with the lowest score is found and removed to further divide the tree. The result is the reduction of a tree of any size to some fixed size such that the remaining faces are a statistically representative sample of the original set of faces.

Details will now be described regarding the use of clustering for unidentified faces to improve the time involved for tagging by reducing the number of clicks required by the user. For practical and performance reasons, in accordance with an aspect of the present invention, a fully incremental constant time clustering algorithm was created. At least one advancement of this clustering algorithm may be the constant time aspect, which does not vary depending on total number of photos in the set. To describe the steps involved in adding a new face to the existing clustering, first assume that each of the existing faces has been assigned some sort of clustering token (e.g. an integer). Two faces are considered to be in the same cluster if they have the same token. Second, assume that each face is associated with some photo and that each photo has a date and time associated with it. This is usually but not always the date and time that the photo was taken. Finally, the photos are kept in a sorted order by this date and time metadata.

Given a new photo with at least one face in it, first use the date/time of the new photo to find its location within the sorted list of existing photos. Then start performing one-to-one face comparisons between the new face and existing faces by moving outward in both directions from this location. That is, the new face is first compared to existing faces that were photographed at a similar date/time before moving to progressively more distant (past and future) dates.

If a one-to-one face comparison yields a likeness that exceeds some fixed threshold, then the new face is assigned the same cluster token as the existing face and the clustering of the new face is complete.

Three rules may be applied to ensure that the time spent adding each new face to the clustering is constant. First, new faces are never compared to other new faces in the same photo. Second, if the new face fails in its comparison to one face of a particular cluster, then the new face is not compared against any other faces from that same cluster. Third, we now have a fixed maximum number of comparisons that will be made. If this number is reached without finding a match, then the new face will be assigned a new cluster token and will, therefore, be the first face in a new cluster.

Finally, when processing a batch of photos, the photos are processed in a random order to improve "long range" clustering.

Figure 50:
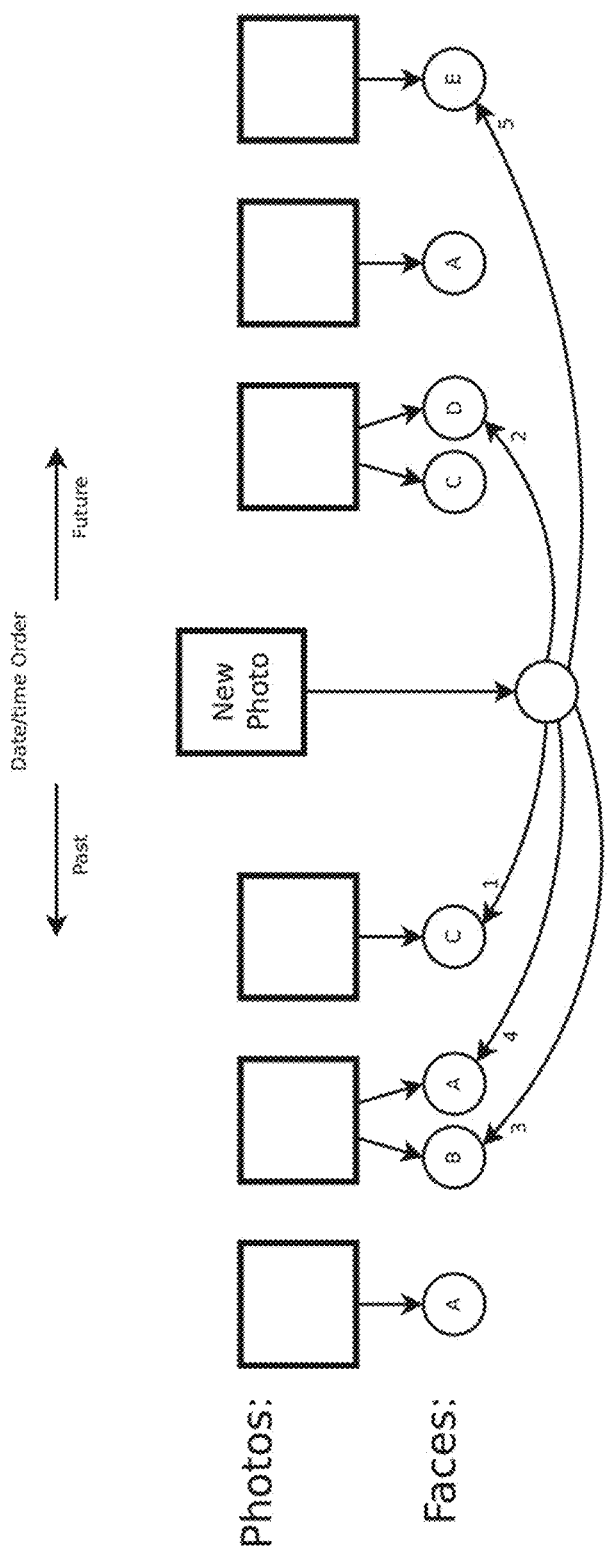
FIG. 50 illustrates identifying a face in a photo by using clustering in accordance with an aspect of the present invention.

FIG. 50 shows photos and faces with associated dates and times, arranged chronologically. The "New Photo" is being analyzed in accordance with the present invention. The letters on each face represent the cluster id/token for the respective face. The curved lines with arrows shown below the cluster tokens in FIG. 50 represent the face-to-face comparisons that are to be performed from faces in the New Photo to faces in other photos. The numerical value shown on the curved lines representing the face-to-face comparisons indicates the order in which the respective face-to-face comparisons are performed. For example, photos with the closest date/time to the New Photo may be compared first, and the remaining faces may be compared in chronological order of the associated dates and times of the photos or faces. Assuming no matches were found in earlier face-to-face comparisons, the three existing faces with no curved lines linking the respective faces to the face from the New Photo, indicate that comparisons with those respective faces were skipped, as the respective faces belonged to a cluster already considered.

In order to show a match, the comparisons cease when a match is found and the new face takes on the same cluster id letter as the matching face (e.g. "E"), shown in FIG. 50.

In order to show no-match, then the new face may get assigned a new cluster id (e.g. "F"), not shown in FIG. 50.

In accordance with a non-limiting aspect of the present invention, at least one computer may include or interface with a database of digital images and respective metadata identifying a date of the respective digital image, a plurality of the digital images showing at least one respective unidentified person ("unidentified digital images"). The at least one computer may sort the unidentified digital images by the respective date metadata, and assign a respective clustering token to each of the unidentified digital images. The assigning may include, in accordance with a determination that a subset of the unidentified digital images each show a common unidentified person, assigning a common respective clustering token to each of the unidentified digital images of the subset. The at least one computer may group the unidentified digital images by respective clustering token. At some point, the at least one computer may receive a new digital image from another computer, database, user, or from anywhere else. The new digital image and respective metadata may identify a date of the respective new digital image, and the new digital image may include a new unidentified person. The at least one computer may then attempt to identify the new unidentified person in the received image by using or leveraging any of the clustering techniques described herein. In particular, the at least one computer may perform at least one comparison of the new unidentified person to the at least one respective unidentified person of the plurality of the digital images in an order, wherein for each group of unidentified digital images, the at least one computer may perform only a single comparison of the new unidentified person to the respective common unidentified person. The at least one computer may assign a clustering token to the new digital image in accordance with the comparison performing resulting in a determination of the new unidentified person common to a respective one of the groups of unidentified digital images. Optionally, the comparison performing order comprises an order by date metadata closest in date to the date metadata of the new digital image. Optionally, wherein upon having performed a predetermined maximum number of comparisons of the new unidentified person to the at least one respective unidentified person of the plurality of the digital images, the at least one computer may halt the comparison performing and assigning a new clustering token to the new digital image.

Figure 51:
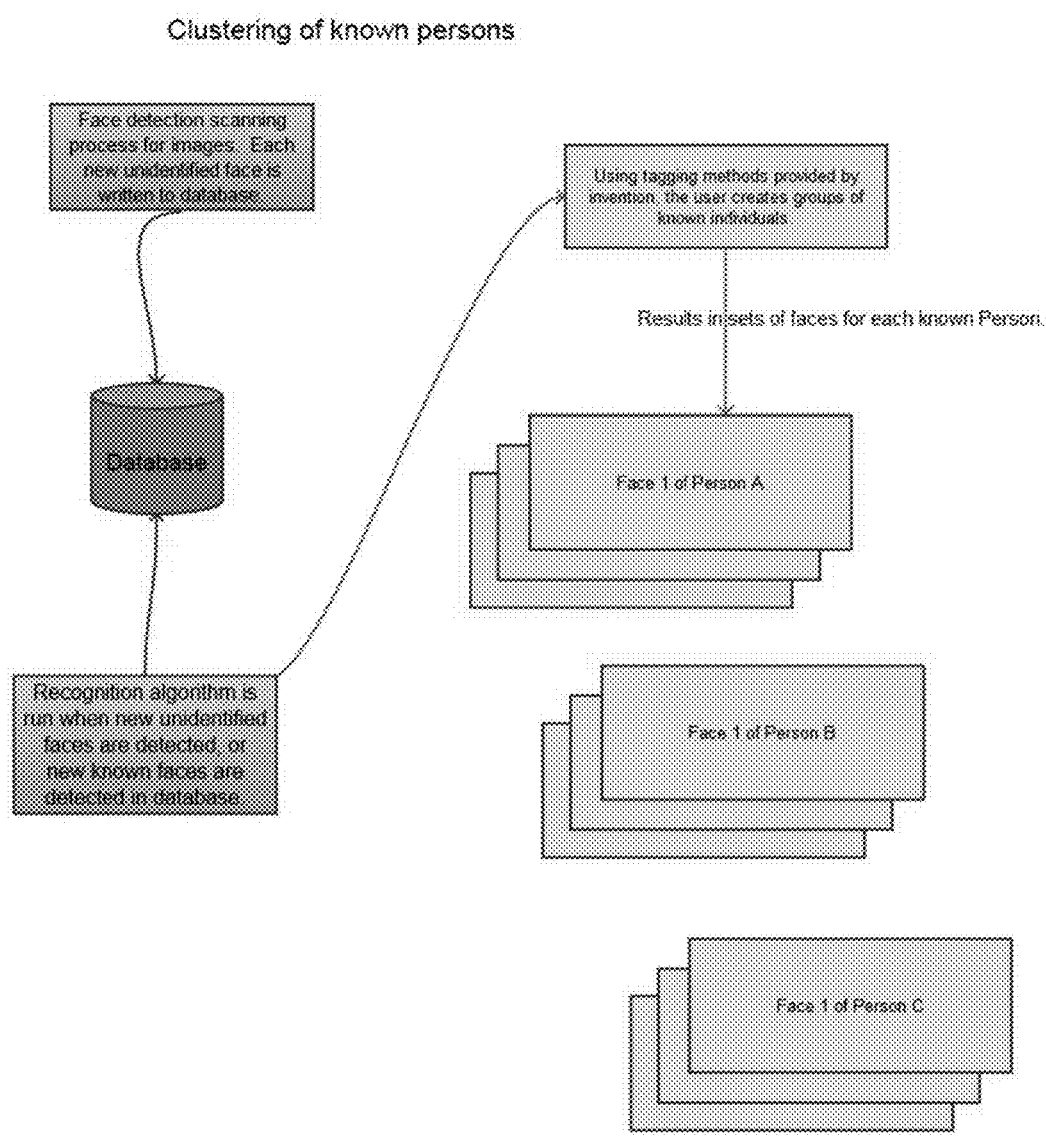
FIGS. 51-53 illustrate face grouping and clustering in accordance with an aspect of the present invention.
Figure 52:
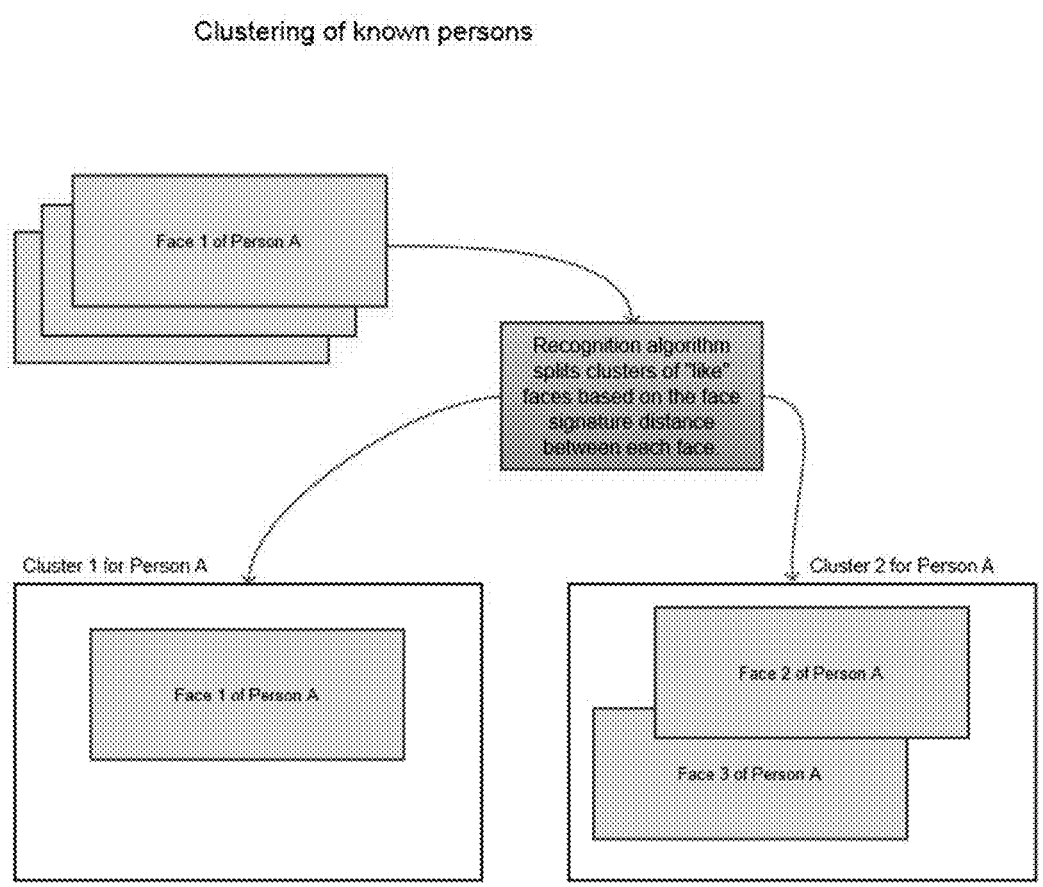
Figure 53:
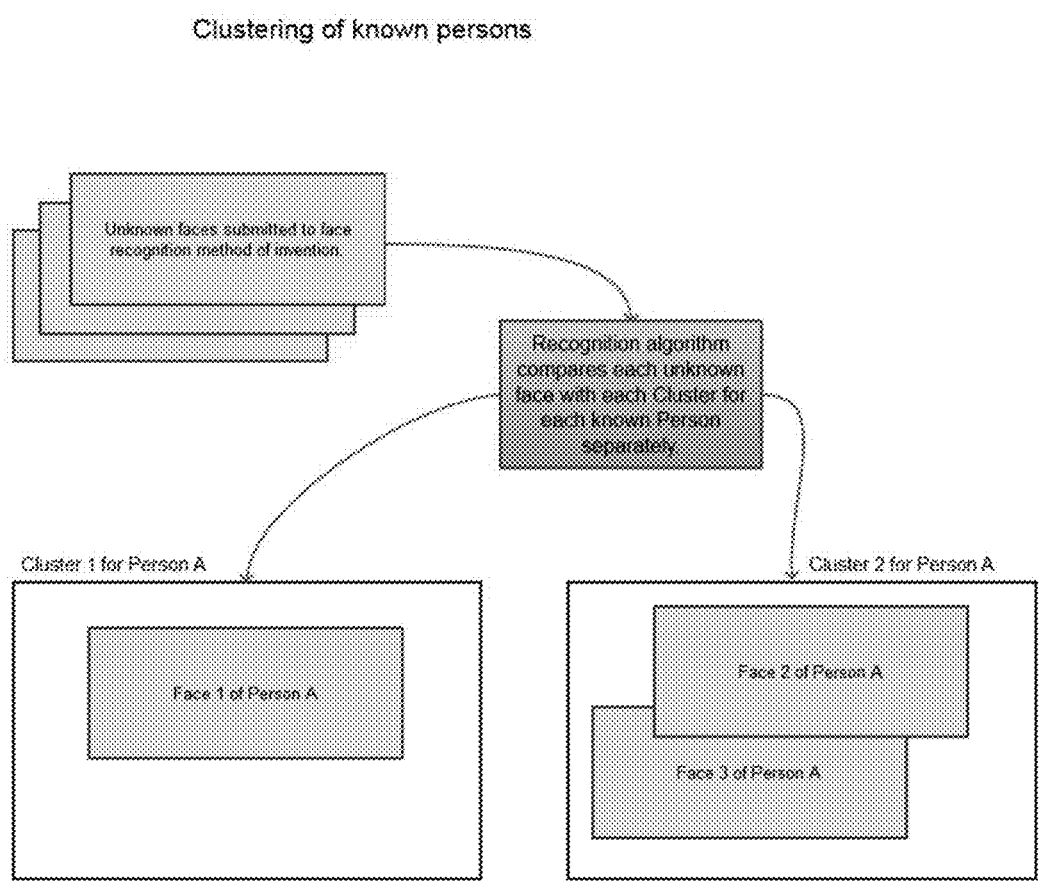

FIGS. 51-53 illustrate aspects of the faces clustering of the present invention. FIG. 51 shows faces of a respective known person may be grouped through tagging methods provided by the present invention. In FIG. 51, groups of faces of known persons A, B, and C, are respectively grouped. In FIG. 52, a recognition algorithm in accordance with the present invention may the groups of faces of a known person into one or more clusters of faces of the known person. The splitting into clusters of like faces may be based at least partly on the face signature distance between each face in the group of faces of the known person. In FIG. 53, when an unknown face is submitted to the face recognition method of the present invention, the recognition algorithm of the present invention may compare the unknown face with each cluster for each known person separately.

Using Image Metadata to Improve Face Recognition Results

A challenge in face recognition may be that due to the unconstrained nature of consumer photos taken with a wide range of camera devices—including smart phones, cell phones, and disposable cameras—the ability to accurately identify people in photos (or video) will likely never reach 100% accuracy. There are just too many variables similar to the challenges associated with accurate weather forecasting.

It is possible to enhance the accuracy of recognition results beyond the pure mathematics of analyzing and comparing pixels contained in the image. By taking advantage of image related metadata including date taken, camera type, location coordinates, and event information it is possible to reduce false positive data generated from the face recognition algorithms. In a further extension of this concept it is also possible to recognize other objects in the image (non-human) that could relate to a specific place, event or time.

These concepts also apply to video images in addition to static images. They can be applied in real-time as the user is taking the photo or video; or they can be applied post-image taking.

Figure 40:
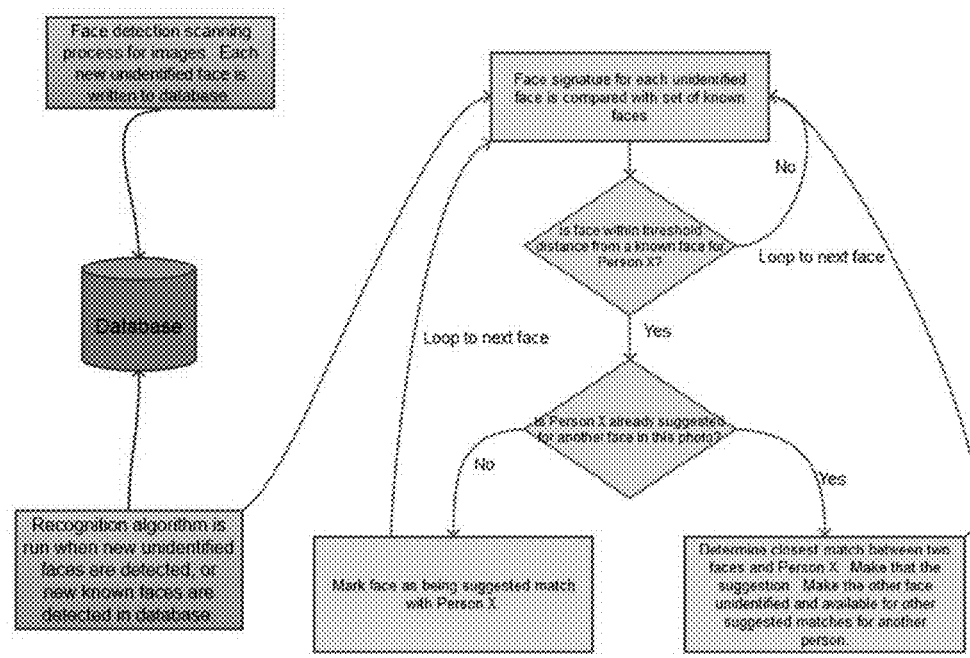
FIGS. 40-45 illustrate workflows in accordance with aspects of the invention to use metadata to enhance face recognition results.

A non-limiting implementation of this concept in accordance with an aspect of the present invention in shown in FIG. 40. Face recognition algorithms operate on a list of unidentified faces and compare the digital signatures for those faces against digital signatures for known faces. Any faces from the unidentified set that come within a predefined (or algorithmic) threshold with a known face will become "suggested matches" for the person linked to the known face. If a single photo generated five face regions from the face detection scan, then it may be inefficient to have the same person offered as a suggestion for more than one face in the same photo. Note that there could be special circumstances (e.g. photos involving a mirror and photos modified with an editor) where the same person could appear more than once in a single photo, however it is not practical to design a system that satisfies these rare corner cases. Thus, if the face recognition algorithm came up with two (or more) faces from the same image as a suggestion for the unidentified person, then further logic would consider the fact that the two (or more) faces are in the same image and request the "most closest match" to be the suggestion used. Should the most closest match that is suggested to the user be rejected by the user, in order to improve efficiency, it may be desirable to, with respect to any faces not the most closest match from that image, and thus not suggested, discarded those faces from being suggested in any other digital images as well. Any rejected face(s) suggestions may then be compared against the set of known people excluding the unidentified person to find the next best match (if any).

In accordance with a non-limiting aspect of the present invention, at least one computer may include or interface with a database of portraits and associated digital images, each portrait associated with an identified person shown in the respective portrait. The at least one computer may determine that respective portraits of at least two identified persons shown in one of the digital images satisfy a comparison threshold with a portrait of the unidentified person determined from the received digital image. The at least one computer may then suggest an identification of the unidentified person as the respective one of the at least two identified persons having a respectively associated portrait that is determined to be a closest match to the portrait of the unidentified person from amongst the at least two identified persons. The at least one computer may then exclude a remainder of the at least two identified persons from being subsequently suggested from any other one of the digital images as an identification of the unidentified person.

Figure 41:
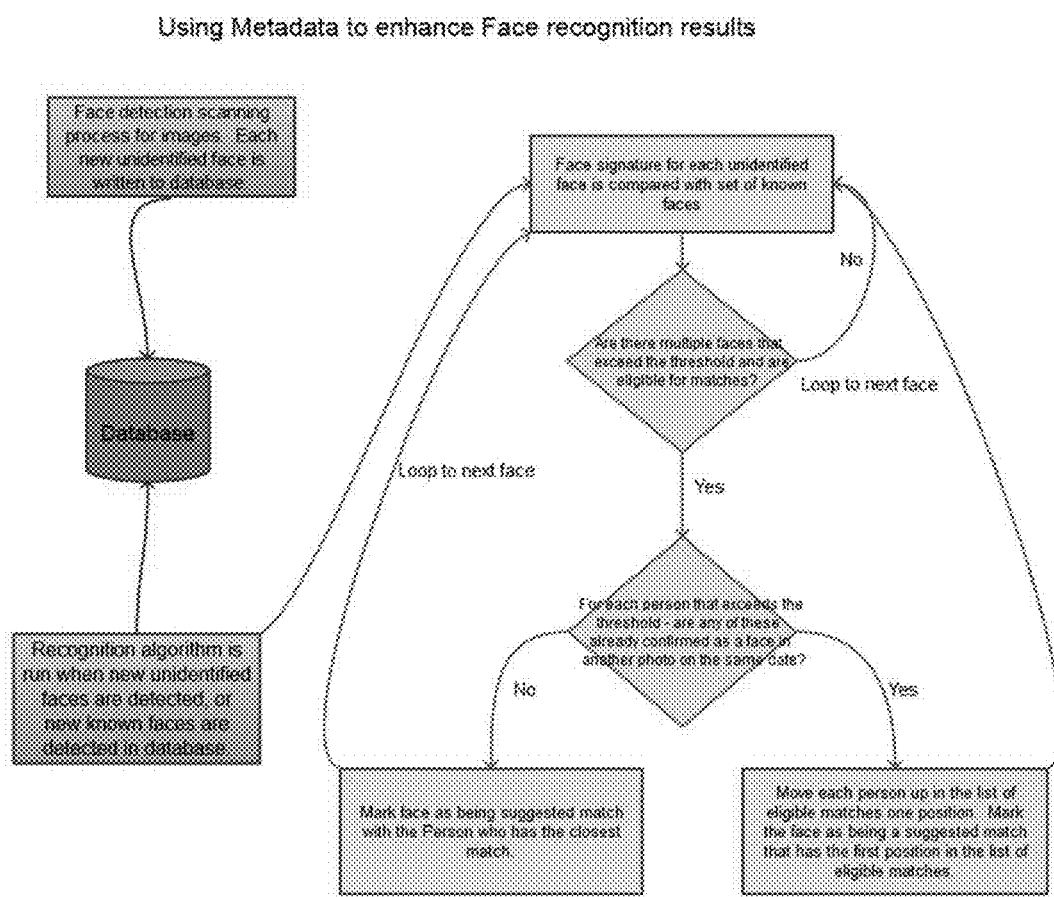

Dates or times may also be considered when suggesting faces, as shown in FIG. 41. It should be assumed that the metadata (e.g. dates, coordinates, camera type, etc.) related to the images being used for the present invention is accurate, otherwise basing face suggestions based on the metadata would not be expected to increase accuracy. Consider a person, referred to as P, tagged in a photo that shares the same date as another photo. In the other photo, assume there exists an unidentified face where two (or more) people meet the recognition threshold for calling that face a suggested match for those people. Then if one of those people that meet the threshold happens to be confirmed by the user to be person P, the present invention may increase the ranking of person P in a list of suggested identifications based on the probability that person P will show up again in photos from the same date after already having been tagged and confirmed to be present on that date in another photo.

In accordance with a non-limiting aspect of the present invention, at least one computer may include or interface with a database of portraits and associated digital images, each portrait associated with an identified person shown in the respective portrait. The at least one computer may determine that a respective portrait of at least one identified person shown in at least one of the digital images satisfies a comparison threshold with a portrait of the unidentified person determined from the received digital image. In accordance with the determined at least one of the digital images associated with metadata comprising a date corresponding to date metadata associated with the received digital image, the at least one computer may suggest an identification of the unidentified person as the at least one identified person.

Figure 42:
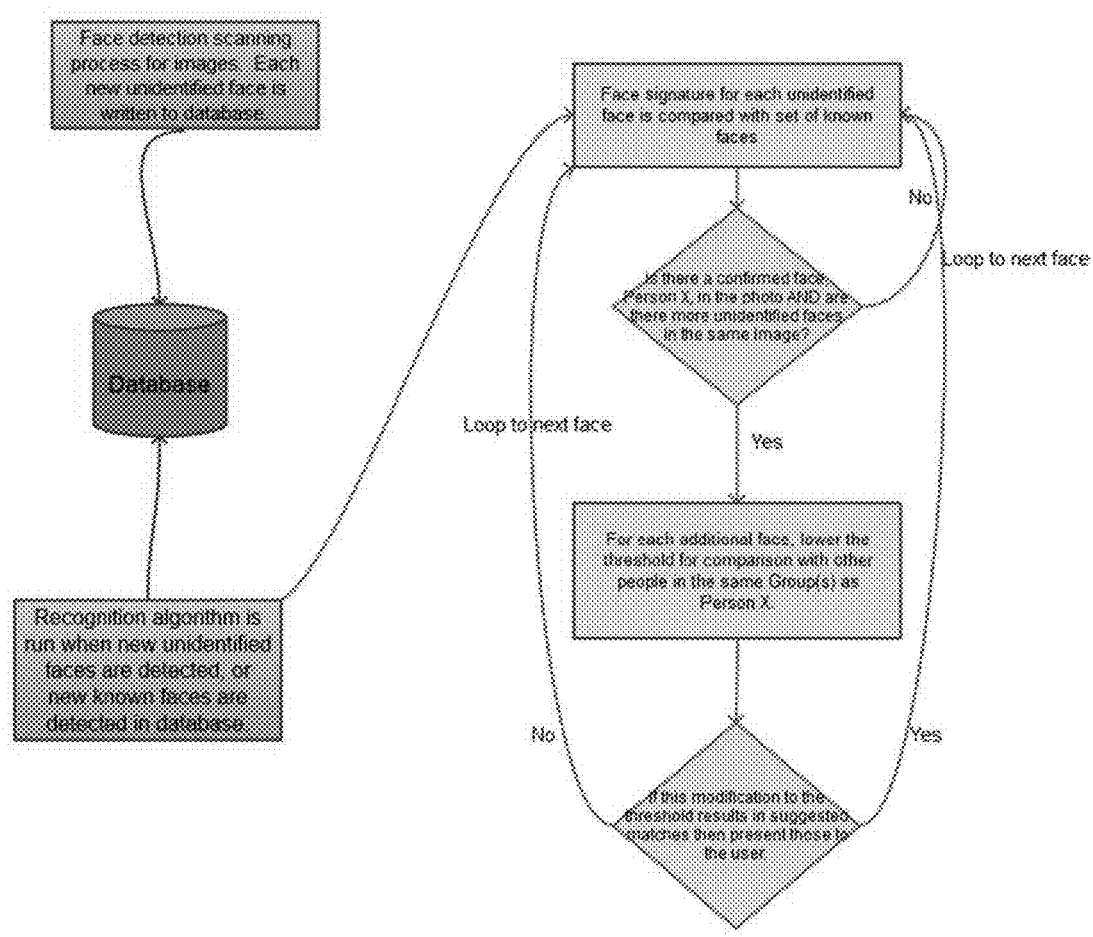

Relationships with people may also be considered, as shown in FIG. 42. Assume a person, referred to as P, is tagged in a photo and other unidentified faces are found in that photo. Further assume that person P also belongs to a group, referred to as C, and this group is known to the system. Then as part of the recognition suggestion algorithm, the fact that the probability of other faces in the photo also being members of group C is higher could be considered in the method by reducing the threshold for each person that is a member of group C, or moving a person from group C higher in the list of potential matches if there is more than one person meeting the suggestion threshold for a given unidentified face.

In accordance with a non-limiting aspect of the present invention, at least one computer may include or interface with a database of portraits and associated digital images, each portrait associated with an identified person shown in the respective portrait. The at least one computer may, in accordance with a determination that the received photo comprises at least one identified person associated with a defined group, suggest an identification of the unidentified person based at least partly on a determination that a respective portrait of at least one identified person associated with the defined group satisfies a comparison threshold with a portrait of the unidentified person determined from the received digital image.

Figure 43:
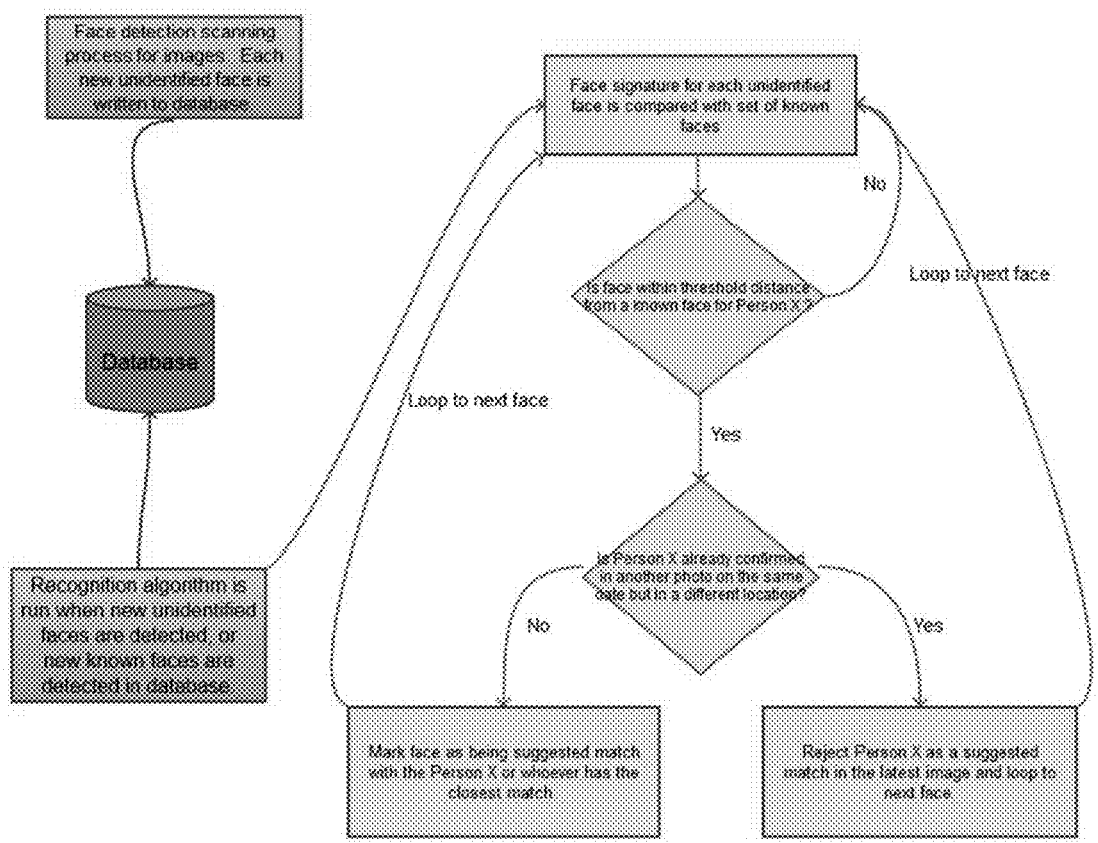

Locations or location coordinates may also be considered, as shown in FIG. 43. Assume a person P is tagged and confirmed to be in a photo in location X on date A, and, per the recognition algorithm, person P would normally be a suggested match for unidentified faces in other photos also taken on date A, but in location Y, where Y is more than N hours away from X. In this case, the suggested match for person P may be discarded on the basis that person P could not have been, or was unlikely to have been, in both locations X and Y within the date timeframe established by the metadata of the respective photos. This may take into account the probability that person P cannot be in two places at the same time.

In accordance with a non-limiting aspect of the present invention, at least one computer may include or interface with a database of portraits and associated digital images, each portrait associated with an identified person shown in the respective portrait. The at least one computer may determine that a respective portrait of at least one identified person shown in at least one of the digital images satisfies a comparison threshold with a portrait of the unidentified person determined from the received digital image. In accordance with the determined at least one of the digital images associated with metadata comprising both (i) a date corresponding to date metadata associated with the received digital image; and (ii) a location within a predetermined distance threshold of location metadata associated with the received digital image; the at least one computer may suggest an identification of the unidentified person as the at least one identified person.

Figure 44:
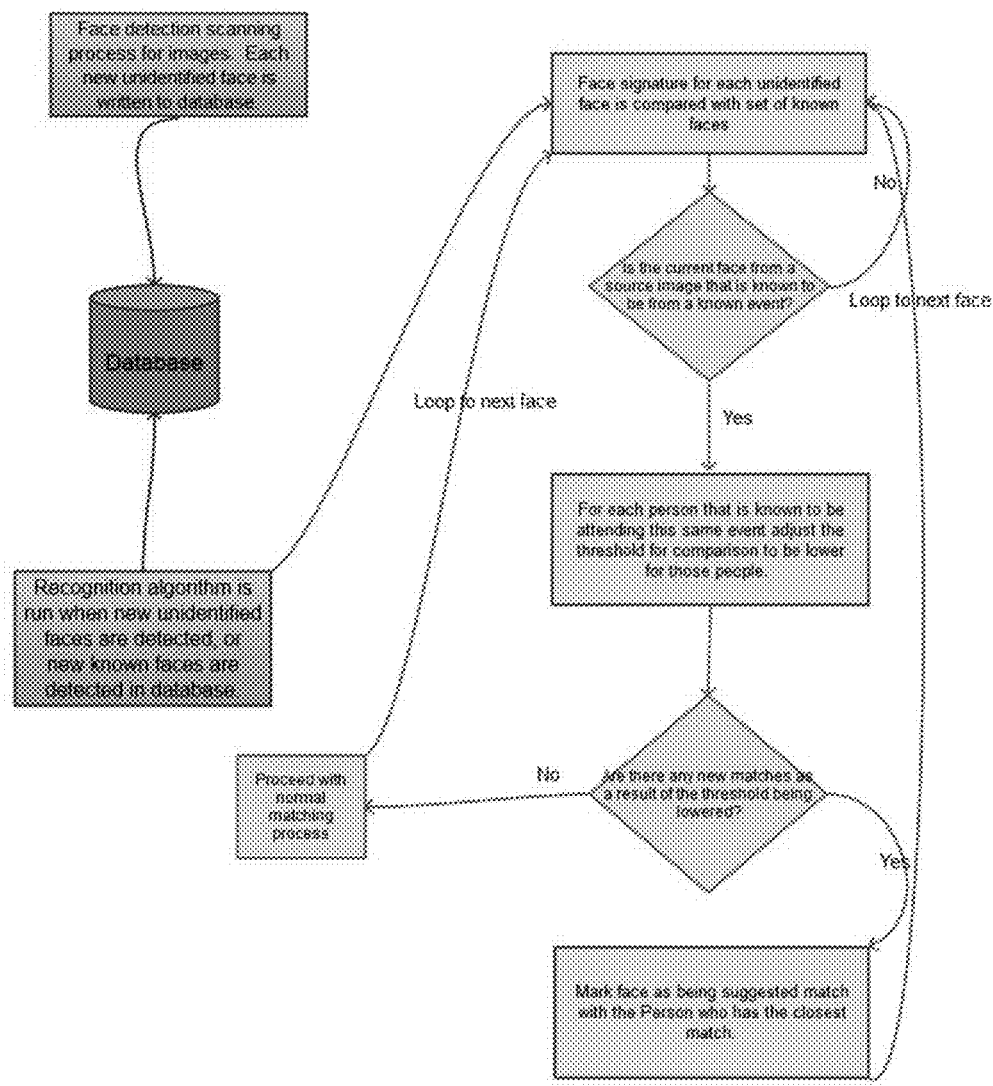

Event information, or other information available on a social network, may also be considered, as shown in FIG. 44. Assume the system knows the person P is attending an event X based on social network information captured for that user or other data source, then the probability that person P will appear in photos taken at event X is higher. It is also reasonable to assume that the probability that person P will show up in photos taken at event Y, taking place on the same date, is lower. The recognition method could utilize this further information to assign person P a higher ranking (via one or more specific adjustments) for faces found in photos taken at event X where P would otherwise meet a threshold for being suggested as any of the unidentified faces. The recognition method could also assign person P a lower ranking (via one or more specific adjustments) for faces found in photos taken at event Y.

In accordance with a non-limiting aspect of the present invention, at least one computer may include or interface with a database of portraits and associated digital images, each portrait associated with an identified person shown in the respective portrait. The at least one computer may determine that a respective portrait of at least one identified person shown in at least one of the digital images satisfies a comparison threshold with a portrait of the unidentified person determined from the received digital image. The at least one computer may also determine that the received digital image is associated with an event, based at least partly on metadata associated with the received digital image. In accordance with the determined at least one of the digital images being associated with the event, the at least one computer may suggest an identification of the unidentified person as the at least one identified person.

Figure 45:
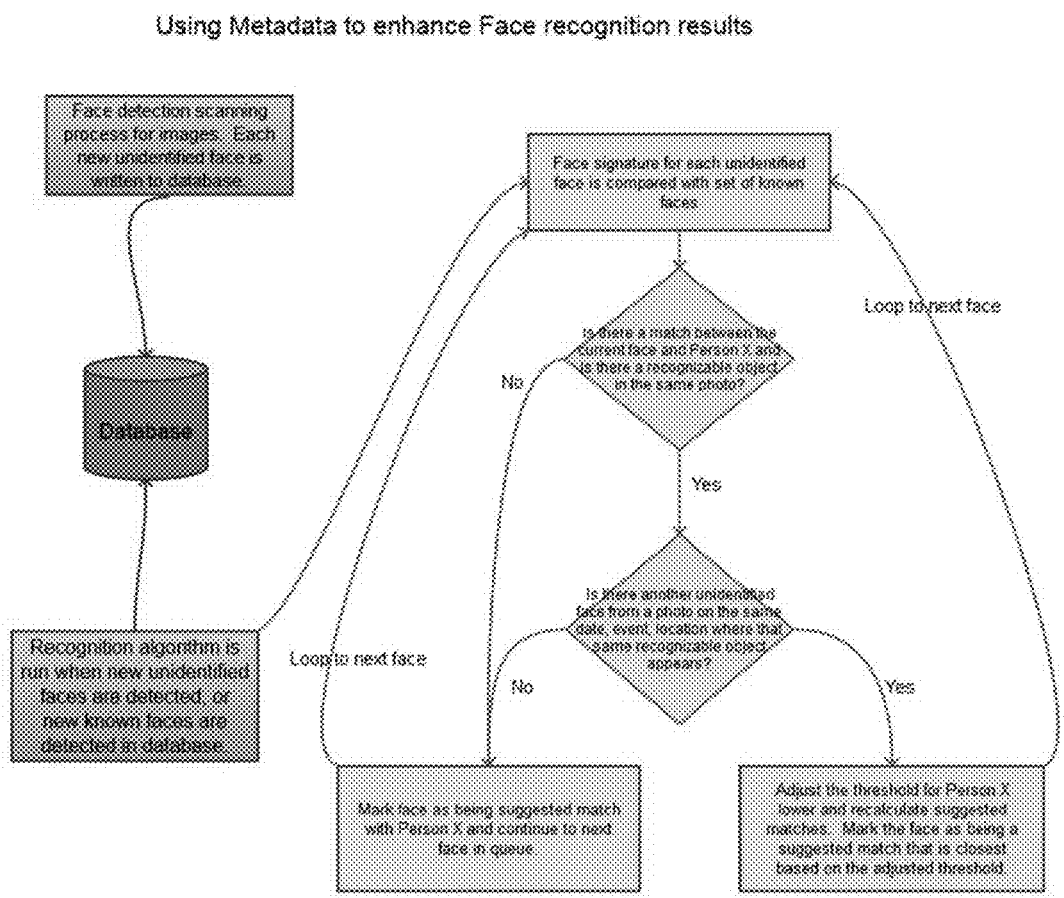

Non-human object or environmental information may also be considered, as shown in FIG. 45. For example, assume that a person P was confirmed and tagged in a photo, and that photo was deemed to be part of a set X of similar photos based on date, event, or location information. Then if person P was further found in the confirmed photo using an object recognition method to be wearing a green sweater, then that information could be used to apply a higher priority or ranking to person P if a face in another photo from set X was found also to be attached to a green sweater. In addition to clothing, other objects shown in the photo, such as furniture, trees, cars, animals, clouds, vistas, or any other environmental arrangements of photographic details may be analyzed and considered. The color, texture, orientation, or arrangement of any such details may be analyzed and considered. Particularly, if person P tagged in a photo of a set based on date, event, or location, then non-face details of person P may be compared to suggest that person P is an unidentified person in other photos of the set (non-face details may include clothing shape or color, hair color, glasses, skin tone, etc.)

In accordance with a non-limiting aspect of the present invention, at least one computer may include or interface with a database of portraits and associated digital images, each portrait associated with an identified person shown in the respective portrait. The at least one computer may determine that a respective portrait of at least one identified person shown in at least one of the digital images satisfies a comparison threshold with a portrait of the unidentified person determined from the received digital image. The at least one computer may then extract non-portrait visual information from the determined at least one of the digital images. In accordance with a determination of the extracted non-portrait visual information satisfying a comparison threshold with non-portrait visual information from the received digital image, the at least one computer may suggest an identification of the unidentified person as the at least one identified person.

Voice-assisted Face Tagging

Optionally, voice or speech recognition may be used to assist or support face tagging as provided in aspects of the present invention. The at least one computer may prompt the user to tag photos. The user may respond by providing user input using any available means, such as by clicking with a mouse, touchpad, key entry, or by responding with voice input. The user may be interfacing with a local computing device, upon which the face tagging method is operating, or the user may be interfacing with a computer in communication with one or more other computers or computer servers, that alone or together provide for the tagging of photos or faces. In either case, the local computing device with which the user is interfacing, which may be a mobile phone, personal computer, or any other type of computing device, may include or be connected to, either through a wired or wireless connection, a microphone or other audio input peripheral. The local computing device, or one of the other computers in communication therewith, may process the user's audio input to determine one or more voice commands.

Once the tagging process has begun, and voice recognition is supported and enabled, the user may be presented with one or more photos to tag. Optionally, the user may be asked whether the user recognizes a particular photo. One of the computers may have attempted to determine a date or time of the photo. The user may be prompted to either confirm or modify this date or time. A voice command may be provided from the user in response to be processed by one of the computers. Through the face recognition methods described in accordance with aspects of the present invention, where at least one person is determined to be found in the photo, the user may be prompted to identify the at least one person. A voice command may be provided from the user in response identifying the person by name. Where the voice command does not provide a full name for the person, the face recognition method may suggest a full name to be used to tag the person based on the voice command received. For example, if the user identifies the person as "Bob", the method may suggest at least one full name for "Bob" based on other persons named "Bob" tagged in other photos by the user, or based on other persons named "Bob" who are connected to the user through a social network or contact list. This process may repeat for all of the persons in the photo, and for any other photos not yet tagged by the user. Optionally, existing photos already tagged may also be represented to the user for tagging or re-tagging, preferably after all untagged photos have been processed and tagged in accordance with the method of the present invention. The method may also prompt the user to record a caption for any photos being tagged. Any recorded caption may be played back for the user to confirm prior to applying to the respective photo. The caption may also be processed through voice recognition techniques and saved as a text caption associated with the respective photo. The caption text may also be presented to the user for review or confirmation prior to saving.

General

It will be appreciated that any module or component exemplified herein that executes instructions may include or otherwise have access to computer readable media such as storage media, computer storage media, or data storage devices (removable and/or non-removable) such as, for example, magnetic disks, optical disks, tape, and other forms of computer readable media. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD), blue-ray disks, or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device, tracking module, object tracking application, etc., or accessible or connectable thereto. Any application or module herein described may be implemented using computer readable/executable instructions that may be stored or otherwise held by such computer readable media.

Thus, alterations, modifications and variations can be effected to the particular embodiments by those of skill in the art without departing from the scope of this disclosure, which is defined solely by the claims appended hereto.

In further aspects, the disclosure provides systems, devices, methods, and computer programming products, including non-transitory computer readable memory, or non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed is:

1. A method performed by at least one computer, the method comprising:
   detecting at least one face in at least one digital image by a first processing run on the at least one digital image to detect a candidate face and a second processing run processing on a reduced region of the at least one digital image at one or more incremental rotation angles of the at least one digital image, the second processing run detecting the at least one face if the candidate face is detected in two or more of the incremental rotation angles;
   determining and storing area co-ordinates of a location of the at least one detected face in the at least one digital image;
   applying at least one transformation to the at least one detected face to create at least one portrait of the at least one detected face;
   rotating the at least one portrait at least until the at least one portrait is shown in a vertical orientation and a pair of eyes of the at least one face shown in the at least one portrait are positioned on a horizontal plane; and
   storing the rotated at least one portrait.

2. The method of claim 1 wherein each of the at least one detected face corresponds to a person.

3. The method of claim 1 comprising extracting the at least one detected face from the at least one digital image prior to the applying.

4. The method of claim 1 comprising inserting the at least one stored portrait in a marketing image.

5. The method of claim 4 wherein the marketing image is an advertisement.

6. The method of claim 4 comprising applying at least one additional transformation to the at least one stored portrait for matching a portrait size requirement of the marketing image.

7. The method of claim 1 comprising:
receiving a selection of at least one face to be suppressed;
masking the area co-ordinates corresponding to the location of the at least one face to be suppressed in the at least one digital image.

8. The method of claim 7 wherein the masking comprises overlaying a selected image over the area co-ordinate corresponding to the location of the at least one face to be suppressed.

9. The method of claim 8 comprising adjusting the selected image to correspond to size of the area co-ordinates to be masked.

10. The method of claim 8 comprising adjusting edges of the overlayed image to blend with image characteristics of the at least one digital image.

11. The method of claim 10 wherein the image characteristics may include one or more of color, intensity, brightness, and texture.

12. The method of claim 7 wherein the selection of the at least one face to be suppressed comprises a command to suppress a particular individual from being displayed in any digital image, the method comprising identifying any digital image comprising a face corresponding to the particular individual to be suppressed and flagging the identified digital images to mask the area co-ordinates corresponding to the location of the at least one face to be suppressed.

13. The method of claim 7 wherein the masking comprises applying a permanent mask to the digital image.

14. The method of claim 7 wherein the masking comprises modifying metadata of the digital image to cause the digital image to be masked when displayed.

15. The method of claim 1 comprising associating date data with the digital image; and displaying stored portraits corresponding to a common person in accordance with the respective associated date data.

16. The method of claim 15 comprising generating an animated representation of an evolution of the stored portraits corresponding to the common person over time.

17. The method of claim 1 comprising associating an identification of a person with the at least one stored portrait.

18. The method of claim 17 comprising associating relationships between identified persons based at least partly on respective identified persons being included in the digital image.

19. The method of claim 18 comprising populating an interactive computer game with the stored portraits and relationships.

20. The method of claim 19 wherein the interactive computer game comprises a photo reminiscence therapy game.

21. The system of claim 1 wherein the processing instructions when executed by the at least one processor cause the computer to extract the at least one detected face from the at least one digital image prior to the applying.

22. The system of claim 1 wherein the processing instructions when executed by the at least one processor cause the computer to insert the at least one stored portrait in a marketing image.

23. The system of claim 1 wherein the processing instructions when executed by the at least one processor cause the computer to:
receive a selection of at least one face to be suppressed;
mask the area co-ordinates corresponding to the location of the at least one face to be suppressed in the at least one digital image.

24. A system comprising at least one computer comprising at least one processor and a non-transitory computer readable memory comprising processing instructions, that when executed by the at least one processor, cause the computer to:
detect at least one face in at least one digital image by a first processing run on the at least one digital image to detect a candidate face and a second processing run processing on a reduced region of the at least one digital image at one or more incremental rotation angles of the at least one digital image, the second processing run detecting the at least one face if the candidate face is detected in two or more of the incremental rotation angles;
determine and store area co-ordinates of a location of the at least one detected face in the at least one digital image;
apply at least one transformation to the at least one detected face to create at least one portrait of the at least one detected face;
rotate the at least one portrait at least until the at least one portrait is shown in a vertical orientation and a pair of eyes of the at least one face shown in the at least one portrait are positioned on a horizontal plane; and
store the rotated at least one portrait.

* * * * *